US010899560B2

(12) United States Patent
Yap et al.

(10) Patent No.: US 10,899,560 B2
(45) Date of Patent: Jan. 26, 2021

(54) ROBOTIC SYSTEM FOR PICKING, SORTING, AND PLACING A PLURALITY OF RANDOM AND NOVEL OBJECTS

(71) Applicant: XYZ Robotics Global Inc.

(72) Inventors: Jason Chua Yap, Newton, MA (US); Aidan Eric Rose, Newton, MA (US); Kuan-Ting Yu, Allston, MA (US); Ni-Ching Lin, Taipei (TW)

(73) Assignee: XYZ Robotics Global Inc., Grand Cayman (KY)

( * ) Notice: Subject to any disclaimer, the term of this patent is extended or adjusted under 35 U.S.C. 154(b) by 0 days.

(21) Appl. No.: 16/511,402

(22) Filed: Jul. 15, 2019

(65) Prior Publication Data

US 2020/0017315 A1    Jan. 16, 2020

Related U.S. Application Data

(60) Provisional application No. 62/698,679, filed on Jul. 16, 2018, provisional application No. 62/778,221, filed on Dec. 11, 2018, provisional application No. 62/827,708, filed on Apr. 1, 2019.

(51) Int. Cl.
| | |
|---|---|
| *B65G 47/91* | (2006.01) |
| *B25J 9/16* | (2006.01) |
| *B25J 15/06* | (2006.01) |
| *B65G 47/90* | (2006.01) |
| *B65G 47/92* | (2006.01) |

(52) U.S. Cl.
CPC ............ *B65G 47/91* (2013.01); *B25J 9/1612* (2013.01); *B25J 9/1687* (2013.01); *B25J 15/0608* (2013.01); *B25J 15/0616* (2013.01); *B65G 47/905* (2013.01); *B65G 47/92* (2013.01); *B65G 2203/042* (2013.01); *B65G 2207/42* (2013.01)

(58) Field of Classification Search
CPC ..................................... B25J 15/0683
See application file for complete search history.

(56) References Cited

U.S. PATENT DOCUMENTS

| | | | |
|---|---|---|---|
| 2018/0111769 A1* | 4/2018 | Yuvaraj | B25J 19/021 |
| 2018/0311795 A1* | 11/2018 | Morton | B25B 11/002 |
| 2019/0240813 A1* | 8/2019 | Nakayama | B25J 15/0683 |

FOREIGN PATENT DOCUMENTS

JP    2019135072    *    2/2018   ........... B25B 11/005

* cited by examiner

*Primary Examiner* — Ronald P Jarrett
(74) *Attorney, Agent, or Firm* — American Patent Agency PC; Daniar Hussain; Stephen M. Hou

(57) ABSTRACT

The present disclosure generally relates to pick and place robotic systems. An exemplary apparatus for vacuum-gripping a deformable bag comprises: a primary chamber, wherein a proximal end of the primary chamber is connected to an air flow source, and wherein the primary chamber is configured to, upon an activation of the air flow source, receive a portion of the deformable bag via a distal end of the primary chamber; a secondary chamber surrounding the primary chamber, wherein the secondary chamber is connected to the primary chamber via a plurality of connections to allow for air passage, and wherein the activation of the air flow source causes a lateral wall of the primary chamber to grip the portion of the deformable bag via pressure differential between an inside of the deformable bag and the secondary chamber.

12 Claims, 47 Drawing Sheets

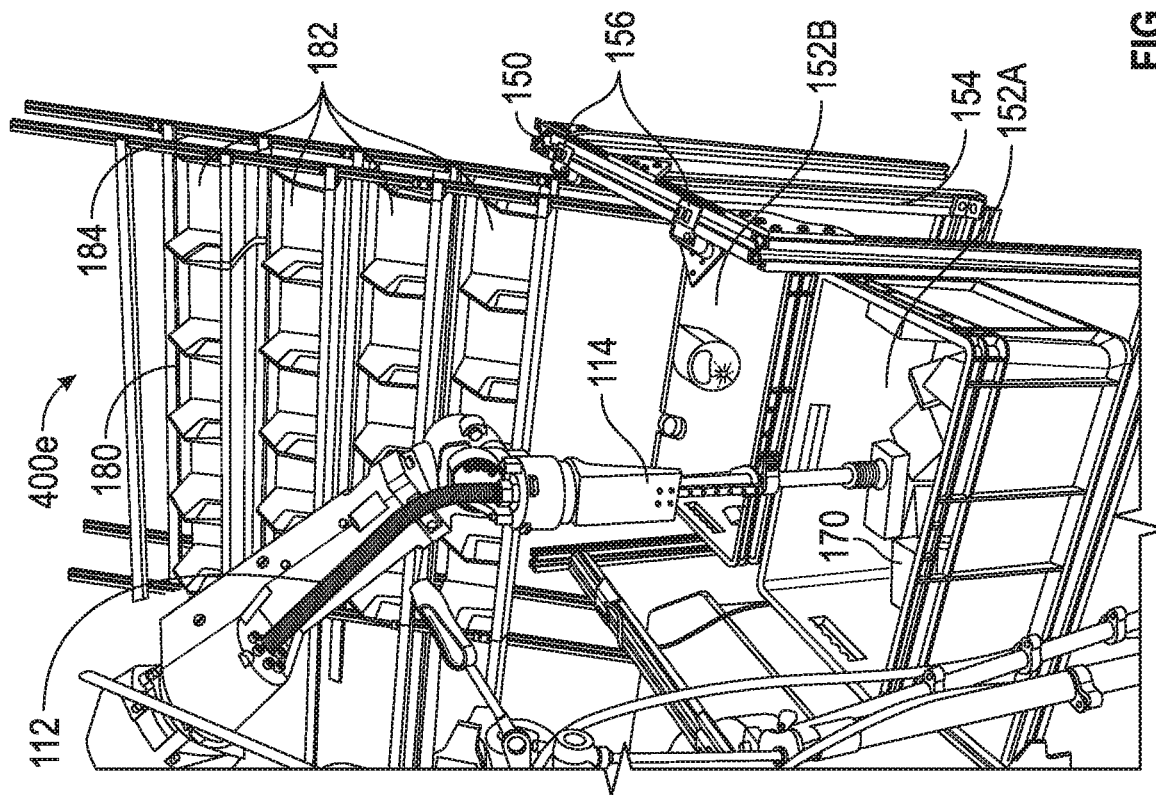
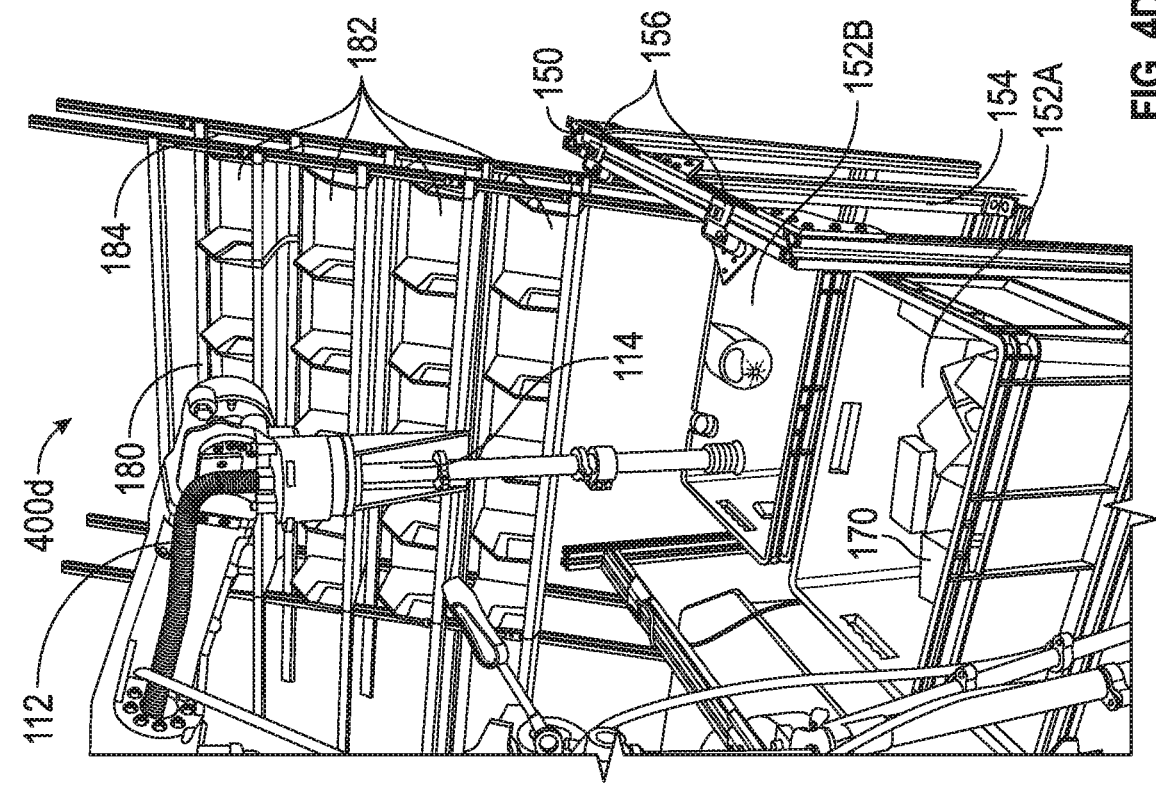

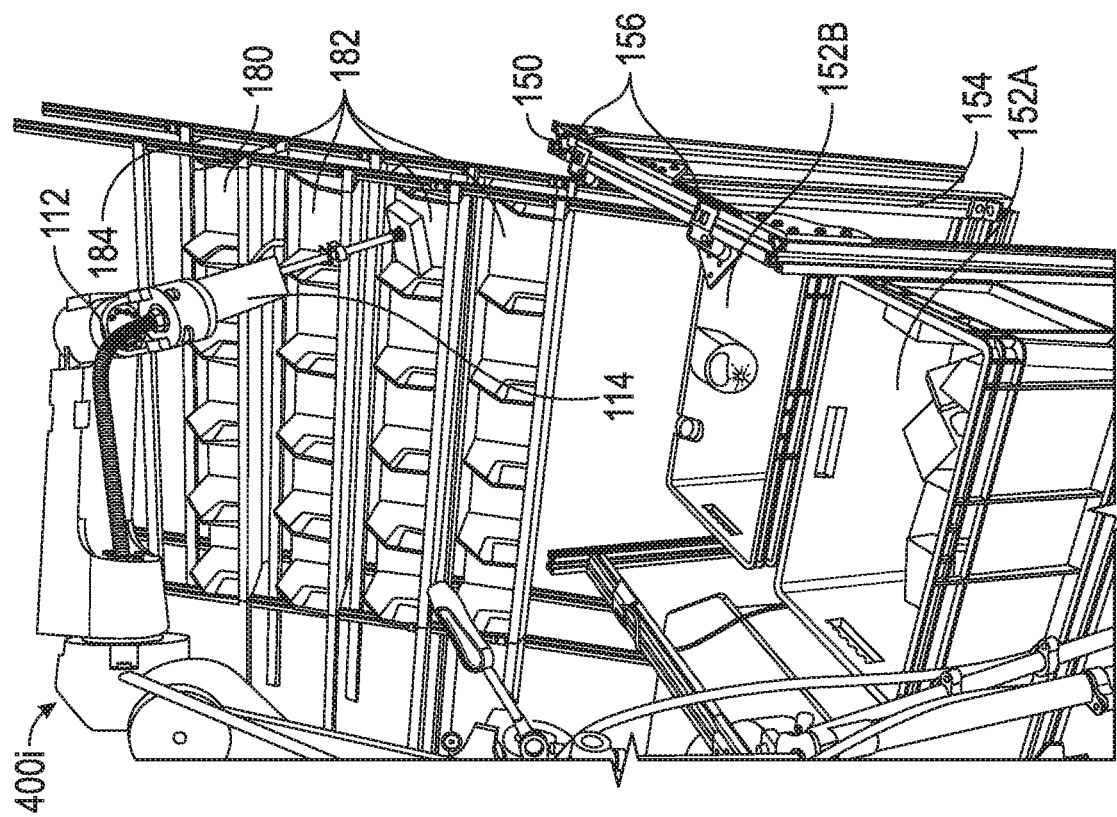
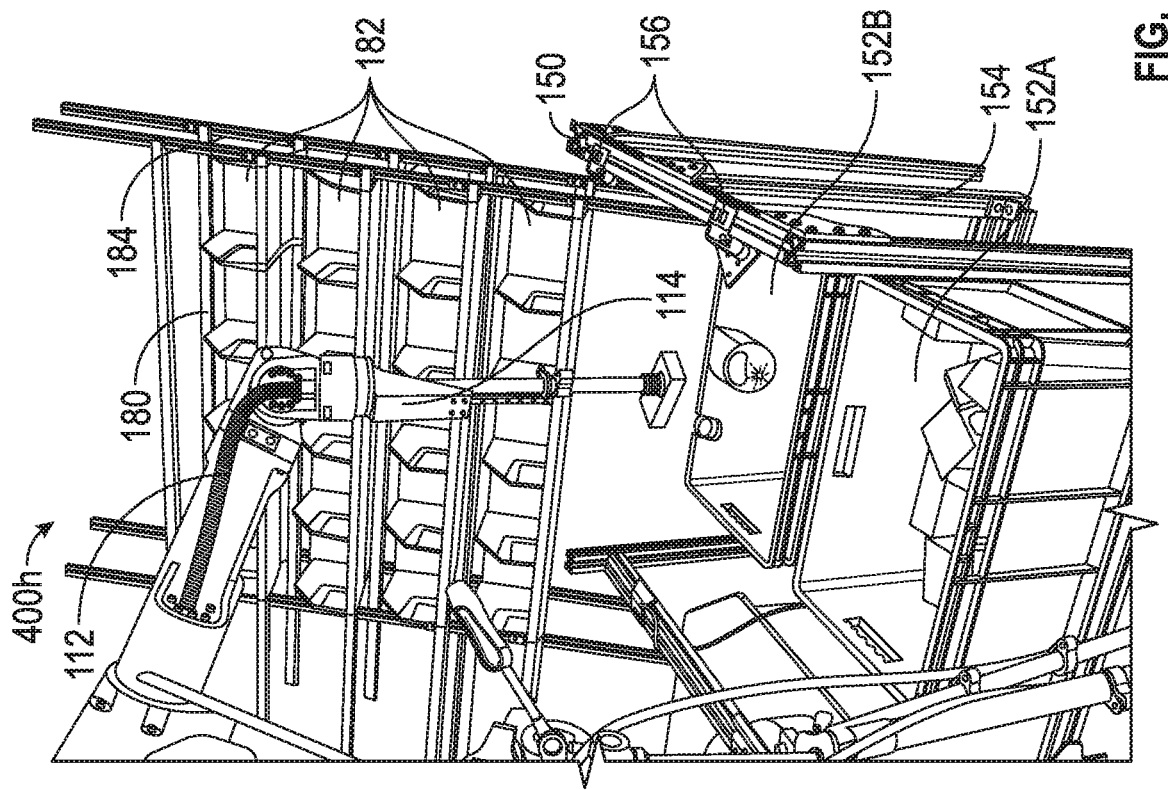
FIG. 4H
FIG. 4I

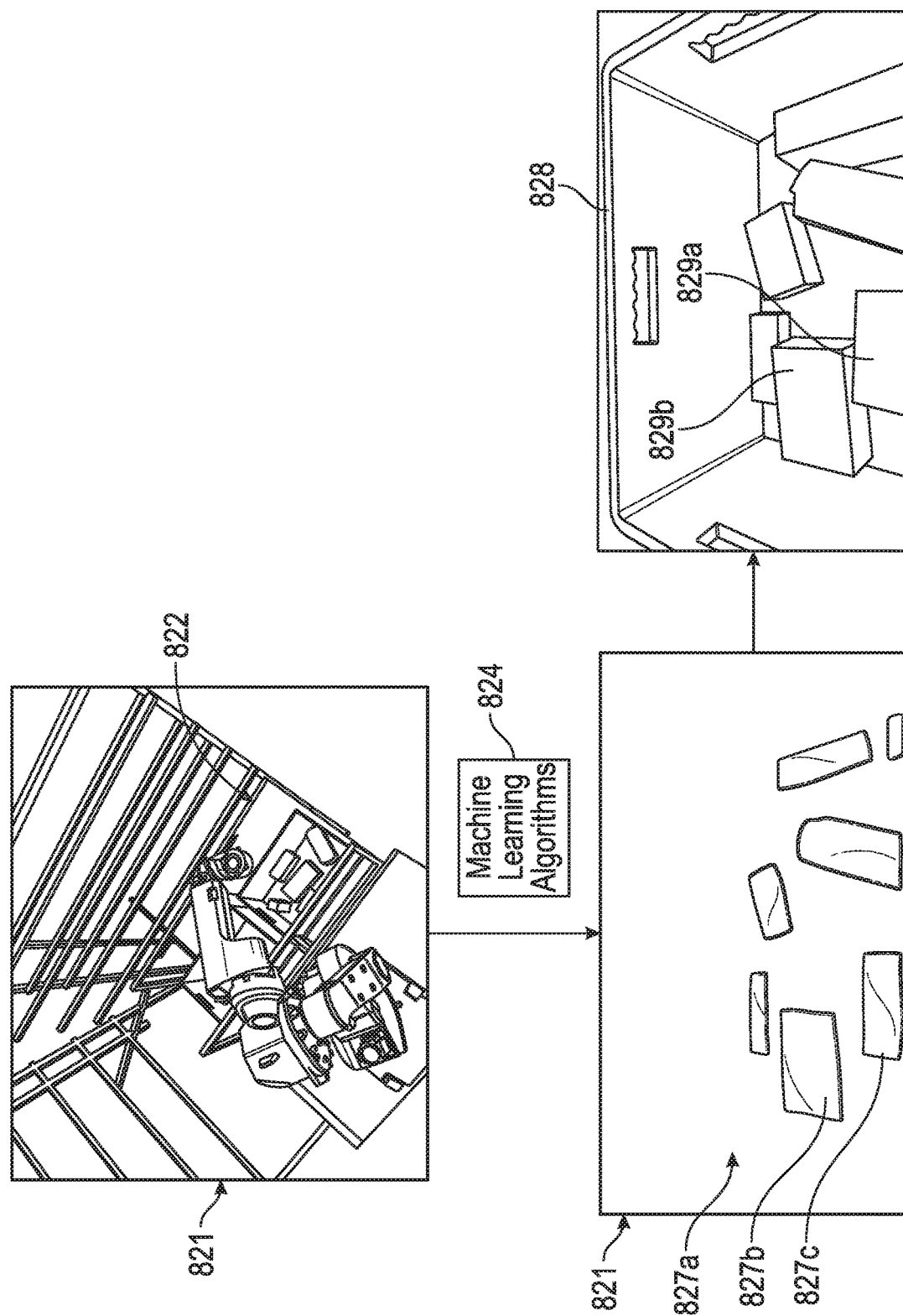

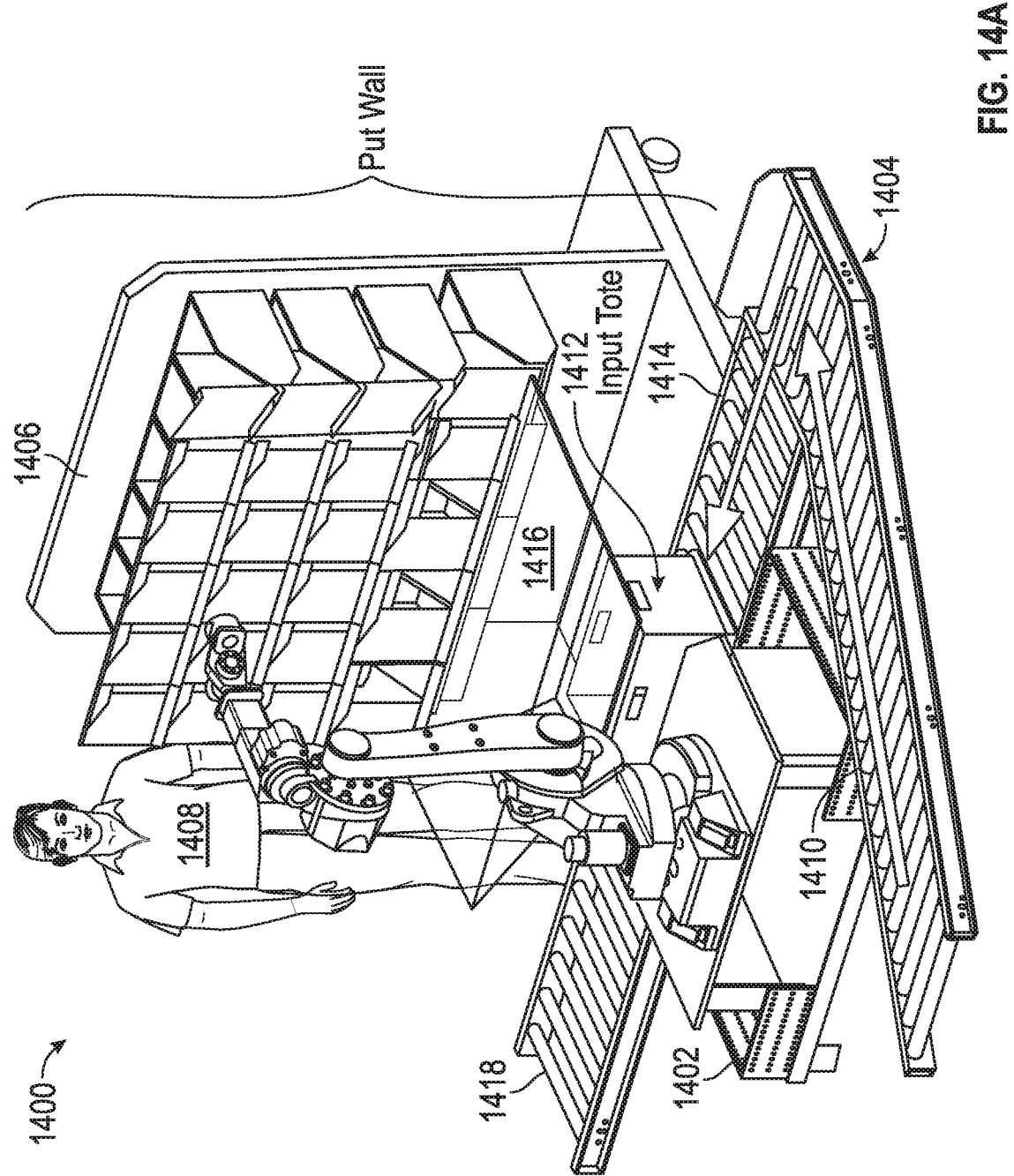

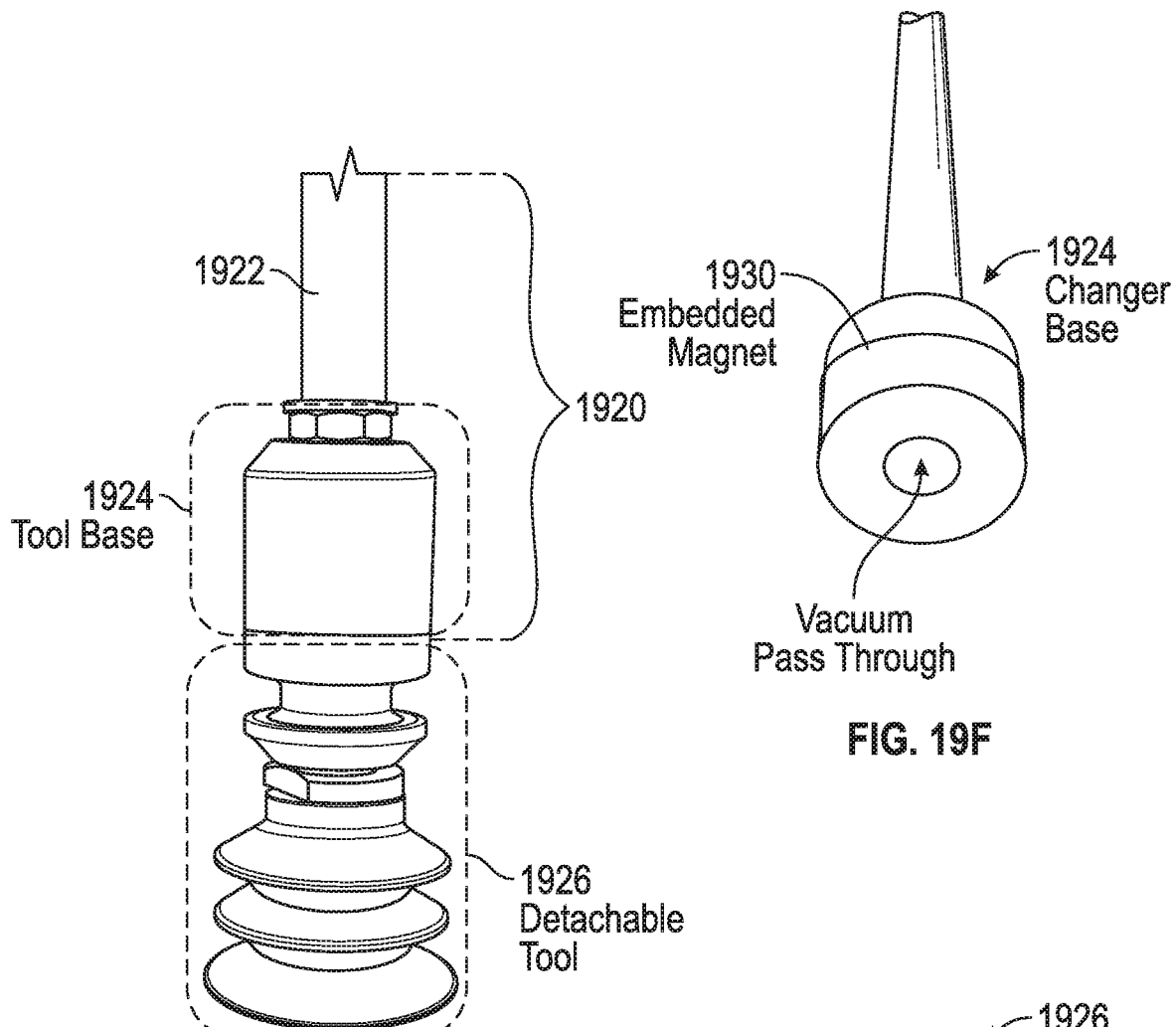
FIG. 19E
FIG. 19F
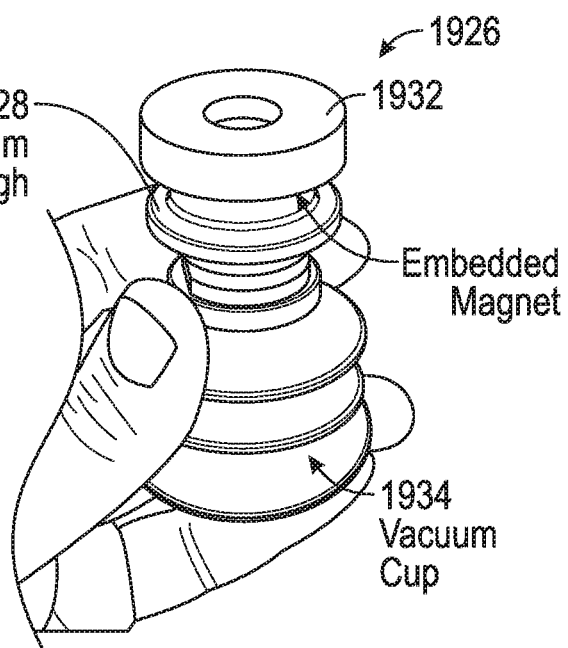
FIG. 19G

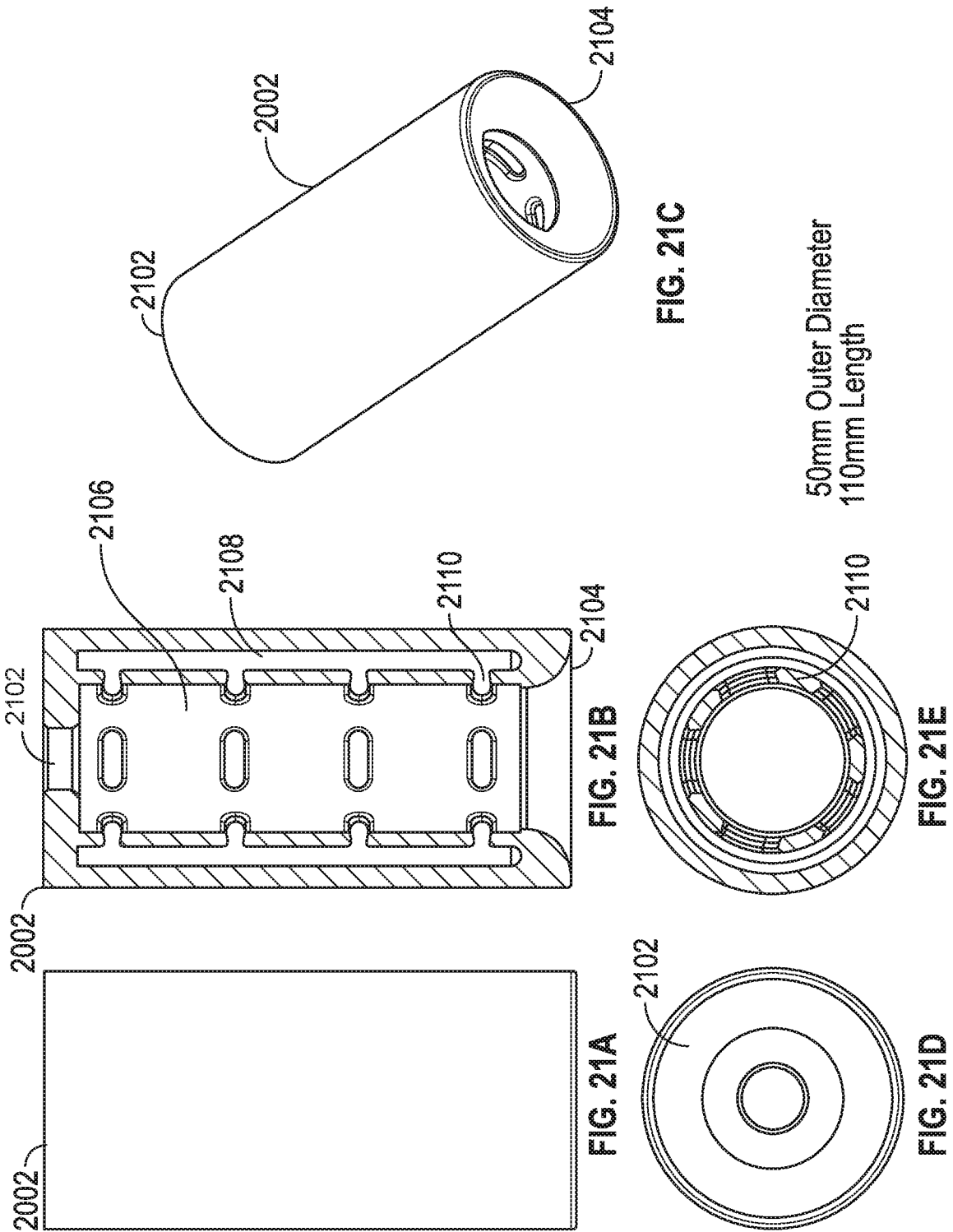

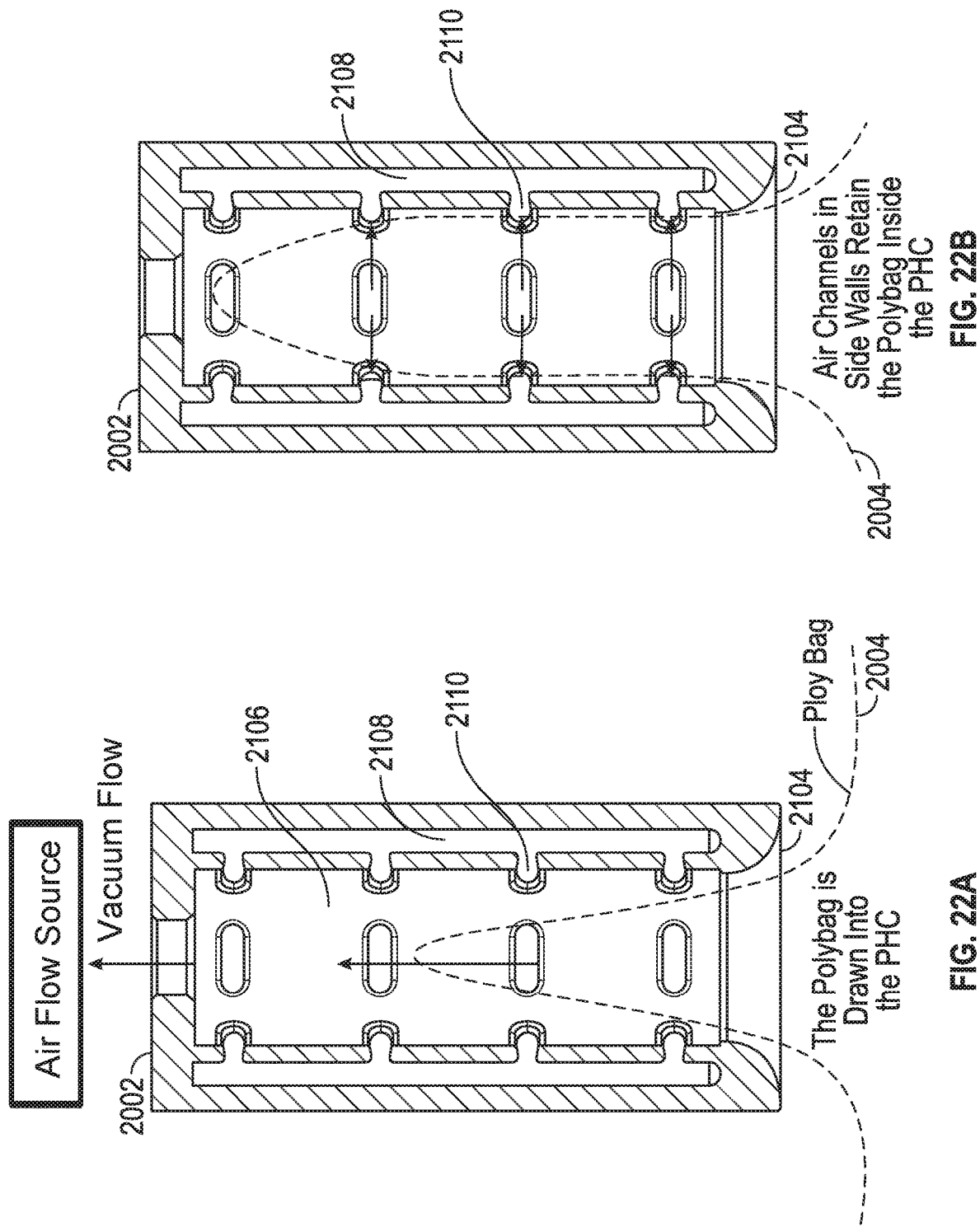

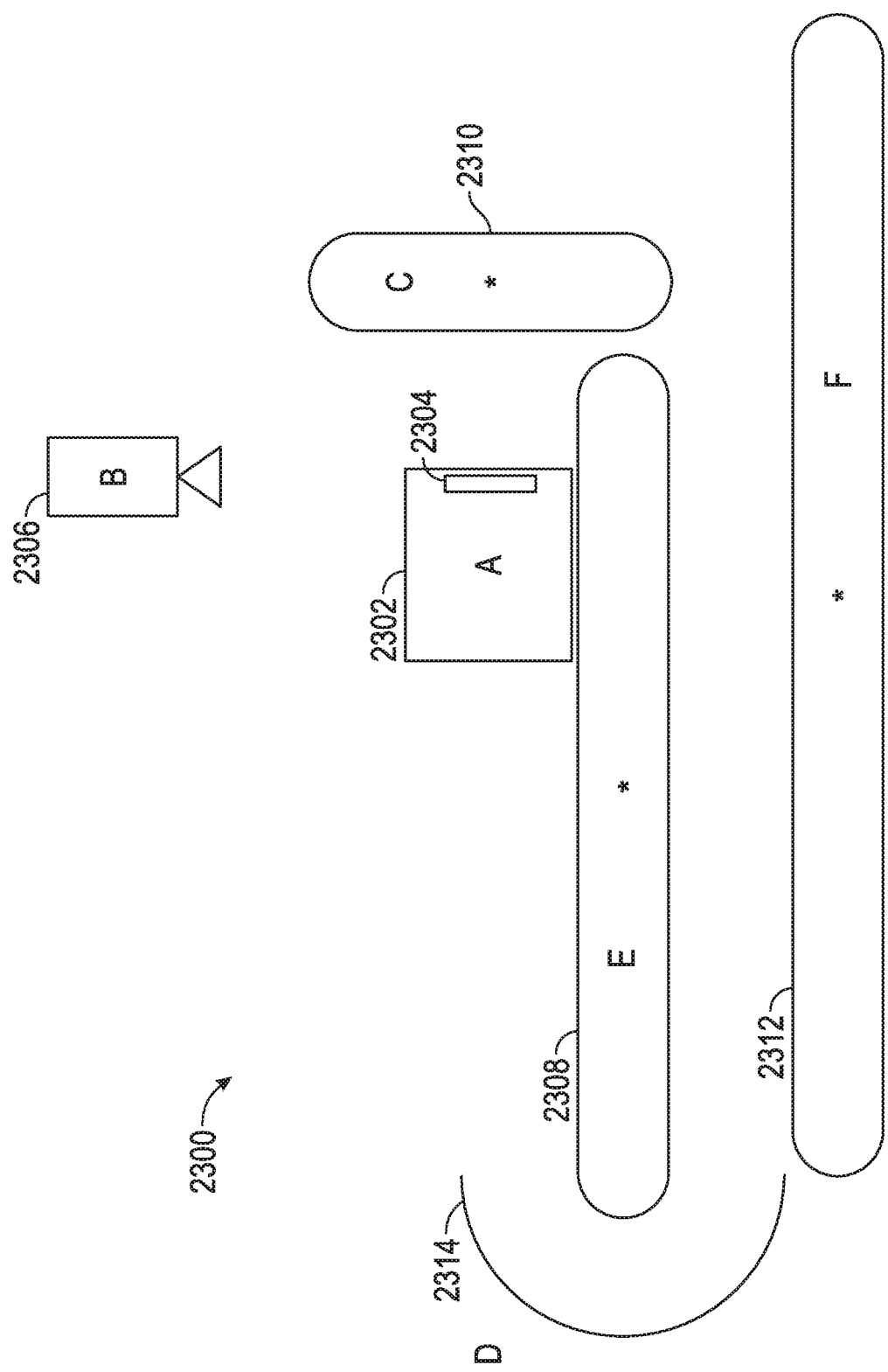

ROBOTIC SYSTEM FOR PICKING, SORTING, AND PLACING A PLURALITY OF RANDOM AND NOVEL OBJECTS

CROSS-REFERENCE TO RELATED APPLICATIONS

This application claims the benefit of U.S. Provisional Application 62/698,679 filed on Jul. 16, 2018, U.S. Provisional Application 62/778,221 filed on Dec. 11, 2018, and U.S. Provisional Application 62/827,708 filed on Apr. 1, 2019, the entire contents of which are incorporated herein by reference for all purposes.

FIELD OF THE DISCLOSURE

This relates generally to pick and place robotic systems that use artificial intelligence, computer vision, and/or mechanical systems to sort and place objects from input containers (or other receptacles) to multiple corresponding receptacle destinations.

BACKGROUND OF THE DISCLOSURE

Many companies have inventory, distribution, or shipping systems that require the sorting of a large number of objects. For example, in a distribution and fulfillment center, objects need to be collected (e.g., batch picked) from shelves and placed together (e.g., sorted) into the correct boxes for shipping. As another example, in a parcel sortation center (e.g., of a shipping carrier), groups of parcels need to be sorted to each fine-grained destination. Companies have hired human workers to perform such tasks. Others have also investigated using robotic systems to perform such tasks.

SUMMARY OF THE DISCLOSURE

Pick and place robotic systems are disclosed. An overall sorting station sorts objects from a loading tote and places them into a set of receiver containers or locations. When picking from a tote then placing into another tote, methods decide the best placing to save space and pack more objects. The end effector compliance is designed to minimize pick up time as well as minimize the risk of damage to the objects. The system determines whether using a finger gripper or a suction gripper is more effective for a particular object, and if by suction, what suction nozzle size is suitable and whether to use high-vacuum or high-flow suction systems. The system identifies a location for picking an object to avoid occluding the barcode. The system identifies the optimal way to move an object to effectively increase the chances that the barcode can be seen in a scan station. The system decides the minimal time to transport the object between each stage of action while ensuring no unwanted collisions and stable motion.

Some embodiments described in this disclosure are directed to one or more devices that use artificial intelligence, computer vision, and/or mechanical systems to sort and place objects from loading containers, and one or more operations related to the above that the devices optionally perform. The full descriptions of the embodiments are provided in the Drawings and the Detailed Description, and it is understood that the Summary provided above does not limit the scope of the disclosure in any way.

An exemplary pick and place robotic system comprises: a robotic arm having an end effector configured to grip objects; a sorting stand adjacent the robotic arm and within working range of the robotic arm, wherein the sorting station includes a support for a container containing a plurality of objects; a vision system having one or more image sensors configured to capture image data of the container and the plurality of objects; a receptacle stand adjacent the robotic arm and within working range of the robotic arm, wherein the receptacle stand includes a support configured to hold a plurality of containers for receiving one or more objects of the plurality of objects; a control system in communication with the robotic arm and the vision system and having memory and a processor, wherein the memory includes a computer program having instructions executable by the processor for: identifying, based on captured image data from the vision system, a location on the plurality of objects in the container for the end effector to grip an object; moving the robotic arm to position the end effector at the location; gripping the object at the location; and moving the object from the container on the sorting stand to a container on the receptacle stand.

In some embodiments, the computer program further includes instructions for: attempting to identify the object after gripping the object; and in accordance with identifying the object, determining a container in the plurality of containers to place the object based on the identification of the object.

In some embodiments, the computer program further includes instructions for: in accordance with failing to identify the object, determining a grip point and a container in the plurality of containers to place the object based on human input.

In some embodiments, the plurality of containers are angled with respect to the ground based on a non-vertical angle of the receptacle stand with respect to the ground.

In some embodiments, the system further comprises a scanning system for identifying an object gripped by the robotic arm.

In some embodiments, the scanning system includes a bar code scanner.

In some embodiments, the scanning system includes one or more mirrors.

In some embodiments, identifying the location is further based on a database having information about potential grip location for a plurality of test objects wherein at least one object in the plurality of objects is not in the plurality of test objects.

In some embodiments, the vision system is supported by the sorting stand.

In some embodiments, the gripper is a suction gripper.

An exemplary computer-implemented method for determining a planned placement and a planned orientation of a first object by a robotic system from a tote to a receptacle comprises: at the robotic system comprising a robotic arm, an end effector, an image sensor, and a processor: capturing image data for the first object using the image sensor; and determining a planned placement and a planned orientation of the first object relative to the receptacle using the image data that maximize a characteristic of the receptacle and its contents.

In some embodiments, the receptacle is another tote.

In some embodiments, the characteristic of the receptacle and its contents includes the available space for more objects after the first object is placed in the receptacle in accordance with a given planned placement and a given planned orientation.

In some embodiments, the characteristic of the receptacle and its contents is the number of objects that can fit in the receptacle in accordance with a given planned placement and a given planned orientation.

In some embodiments, the method further comprises determining a planned placement and a planned orientation of the first object relative to the receptacle further comprises capturing image data for a second object different from the first object using the image sensor; the characteristic of the receptacle and its contents is based on both: the first object being placed in the receptacle in accordance with a first given planned placement and a first given planned orientation, and the second object being placed in the receptacle in accordance with a second given planned placement and a second given planned orientation.

In some embodiments, the receptacle is a shelf.

In some embodiments, the characteristic of the receptacle and its contents is whether the object will collide with the receptacle or its current contents as the object is placed in accordance with a given planned placement and a given planned orientation.

An exemplary end effector for a pick and place robotic system comprises: a first gripper configured to grip an object with an first end of the first gripper, wherein: the first gripper connects to the end effector at a second end of the first gripper, and the first end is configured to move towards the second end in response to application of a first force above a threshold level of force to the first end.

In some embodiments, the first gripper is a suction gripper having a tube, wherein an open end of the tube at the first end of the first gripper is capable of providing a suction force to the object.

In some embodiments, the end effector further comprises: a track configured to guide the first gripper in a direction opposite the first force.

In some embodiments, the threshold level of force is based on the weight of a portion of the end effector.

In some embodiments, the end effector further comprises: a spring connecting the first gripper to the end effector and configured to adjust the threshold level of force.

In some embodiments, the end effector further comprises: a second gripper different from the first gripper.

In some embodiments, first end includes a flexible member configured to contact the object.

In some embodiments, the flexible member is a flexible nozzle.

In some embodiments, the threshold force is dynamically adjustable.

In some embodiments, the first gripper is configured to move the first end away from the second end when the threshold level of force is no longer present on the first end.

In some embodiments, the end effector is connectable to a robotic arm.

An exemplary container for holding objects to be sorted in a pick and place system comprises a receptacle having an opening for holding a plurality of objects to be sorted by the pick and place system; a compliance mechanism on a bottom side of the container configured to allow the receptacle to move downward with application of a downward force on the top of the container.

An exemplary sorting stand for holding a container containing objects to be sort in a pick and place system comprises: a base for receiving the container; and a compliance mechanism connected to the base and configured to allow the container to move downward with application of a downward force on the top of the container.

An exemplary method comprising: at a robotic system having an end effector, wherein the end effector is configured to grip an object, and a first configuration for the end effector defines a first set of properties for how the end effector grips the object and a second configuration for the end effector defines a second set of properties for how the end effector grips the object: determining a plurality of probability maps of a scene including the object and at least one other object, each probability map corresponding respectively to a different motion primitive among a plurality of motion primitives, wherein: each motion primitive is associated with using the end effector with the first configuration or the second configuration to grip the object; and each of the plurality of probability maps marks undesired regions on the object to group the object; and choosing a motion primitive among a plurality of motion primitives to use in gripping the object based on the plurality of probability maps; and configuring the end effector according to the first configuration or second configuration associated with the chosen motion primitive.

In some embodiments, the plurality of motion primitives includes: a first motion primitive using the second configuration for the end effector; a second motion primitive different from the first motion primitive using the second configuration for the end effector; a third motion primitive using the first configuration for the end effector; and a fourth motion primitive different from the third motion primitive using the first configuration for the end effector.

In some embodiments, the plurality of motion primitives includes: a gripping down motion primitive using the second configuration for the end effector; a flush gripping motion primitive using the second configuration for the end effector; a suction down motion primitive using the first configuration for the end effector; a suction side motion primitive using the first configuration for the end effector; a pushing motion primitive using either the first end configuration for the effector or the second configuration for the end effector; a toppling motion primitive using either the first configuration for the end effector or the second configuration for the end effector; and a pulling primitive using either the first configuration for the end effector or the second configuration for the end effector.

In some embodiments, determining a plurality of probability maps of the scene including the object comprises information regarding at least another object.

In some embodiments, the robotic system has not determined previously a probability map of a scene including the object.

In some embodiments, the plurality of probability maps are pixel-wise probability maps.

In some embodiments, the plurality of probability maps are pixel-wise binary probability maps.

In some embodiments, determining a probability map of the scene corresponding to a motion primitive associated with the first configuration for the end effector further includes: determining, using a machine learning algorithm, a proposed suction point corresponding to a pixel of an image of the scene, a local surface geometry of the proposed suction point, and a probability of picking the object at the proposed suction point; and outputting a pixel-wise binary probability map of the scene.

In some embodiments, the first configuration for the end effector is defines a first attachment to be attached to the end effector; and determining a plurality of probability maps of a scene further includes: determining a first probability map of the scene corresponding to a motion primitive associated with the end effector coupled with the first attachment.

In some embodiments, the robotic system further comprises a first suction generator and a second suction generator different from the first suction generator; and choosing a motion primitive among a plurality of motion primitives to use in picking the object based on the plurality of probability maps further comprises: in accordance with the chosen motion primitive being associated with using the first configuration for the end effector, determining whether to generate suction using the first suction generator or the second suction generator.

In some embodiments, the robotic system further comprises a first sensor measuring a first property associated with the first suction generator, and a second sensor measuring a second property different from the first property associated with the second suction generator, the method further comprising: in accordance with determining to generate suction using the first suction generator, determining a first suction grip based on the first property measured at the first sensor; and in accordance with determining to generate suction using the second suction generator, determining a second suction grip based on the second property measured at the second sensor.

In some embodiments, determining a probability map of the scene corresponding to a motion primitive associated with the second configuration for the end effector further includes: determining a proposed three-dimensional grip location corresponding to a three-dimensional representation of the scene, a middle point between a first finger and a second finger of the end effector configured according to the second configuration; an angle corresponding to the orientation of the first finger and the second finger; a width between the first finger and the second finger at the proposed grip location; a probability of picking the object at the proposed three-dimensional location; and outputting a pixel-wise binary probability map of the scene.

In some embodiments, the method further comprises determining the distance between the proposed three-dimensional grip location relative to a side of a receptacle containing the object and the at least one other object; and determining whether to use the third motion primitive or the fourth motion primitive based on the plurality of probability maps, the width between the first finger and the second finger at the proposed grip location, and the distance between the proposed three-dimensional grip location relative to a side of a receptacle containing the object and the at least one other object.

An exemplary computer-implemented method for determining a location in a scene, wherein the scene includes a plurality of objects to be picked, for a robotic system to acquire an object in the plurality of objects comprises: at the robotic system comprising a robotic arm, an end effector, an image sensor, a database, and a processor: capturing image data for the scene using the image sensor; generating, based on the image data for the scene, a probability map comprising a plurality of probabilities each corresponding to a region in a plurality of regions on the object, wherein the plurality of probabilities is based on: the likelihood that the corresponding region in the plurality of regions is a barcode portion; and data stored in the database; and determining a location on the object by selecting a region on the object corresponding to a probability in the plurality of probabilities that exceeds a threshold probability.

In some embodiments, the method further comprises in accordance with a determination that the end effector coming into contact with the object at a region causes the barcode on the object to be occluded, a probability of zero is assigned to the region.

In some embodiments, the method further comprises determining a plurality of locations on the object by selecting regions on the object corresponding to probabilities in the plurality of probabilities that exceeds a threshold probability, wherein the distance between the locations is beyond a threshold distance; and attempting to acquire the object at each of the plurality of locations on the object until either at least one of them is successful or none are successful in acquiring the object.

In some embodiments, the method further comprises in accordance with a determination that no region has corresponding likelihood of being a barcode region over a threshold likelihood or if none of the probabilities are above a troubleshooting threshold, entering a troubleshooting mode.

In some embodiments, the troubleshooting mode comprises: acquiring the object; rotating, pushing, toppling, or pulling the object; and putting the object back into the scene.

In some embodiments, the troubleshooting mode comprises: attempting to acquire the object at the location; and in accordance with being unable to acquire the object at the location, setting the probabilities corresponding to regions within a threshold radius of the location to zero.

An exemplary computer-implemented method for scanning a barcode on an object using a robotic system comprises: at the robotic system comprising a robotic arm, a device gripper, and an image sensor: gripping the object using the gripper; estimating the location of a barcode on the object; determining a planned movement of the object, wherein: the planned movement comprises translation and rotation; and the planned movement is based on the location of the image sensor relative to the estimated location of the barcode on the object; moving the object in accordance with the planned movement; capturing image data for the object using the image sensor; identifying a barcode on the object using the image data; and scanning the barcode on the object.

In some embodiments, the robotic system further comprises a plurality of bar code scanners, each aligned at different angles and orientations.

In some embodiments, the robotic system further comprises one or more mirrors configured so that an image of the object and its surroundings includes the reflection of the one or more mirrors, wherein reflections include surfaces of the object not directly visible from the image sensor.

In some embodiments, the mirrors are placed in a manner to optimize the probability that the bar code is visible in a single image shot that includes the object and reflections of the object in the mirrors.

In some embodiments, the planned movement is set to minimize the time to complete the planned movement subject to a constraint.

In some embodiments, the constraint is that the probability of the object falling off of the robotic arm is below a threshold.

In some embodiments, the method further comprises in accordance with no valid barcode being detected after scanning or redundant barcode detection in the event of double picking, entering an abort and repick or a troubleshooting mode.

In some embodiments, the troubleshooting mode comprises: rotating or translating the object; putting the object back into the scene; and gripping the object.

In some embodiments, the troubleshooting mode comprises alerting a user for assistance.

In some embodiments, the robotic system further comprises external lighting configured to shine light onto the object, and the computer-implemented method further comprises intelligently controlling the external lighting to improve the visibility of the barcode on the object.

In some embodiments, minimizing the time to complete the planned movement subject to a constraint is set by a machine learning algorithm.

In some embodiments, the system further comprises a checking system for confirming the correctness of the contents of one or more of the plurality of containers.

In some embodiments, the checking system comprises a plurality of displays each corresponding to a container in the plurality of containers and indicating a count of the number of objects in its corresponding container as tracked by the robotic system.

In some embodiments, the checking system comprises: a plurality of barcodes each corresponding to a container in the plurality of containers, wherein each barcode corresponds to information regarding the contents of the corresponding container as tracked by the robotic system, and a screen configured to display the information regarding the contents of a container as tracked by the robotic system in accordance with a user scanning the barcode corresponding to the container.

In some embodiments, the support is configured to angle the plurality of containers with respect to the ground.

In some embodiments, the support includes a plurality of chutes to direct an object of the plurality of objects into a container of the plurality of containers.

In some embodiments, the system further comprises: a funnel above the sorting stand configured to redirect objects dropped from above into the container.

In some embodiments, the system further comprises: a container conveyor configured to transport containers from an input location to a sorting location.

In some embodiments, the container conveyor includes a justifying conveyor that positions an input container adjacent to the robotic arm for sorting.

In some embodiments, the container conveyor includes an input conveyor for loading an input container.

In some embodiments, the container conveyor includes an output conveyor for carrying away a sorted container.

In some embodiments, the plurality of chutes are angles towards the plurality of containers.

In some embodiments, the plurality of chutes includes a plurality of optical detectors to determine when an object is placed into a container associated with a chute.

In some embodiments, the receptacle stand is removeably coupled to the sorting stand.

In some embodiments, the receptacle stand includes wheels.

In some embodiments, the first gripper is a suction gripper having a rigid structure that contacts an object to be sorted.

In some embodiments, the first gripper is a suction gripper configured to grip a plastic bag associated with the object to be sorted.

In some embodiments, the end effector is mounted on a phalange of a robotic arm via a magnetic connector.

In some embodiments, the magnetic connector is configured to disengage in response to a threshold level of force being applied to the end effector.

In some embodiments, the magnetic connector provides for electrical connections to the phalange.

In some embodiments, the magnetic connector provides for a suction connection to the phalange.

An exemplary system for coupling a detachable tool to a motion device comprises: a first magnetic ring affixed to a distal end of the motion device, wherein the motion device and the first magnetic ring form a first hollow chamber extending through a length of the motion device and through a center of the first magnetic ring; a second magnetic ring affixed to a proximal end of the detachable tool, wherein the second magnetic ring and the detachable tool forms a second hollow chamber extending from a center of the second magnetic ring and the detachable tool, wherein the first magnetic ring and the second magnetic ring are configured to automatically couple together via a magnetic field in an aligned manner, and wherein the coupling of the first magnetic ring and the second magnetic ring joins the first hollow chamber and the second hollow chamber to allow for a pass-through mechanism.

In some embodiments, the pass-through mechanism is a vacuum pass-through.

In some embodiments, the pass-through mechanism is an electronic pass-through.

In some embodiments, the pass-through mechanism is a mechanical pass-through.

In some embodiments, the detachable tool comprises a groove configured to interface with at least one slot on a tool rack.

In some embodiments, the at least one slot has an opening that is wider at the beginning than at the end to facilitate interfacing with the groove.

In some embodiments, the tool rack is ferrous.

In some embodiments, the system further comprises a tool changer base at the distal end of the motion device, wherein the tool changer base forms part of the first hollow chamber.

In some embodiments, a cross-section of the first magnetic ring and a cross-section of the second magnetic ring are identical.

In some embodiments, the ring is an ellipse shape.

In some embodiments, the ring is a circle shape.

In some embodiments, the ring is a polygon shape.

In some embodiments, the detachable tool has a suction cup at the distal end.

In some embodiments, the detachable tool has an electrically or pneumatically activated gripper at the distal end.

An method for decoupling a detachable tool from a motion device, comprises: causing the motion device to move along a first direction toward a slot of a tool rack while the detachable tool is coupled to a distal end of the motion device, wherein the motion device comprises a first magnetic ring and the detachable tool comprises a second magnetic ring, and wherein the first magnetic ring and the second magnetic ring are configured to couple automatically via a magnetic field in an aligned manner; causing the motion device to align a groove of the detachable tool with the slot of the tool rack; causing the motion device to move away from the tool rack in along a second direction to decouple the detachable tool from the distal end of the motion device, wherein the slot of the tool rack is configured to retain the detachable tool.

In some embodiments, the detachable tool is a first detachable tool, the method further comprises positioning the motion device in proximity to a second detachable tool held in a second slot of the tool rack to couple the distal end of the motion device with a proximal end of the second detachable tool; and moving, using the motion device, the detachable tool along the first direction out of the second slot of the tool rack.

In some embodiments, the method further comprises storing a location of the detachable tool in a memory of a computer.

In some embodiments, the method further comprises: causing a distal end of the detachable tool to grip an object; causing the motion device to move the object; causing the distal end of the detachable tool to release the object.

In some embodiments, the first direction is along a horizontal axis.

In some embodiments, the second direction is along a vertical axis.

An exemplary apparatus for vacuum-gripping a deformable bag, comprises: a primary chamber, wherein a proximal end of the primary chamber is connected to an air flow source, and wherein the primary chamber is configured to, upon an activation of the air flow source, receive a portion of the deformable bag via a distal end of the primary chamber; a secondary chamber surrounding the primary chamber, wherein the secondary chamber is connected to the primary chamber via a plurality of connections to allow for air passage, and wherein the activation of the air flow source causes a lateral wall of the primary chamber to grip the portion of the deformable bag via pressure differential between an inside of the deformable bag and the secondary chamber.

In some embodiments, the primary and secondary chambers are nested.

In some embodiments, a subset of the plurality of connections are arranged radially on the lateral wall of the primary chamber.

In some embodiments, the air flow source is a vacuum source.

In some embodiments, the proximal end of the apparatus comprises a first magnetic ring configured to automatically couple with a second magnetic ring of a motion device in an aligned manner.

In some embodiments, the distal end of the apparatus comprises a suction cup configured to grip rigid surfaces.

In some embodiments, the apparatus further comprises a first hollow cylinder, wherein the first follow cylinder forms the primary chamber.

In some embodiments, the apparatus further comprises a second hollow cylinder, wherein the first hollow cylinder is placed inside the second hollow cylinder, and wherein a space between the first hollow cylinder and the second hollow cylinder forms the secondary chamber.

In some embodiments, the plurality of connections are formed via a plurality of holes on a lateral wall of the first follow cylinder.

In some embodiments, the first hollow cylinder is made of plastic, metal, or a combination thereof.

In some embodiments, the second hollow cylinder is made of plastic, metal, or a combination thereof.

In some embodiments, the activation of the air flow source comprises activation of a vacuum pass-through.

In some embodiments, the apparatus further comprises one or more processors; memory; and one or more programs, wherein the one or more programs are stored in the memory and configured to be executed by the one or more processors, the one or more programs comprises instructions for: identifying a region on the deformable bag; identifying a distance between the primary chamber and the region on the deformable bag, based on the distance, determining whether to activate the flow source.

In some embodiments, the one or more programs further comprise instructions for deactivating the flow source.

An exemplary system for orienting an object comprises: a scanner configured to detect a label on the object; an upper conveyor belt; a flipping conveyor belt located at an end of the upper conveyor belt, wherein the upper conveyor belt is configured to transport the object toward the flipping conveyor belt, wherein the flipping conveyor belt is configured to, in a first orientation, rotate and exert a frictional force on the object to reorient the object while the object is in contact with the upper conveyor belt, wherein the flipping conveyor belt is configured to, in a second orientation, allow the object to drop off the end of the upper conveyor belt, and wherein the flipping conveyor belt is configured to move from the first orientation to the second orientation based on an output of the scanner.

In some embodiments, the end of the upper conveyor belt is a first end, the system further comprises a curved chute at a second end of the upper conveyor belt, wherein the upper conveyor belt is configured to transport the object toward the curved chute, and wherein the curved chute is configured to rotate the object by 180 degrees.

In some embodiments, the system further comprises a lower conveyor belt configured to receive the object after it is rotated by the curved chute.

In some embodiments, the flipping conveyor belt is angled to the upper conveyor belt in the first orientation.

In some embodiments, the upper conveyor belt is cleated.

In some embodiments, the flipping conveyor belt is configured to pull a portion of the package upwards and away from upper conveyor belt in the first orientation.

In some embodiments, the flipping conveyor belt is configured to swing from the first orientation to the second orientation.

In some embodiments, the system further comprises a scanner configured to scan one or more surfaces of the object.

In some embodiments, the object is a deformable bag.

In some embodiments, the object is a box.

An exemplary method for orienting an object, the method comprises: causing an upper conveyor belt to move the object toward a flipping conveyor belt located at an end of the upper conveyor belt; determining, based on an output from a scanner, whether the object is in one of one or more predefined orientations; in accordance with a determination that the object is not in in one of one or more predefined orientations, causing the flipping conveyor belt and the upper conveyor belt to run simultaneously to reorient the object while the flipping conveyor belt is in a first orientation; in accordance with a determination that the object is in one of one or more predefined orientations, causing the flipping conveyor belt to move to a second orientation such that the object is dropped off the end of the upper conveyor belt.

In some embodiments, the end of the upper conveyor belt is a first end, the method further comprises: in accordance with a determination that the object is not in one of one or more predefined orientations, determining, based on an output from an optical sensor, a height of the object; in accordance with a determination that the height is below a certain threshold, causing the upper conveyor belt to move the object toward a second end; in accordance with a determination that the height is above a certain threshold, forgoing causing the upper conveyor belt to move the object toward the second end.

In some embodiments, the upper conveyor belt is cleated.

In some embodiments, the flipping conveyor belt is configured to pull a portion of the package upwards and away from upper conveyor belt.

In some embodiments, determining whether the object is in one of one or more predefined orientations is based on a configuration of a downstream sorter.

In some embodiments, determining whether the object is in one of one or more predefined orientations comprises: scanning, using the scanner, a surface of the object to obtain image data; determining, based on the image data, whether the image data includes information related to the object.

In some embodiments, the method further comprises: in accordance with a determination that the image data includes information related to the object, determining that the object is in one of one or more predefined orientations; and in accordance with a determination that the image data does not include information related to the object, determining that the object is not in one of one or more predefined orientations.

In some embodiments, the information related to the object comprises a barcode.

In some embodiments, the method further comprises: in accordance with a determination that the object is not in in one of one or more predefined orientations, determining whether a height of the object exceeds a threshold; in accordance with a determination that the height of the object exceeds the threshold, causing the flipping conveyor belt and the upper conveyor belt to run simultaneously to reorient the object while the flipping conveyor belt is in a first orientation; in accordance with a determination that the height of the object does not the threshold, reversing movement of the upper conveyor belt to transport the object to a curved chute.

An exemplary method for orienting an object comprises causing an upper conveyor belt to move the object toward a flipping conveyor belt located at an end of the upper conveyor belt; determining, based on an output from a scanner, whether a code on the package is read; in accordance with a determination that the code on the package is read, causing the flipping conveyor belt and the upper conveyor belt to run simultaneously to reorient the object while the flipping conveyor belt is in a first orientation; in accordance with a determination that the code on the package is not read, causing the flipping conveyor belt to move to a second orientation such that the object is dropped off the end of the upper conveyor belt.

An exemplary compliant mechanism, comprises: a motion device, wherein a distal surface of the motion device comprises a first plurality of magnetic components; an end effector, wherein the end effector comprises: a second plurality of magnetic components arranged on a proximal surface of the end effector in a same configuration as the first plurality of magnetic components, a rod, and an elongated member extending through a hole in the proximal surface of the end effector, wherein: a proximal end of the elongated member is affixed to the distal surface of the motion device, and the elongated member comprises an end stopper piece configured to prevent a distal end of the elongated member from passing through the hole in the proximal surface of the end effector.

In some embodiments, the compliant mechanism is configured to: while the proximal surface of the end effector is attached to the distal surface of the motion device via the first plurality of magnetic components and the second plurality of magnetic components, in response to receiving a lateral force to the rod, cause one or more of the first plurality of magnetic components to detach from one or more of the second plurality of magnetic components, and in response to stopping receiving the lateral force, cause the proximal surface of the end effector to automatically attach to the distal surface of the motion device via the first plurality of magnetic components and the second plurality of magnetic components.

In some embodiments, one of the distal surface of the motion device and the proximal surface of the end effector comprises one or more pins; and the other one of the distal surface of the motion device and the proximal surface of the end effector comprises one or more openings for receiving the one or more pins.

In some embodiments, the one or more pins each comprises a tapered top.

In some embodiments, the motion device comprises at least a portion of a robotic arm.

In some embodiments, the second plurality of magnetic components are spaced circumferentially on the proximal surface of the end effector.

In some embodiments, the second plurality of magnetic components are affixed to the proximal surface of the end effector via a screw mechanism.

In some embodiments, the elongated member comprises a screw.

In some embodiments, the proximal end of the elongated member is affixed to the distal surface of the motion device via a screw mechanism.

In some embodiments, the end stopper piece comprises a bolt.

In some embodiments, the proximal end of the rod is attachable to a flexible tube in the motion device.

In some embodiments, the elongated member is a first elongated member, the compliant mechanism further comprises a second elongated member.

In some embodiments, the mechanism further comprises one or more sensors for detecting detachment between a portion of the proximal surface of the end effector and a portion of the distal surface of the motion device.

An exemplary end effector attachable to a motion device, comprises: a plurality of magnetic components arranged on a proximal surface of the end effector; a rod, and an elongated member extending through a hole in the proximal surface of the end effector, wherein: a proximal end of the elongated member is attachable to a distal surface of the motion device, and the elongated member comprises an end stopper piece configured to prevent a distal end of the elongated member from passing through the hole in the proximal surface of the end effector.

In some embodiments, the plurality of magnetic components is a second plurality of magnetic components, the second plurality of magnetic components are arranged in a same configuration as a first plurality of magnetic components arranged on the distal surface of the motion device, and the end effector is configured to: while the proximal surface of the end effector is attached to a distal surface of the motion device via the first plurality of magnetic components and the second plurality of magnetic components, in response to receiving a lateral force to the rod, cause one or more of the first plurality of magnetic components to detach from one or more of the second plurality of magnetic components, and in response to stopping receiving the lateral force, cause the proximal surface of the end effector to automatically attach to the distal surface of the motion device via the first plurality of magnetic components and the second plurality of magnetic components.

In some embodiments, the end effector further comprises one or more pins on the proximal surface of the end effector.

In some embodiments, the one or more pins each comprises a tapered top.

In some embodiments, the plurality of magnetic components are spaced circumferentially on the proximal surface of the end effector.

In some embodiments, the plurality of magnetic components are affixed to the proximal surface of the end effector via a screw mechanism.

In some embodiments, the elongated member comprises a screw.

In some embodiments, the end stopper piece comprises a bolt.

An exemplary compliance mechanism comprises: a motion device; an end effector coupled to the motion device, wherein the end effector comprises: a sheath structure, wherein the sheath structure comprises a slot, and wherein the sheath structure is configured to remain stationary relative to the motion device when the end effector is coupled to the motion device; a rod, wherein a portion of the rod is enclosed by the sheath structure; a protruded piece affixed to the rod, wherein the protruded piece is positioned within the slot of the sheath; wherein the compliance mechanism is configured to: when the distal end of the rod is in not contact with an object, causing the distal end of the rod to move responsive to movement of the motion device, and when the distal end of the rod is in contact with an object and the motion device moves toward the object, causing the distal end of the rod to remain stationary by causing the sheath structure to move along a longitudinal direction of the rod.

In some embodiments, the sheath structure is configured to start moving along the rod when a resistance force between the distal end of the end effector and the object is above a predefined threshold.

In some embodiments, the slot of the sheath is configured to slide along the protruded piece when the sheath structure moves along the longitudinal direction of the rod.

In some embodiments, the protruded piece is of a round shape.

In some embodiments, the protruded piece is of a polygon shape.

In some embodiments, the protruded piece is affixed to a ring that wraps around the rod.

In some embodiments, the end effector comprises a casing enclosing the sheath structure.

In some embodiments, the end effector comprises a first end stopper and a second end stopper on the rod; and wherein the casing is between the first end stopper and the second end stopper.

In some embodiments, the motion device comprises at least a portion of a robotic arm.

In some embodiments, the end effector is coupled to a phalange of the robotic arm.

In some embodiments, the end effector is coupled to the motion device via one or more magnetic components on the end effector.

In some embodiments, the distal end of the end effector comprises a gripper.

In some embodiments, the gripper comprises a suction cup.

In some embodiments, the rod is configured to accommodate vacuum pass-through.

In some embodiments, the mechanism further comprises one or more sensors for detecting a movement of the sheath structure along the rod.

In some embodiments, an exemplary gripping apparatus, comprises: a sheath structure, wherein the sheath structure comprises a slot, and wherein the sheath structure is configured to remain stationary relative to a motion device when the gripping apparatus is attached to the motion device; a rod, wherein a portion of the rod is enclosed by the sheath structure; a protruded piece affixed to the rod, wherein the protruded piece is positioned within the slot of the sheath; wherein the gripping apparatus is configured to: when the distal end of the rod is in not contact with an object, causing the distal end of the rod to move responsive to movement of the motion device, and when the distal end of the rod is in contact with an object and the motion device moves toward the object, causing the distal end of the rod to remain stationary by causing the sheath structure to move along a longitudinal direction of the rod.

In some embodiments, the slot of the sheath is configured to slide along the protruded piece when the sheath structure moves along the longitudinal direction of the rod.

In some embodiments, the gripping apparatus further comprises a casing enclosing the sheath structure.

In some embodiments, the gripping apparatus further comprises a first end stopper and a second end stopper on the rod; and wherein the casing is between the first end stopper and the second end stopper.

In some embodiments, the motion device comprises at least a portion of a robotic arm.

In some embodiments, the distal end of the gripping apparatus comprises a gripper.

BRIEF DESCRIPTION OF THE DRAWINGS

The patent or application file contains at least one drawing executed in color. Copies of this patent or patent application publication with color drawings will be provided by the Office upon request and payment of the necessary fee.

For a better understanding of the various described embodiments, reference should be made to the Detailed Description below, in conjunction with the following drawings in which like reference numerals refer to corresponding parts throughout the figures.

FIG. 4D illustrates exemplary placements of objects in accordance with some embodiments.

FIG. 4E illustrates exemplary placements of objects in accordance with some embodiments.

FIG. 4H illustrates exemplary placements of objects in accordance with some embodiments.

FIG. 4I illustrates exemplary placements of objects in accordance with some embodiments.

FIG. 9 illustrates an exemplary system for switching end effectors between a gripper and various suction nozzles as well as between high-vacuum and high-flow suction systems in accordance with some embodiments.

FIG. 14A depicts an exemplary pick and place system in accordance with some embodiments.

FIG. 19E depicts an exemplary magnetic coupling for a detachable tool in accordance with some embodiments.

FIG. 19F depicts an exemplary magnetic coupling for a detachable tool in accordance with some embodiments.

FIG. 19G depicts an exemplary magnetic coupling for a detachable tool in accordance with some embodiments.

FIG. 21A depicts an exemplary loose bag cup gripper in accordance with some embodiments.

FIG. 21B depicts an exemplary loose bag cup gripper in accordance with some embodiments.

FIG. 21C depicts an exemplary loose bag cup gripper in accordance with some embodiments.

FIG. 21D depicts an exemplary loose bag cup gripper in accordance with some embodiments.

FIG. 21E depicts an exemplary loose bag cup gripper in accordance with some embodiments.

FIG. 22A depicts an exemplary loose bag cup gripper in accordance with some embodiments.

FIG. 22B depicts an exemplary loose bag cup gripper in accordance with some embodiments.

FIG. 23 depicts an exemplary package orientation system in accordance with some embodiments.

DETAILED DESCRIPTION

Figure 1:
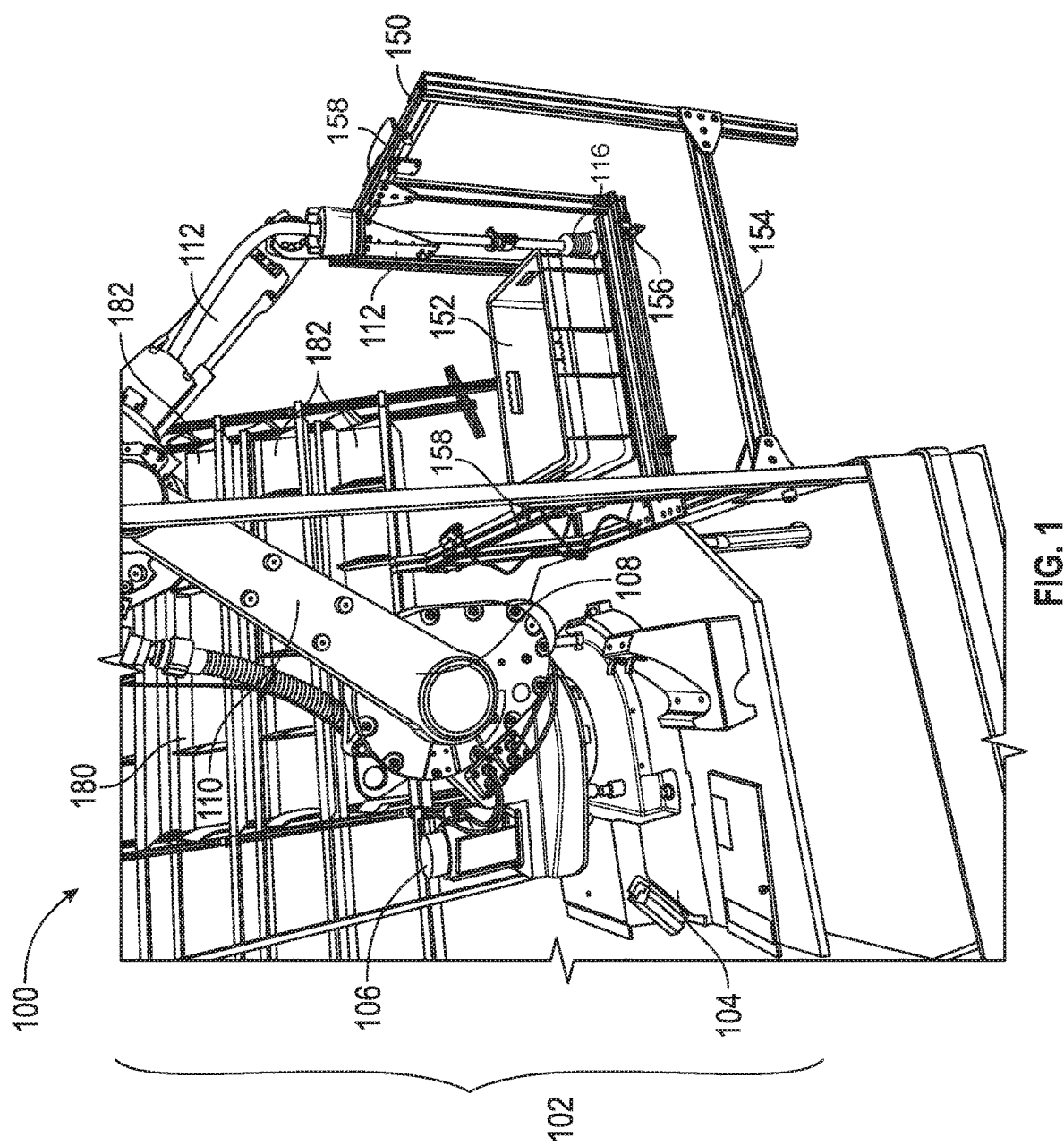
FIG. 1 illustrates an exemplary pick and place system in accordance with some embodiments.

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some instances, well-known structures and components are shown in block diagram form in order to avoid obscuring such concepts.

Examples of systems and methods for picking, sorting, and placing a plurality of random and novel objects will now be presented with reference to various electronic and mechanical devices and methods. These devices and methods will be described in the following detailed description and illustrated in the accompanying drawing by various blocks, components, circuits, steps, processes, algorithms, etc. (collectively referred to as "elements"). These elements can be implemented using electronic hardware, computer software, or any combination thereof. Whether such elements are implemented as hardware or software depends upon the particular application and design constraints imposed on the overall system.

By way of example, an element, or any portion of an element, or any combination of elements of the various electronic systems can be implemented using one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionalities described throughout this disclosure. One or more processors in the processing system can execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described for the system for picking, sorting, and placing can be implemented in hardware, software, or any combination thereof. If implemented in software, the functions can be stored on or encoded as one or more instructions or code on a computer-readable medium. Computer-readable media can include transitory or non-transitory computer storage media for carrying or having computer-executable instructions or data structures stored thereon. Both transitory and non-transitory storage media can be any available media that can be accessed by a computer as part of the processing system. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures accessible by a computer. Further, when information is transferred or provided over a network or another communications connection (either hardwired, wireless, or combination thereof) to a computer, the computer or processing system properly determines the connection as a transitory or non-transitory computer-readable medium, depending on the particular medium. Thus, any such connection is properly termed a computer-readable medium. Combinations of the above should also be included within the scope of the computer-readable media. Non-transitory computer-readable media exclude signals per se and the air interface.

FIG. 1 illustrates an exemplary pick and place system 100 according to some embodiments of the present technology includes robotic arm 102, sorting stand 150, and receptacle stand 180. In some cases, sorting stand 150 and/or receptacle stand 180 are replaced by or include a tote conveyor and/or put wall, respectively, similar to that described with respect to FIGS. 14-17.

In FIG. 1, robotic arm 102 grips objects from tote 152 in sorting stand 150, identifies the gripped objects, and places the gripped objects at locations in receptacle stand 180 (e.g., bins 182). Pick and place system 100 also includes a control system (not shown) that includes a processor, memory, communications interfaces, and other components. Pick and place system 100 is configured to pick and place a wide variety of objects including novel objects that the system has not previously gripped, placed, or even seen.

Robotic arm 102 includes base 104 for mounting to a support surface (e.g., the floor or some other support structure). Frame 106 is rotatably connected to base 104. Lower arm 108 is rotatably connected to frame 110. Upper arm 112 is rotatably connected to lower arm 108. End effector 114 (FIG. 2A) is rotatably connected to upper arm 112. End effector 114 includes one or more grippers. In the case of FIG. 1, gripper 116 is a suction gripper. Other grippers, such as gripping fingers or other type of suction grippers (e.g., FIGS. 6A, 19A, and 20), can also be used. In some cases, end effector 114 is compliant (see FIG. 6A and FIGS. 19A-D) and/or multi-purpose. The control system provides instructions and/or command signals for moving (e.g., rotating, extending, retracting) the various components of robotic arm 102.

Sorting stand 150 includes support structure 154, which is a system of metal support members bolted together. The side of support structure 154 opposite robotic arm 102 includes an opening allowing a tote (e.g., tote 152) or other receptacle to be inserted into sorting stand 150. Sorting 150 optionally includes base 156 for supporting receptacles. Sorting stand 150 also includes a vision system with four cameras 158, each having one or more image sensors (e.g., visible light and/or infrared sensors). The vision system can have any number of cameras and be located in other locations or supported by other structures. In some cases, cameras 158 capture image data that includes visible light data (e.g., RGB data) and/or depth information (e.g., how far objects in the image are from the camera). The captured image data is sent to the control system for processing.

Receptacle stand 180 includes support structure 184 for bins 182 or other receptacles that hold objects that are sorted by pick and place system 100. Support structure 184 is optionally angled (e.g., is non-vertical) to reduce the probability of objects falling out of bins 182. Additionally, the angle can be chosen so that robotic arm 102 does not need to hold a gripped object out horizontally prior to placing it in one of the bins. Receptacle stand 180 is positioned adjacent to sorting stand 150 so that both stands are within working range of robotic arm 102 and with enough room apart that a human can work between the components of pick and place system 100 (e.g., so a human can handle any objects that cannot be identified or that fall off the bins).

Figure 2A:
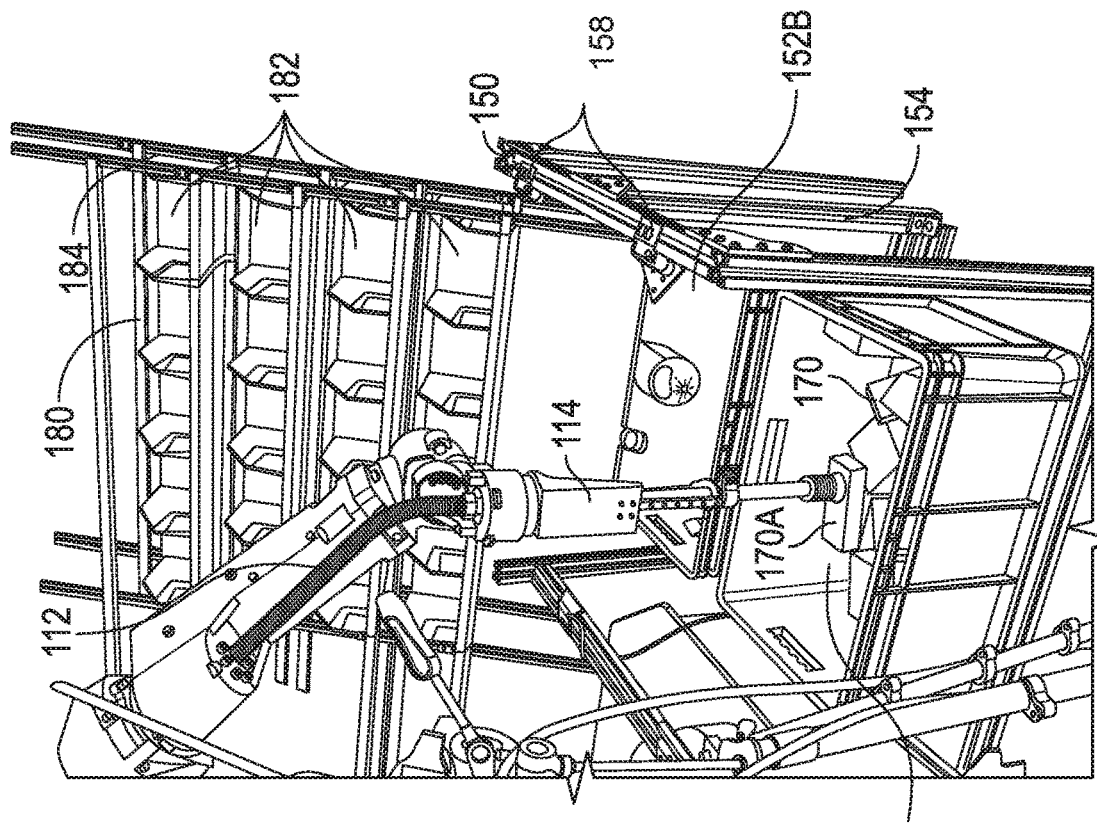
FIG. 2A illustrates a pick and place system sorting objects in accordance with some embodiments.
Figure 2B:
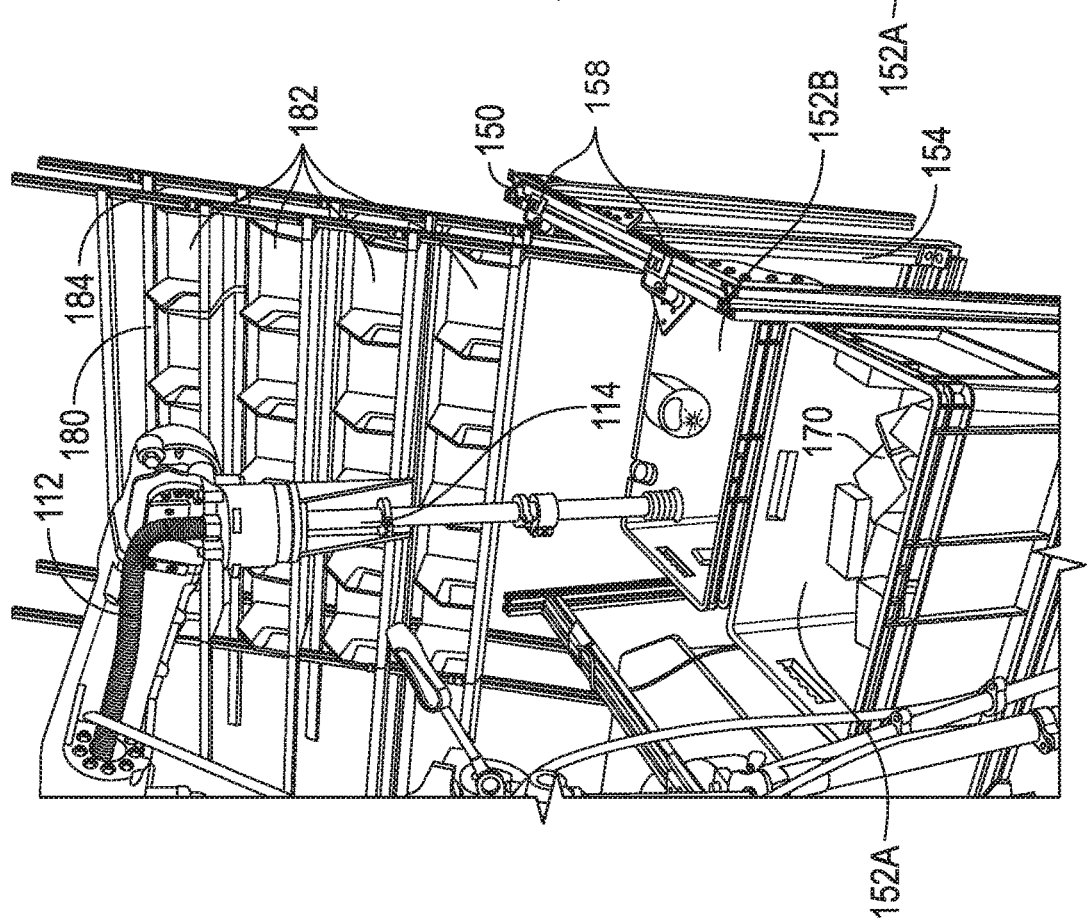
FIG. 2B illustrates a pick and place system sorting objects in accordance with some embodiments.
Figure 2C:
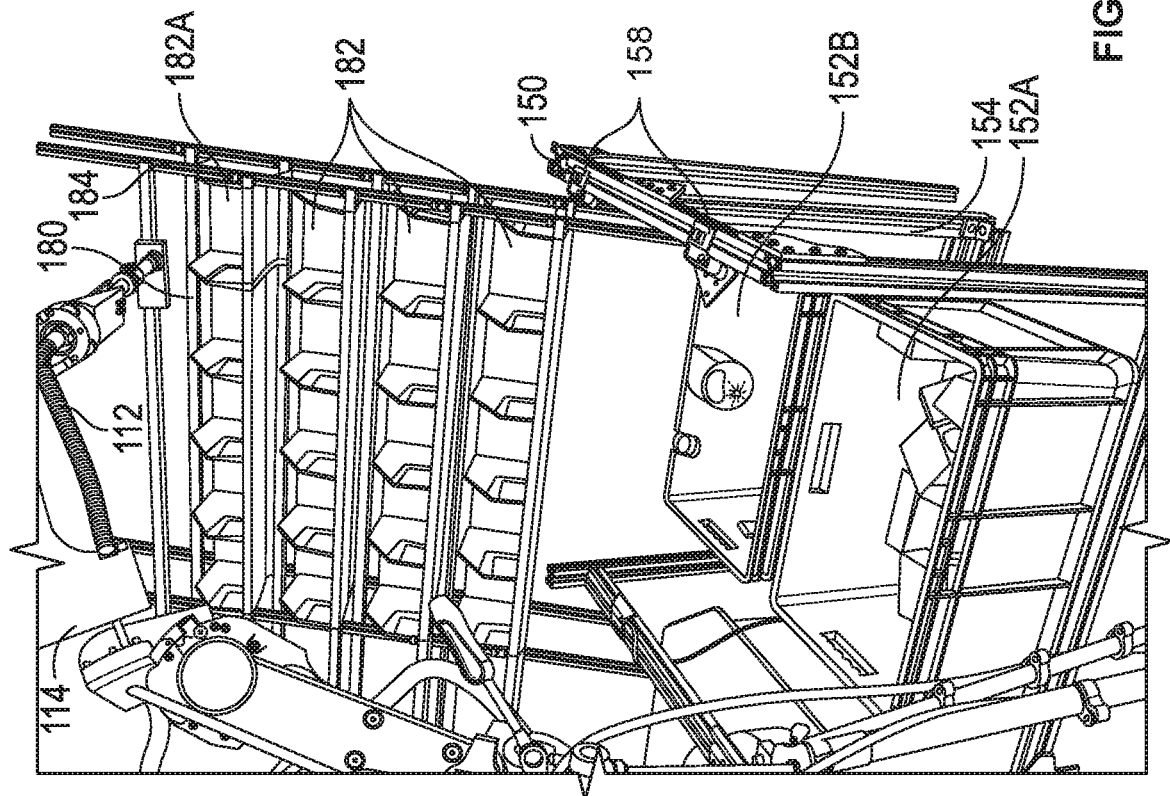
FIG. 2C illustrates a pick and place system sorting objects in accordance with some embodiments.
Figure 3:
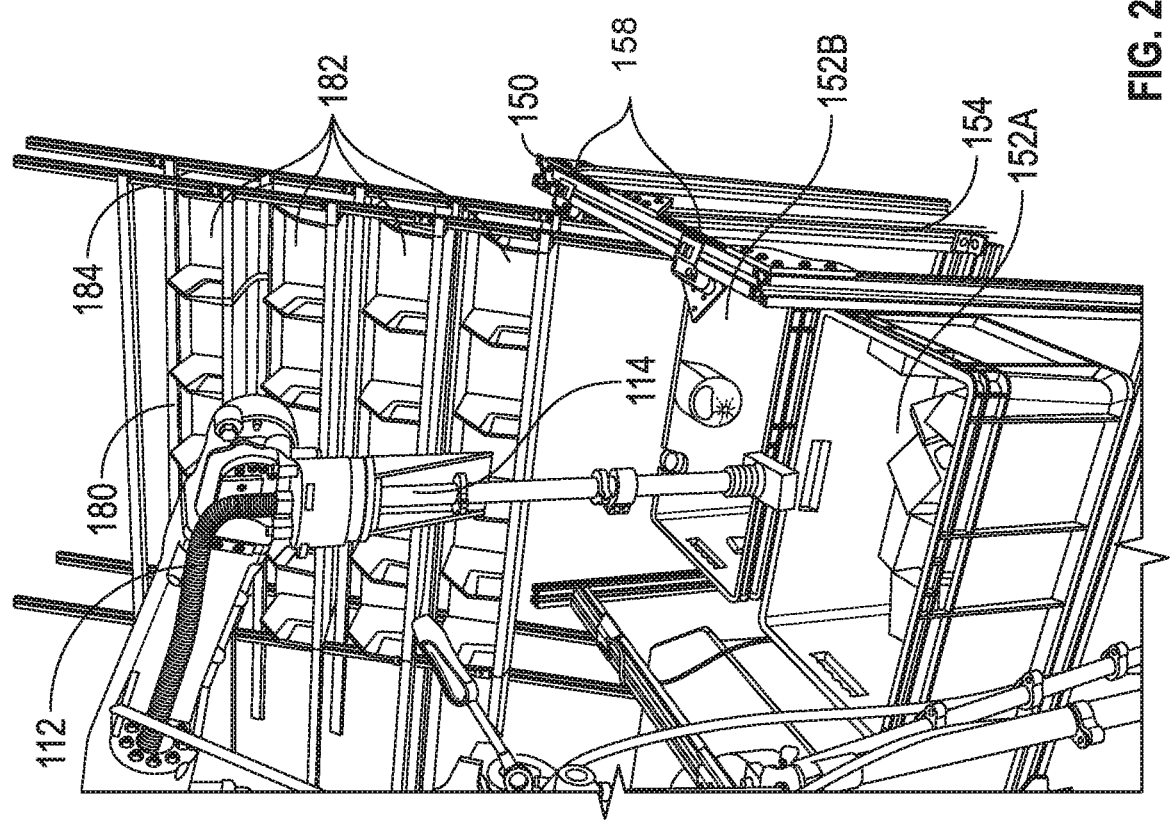
FIG. 3 illustrates a pick and place system sorting objects in accordance with some embodiments.

FIGS. 2A-3 depict pick and place system 100 operating according to some embodiments of the present technology. FIG. 2A depicts pick and place system 100 having two bins 152A and 152B. Bin 152A includes objects 170 for sorting. Using the vision system, the control system determines an object to sort or a location that has a high probability of being a suitable grasp spot, as described further below. FIG. 2B depicts pick and place system 100 after the control system determined that a location on object 170A was the next place for a grip attempt. The control system moves robotic arm 102 so that end effector 114 contacts the location on object 170A. FIG. 2C depicts pick and place system 100 after the control system instructed robotic arm 102 to lift gripped object 170A and move the object towards bin 152B. The control system can then identify the object (e.g., by scanning a bar code or using image recognition or analyzing other properties of the object) and determine where the object should be placed. FIG. 3 depicts pick and place system 100 placing object 170A into bin 182A. For example, the control system optionally determines based on the object identification that the object should be placed in bin 182A. Note that robotic arm 102 need not hold object 170A out completely horizontally because support structure 184 is angled. The holding angle is optimized to balance the gripping force and placement motion constraint. An overall sorting station where a robotic system sorts objects from a loading tote and places them into a set of receiver boxes. When the robotic system cannot recognize an object, such as the bar code is unreadable, it notifies the human assistant, who can then complete the task. The receiver boxes are placed in positions to minimize the time it takes to move objects, to ensure that objects do not fall out, and so that the human assistant can reach them.

In one example, in the case of the system not being able to scan the object, the system drops it on a slope and it will return to the initial tote from which the robot is picking objects. Optionally, a designated area of the sorting stand (e.g., a bottom shelf) has a slope that allows an object placed there to be recycled back to the tote. A recycling mechanism is present to enable another trial. In some embodiments, the system redirects to a human station or requests human input or intervention in the case of repeated failures.

In some embodiments, the pick and place system including a checking system for confirming the correctness of the contents of the receptacles after some objects have been placed in them. For example, each receptacle may include a display (e.g. LCD screen, LED digital counter) that indicates a count of the number of objects in its corresponding receptacle as tracked by the robotic system. In other embodiments, each receptacle may include a barcode, which corresponds to information regarding the contents of the corresponding receptacle as tracked by the robotic system. When a user (e.g. packaging personnel) scans the barcode, a screen displays the information regarding the contents of the corresponding receptacle as tracked by the robotic system. The user can then verify the displayed information against what he/she sees in the receptacle.

FIGS. 4A-4K illustrate exemplary placements of objects in accordance with some embodiments. In the case of picking objects from a tote then placing it into another tote, intelligent perception and software algorithms decide the best placement that saves space and maximizes the number of objects that can fit in the second tote. In the case of picking from a tote then placing it onto a shelf, software determines the geometry and pose of the object in hand such that the robotic system reorients the object to put it inside the shelf unit without collision. Such a system saves space and ensures sufficiently large shelf units where each represents a customer order.

Figure 4A:
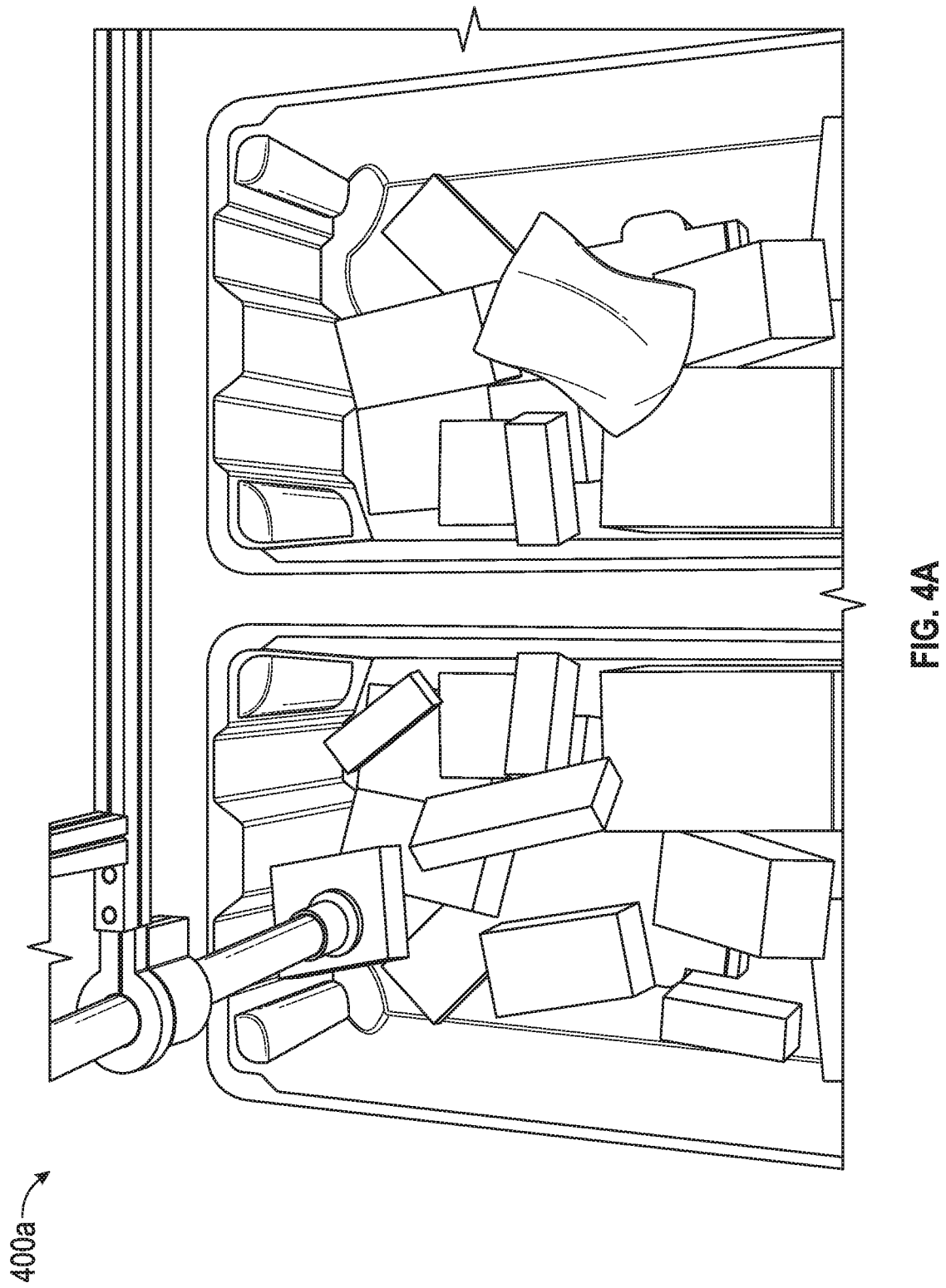
FIG. 4A illustrates exemplary placements of objects in accordance with some embodiments.

In some embodiments, a robotic system comprising a robotic arm, an acquisition device (e.g., an end effector), an image sensor, and a processor determines a planned placement and a planned orientation of a first object from a tote to a receptacle. The robotic system could also be system 100 described above. FIG. 4A depicts a robotic arm moving objects from one tote to another tote. The planned placement is the target resting location of the first object in the receptacle, and the planned orientation is the target resting orientation of the first object in the receptacle. First, the robotic system captures image data for the first object using the image sensor. The image data may include multiple images of the first object taken from multiple angles. The image data may be combined to form a three-dimensional map of the scene. Second, the robotic system determines a planned placement and a planned orientation of the object relative to the receptacle using the image data such that a characteristic of the receptacle and its contents is maximized.

In some embodiments, the receptacle is another tote, as depicted in FIG. 4A. In such embodiments, the robotic system may aim to save space in the other tote. For example, it may place objects flush against the wall of the tote or against other objects already in the tote. The robotic system may aim to tightly pack objects to maximize space utilization so that the tote or other container (or a box, gaylord, tote, bin, etc.) can hold a greater number of objects. There may be circumstances where this is different from saving space. The robotic system may optionally employ techniques used to solve the "knapsack problem" to optimize the use of space in the other tote.

In some embodiments, the robotic system plans for several objects in advance of placing any object rather than planning and placing one object at a time. The robotic system images several objects and determines their optimal placement and orientation before any objects are placed. The system may employ dynamic programming or other techniques to produce a plan. In such embodiments, the resulting arrangement of objects in the receptacle has the potential to save more space and/or pack more objects in the receptacle compared to imaging and planning one object at a time.

Figure 4B:
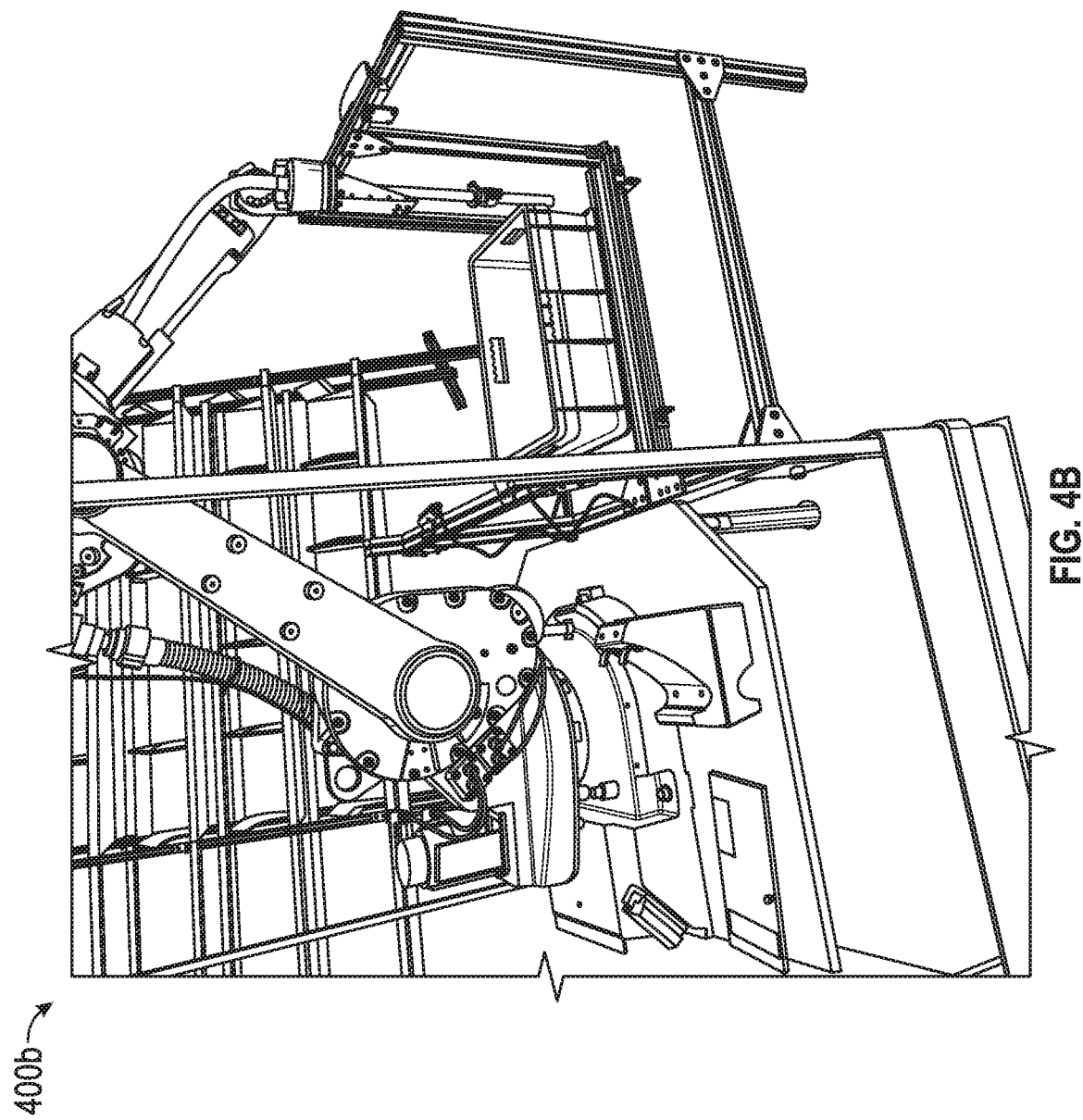
FIG. 4B illustrates exemplary placements of objects in accordance with some embodiments.
Figure 4C:
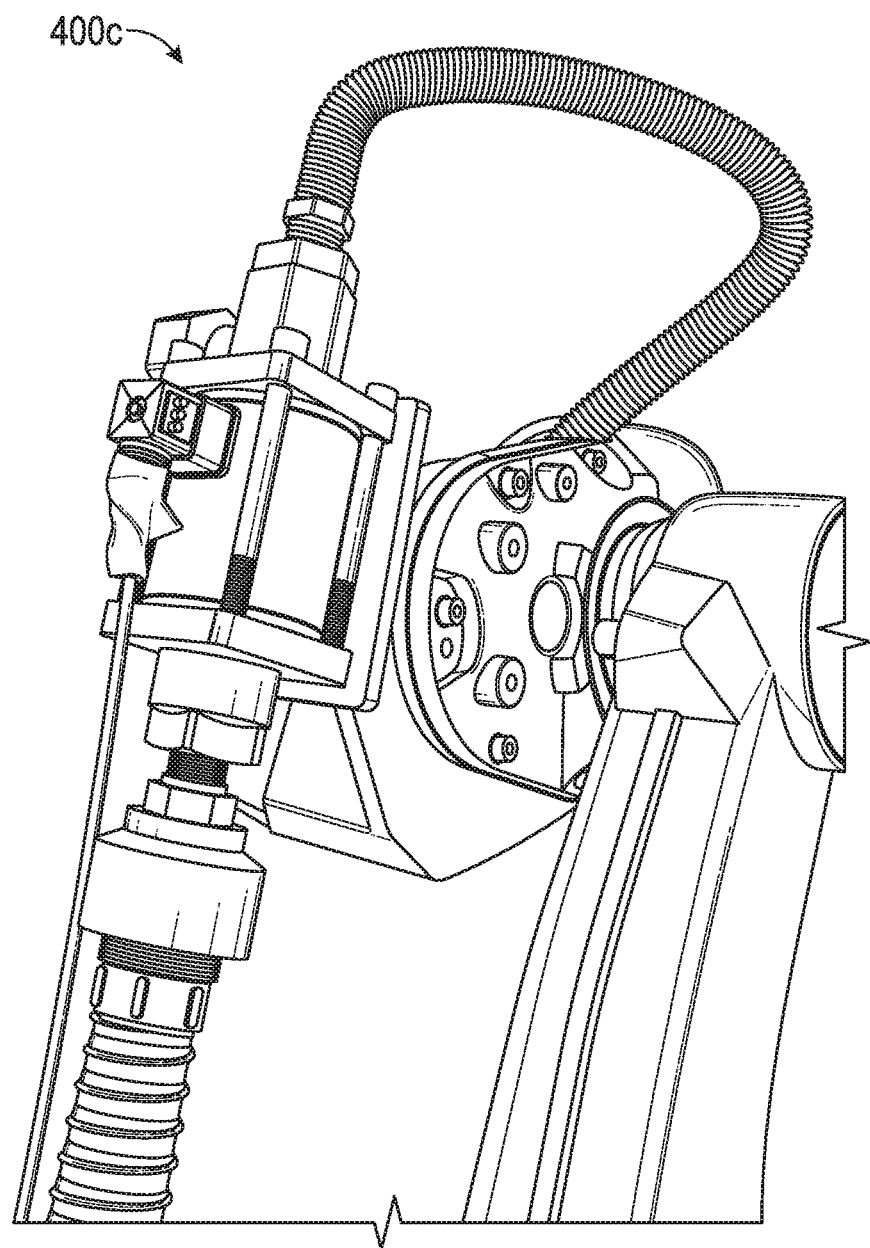
FIG. 4C illustrates exemplary placements of objects in accordance with some embodiments.

In some embodiments, the receptacle is a shelf, as shown in FIGS. 4B and 4C. This may pose different constraints compared to a receptacle that is another tote. For example, it is more difficult to stack objects on top of one another on a shelf without risking objects falling off. In such embodiments, the system may exercise collision avoidance, where the characteristic of the receptacle and its contents is whether the object will collide with the receptacle or its current contents as the object is placed in accordance with a given planned placement and a given planned orientation (with the goal being to ensure no collision takes place). A collision may cause, for example, a stack of picked objects to fall down. In some embodiments, the system takes into account the physical dimensions of the object. In other embodiments, the system takes into account other attributes of the object, such as its weight, center of gravity, and flexibility. The system may also determine a particular planned movement of the robotic arm that avoid collision, if several particular planned movement paths lead to the same planned placement and planned orientation but some paths might have collision along the way. In some embodiments, paths are planned to minimize total picking time. The shelf may optionally be configured to increase the stability of objects collected on the shelf. For example, as shown in FIG. 4C, the shelf is tilted back against the back wall.

Figure 4G:
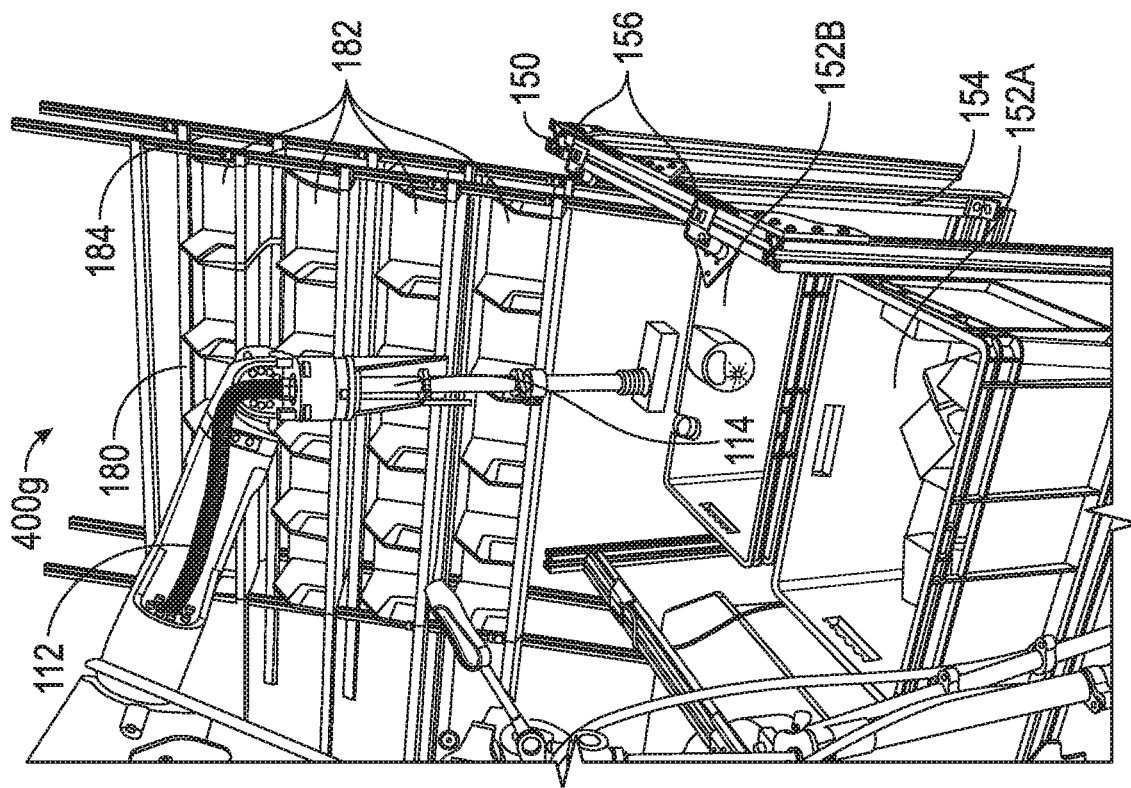
FIG. 4G illustrates exemplary placements of objects in accordance with some embodiments.
Figure 4F:
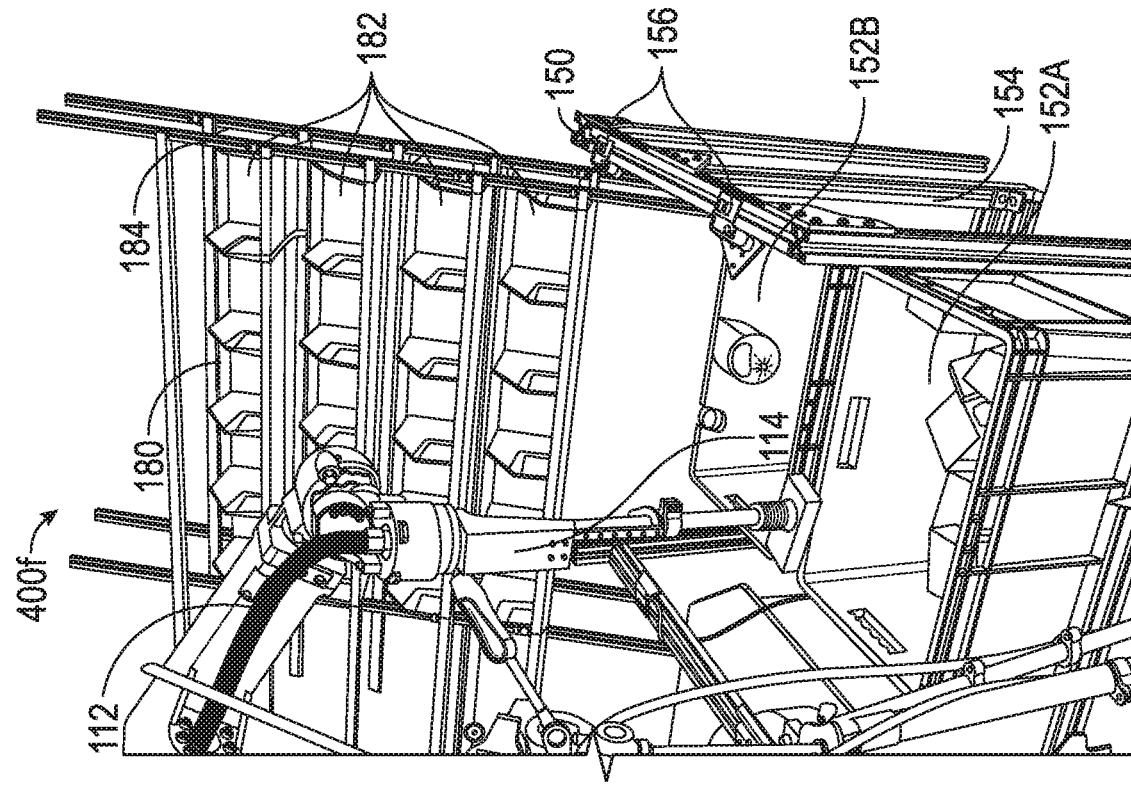
FIG. 4F illustrates exemplary placements of objects in accordance with some embodiments.
Figure 4K:
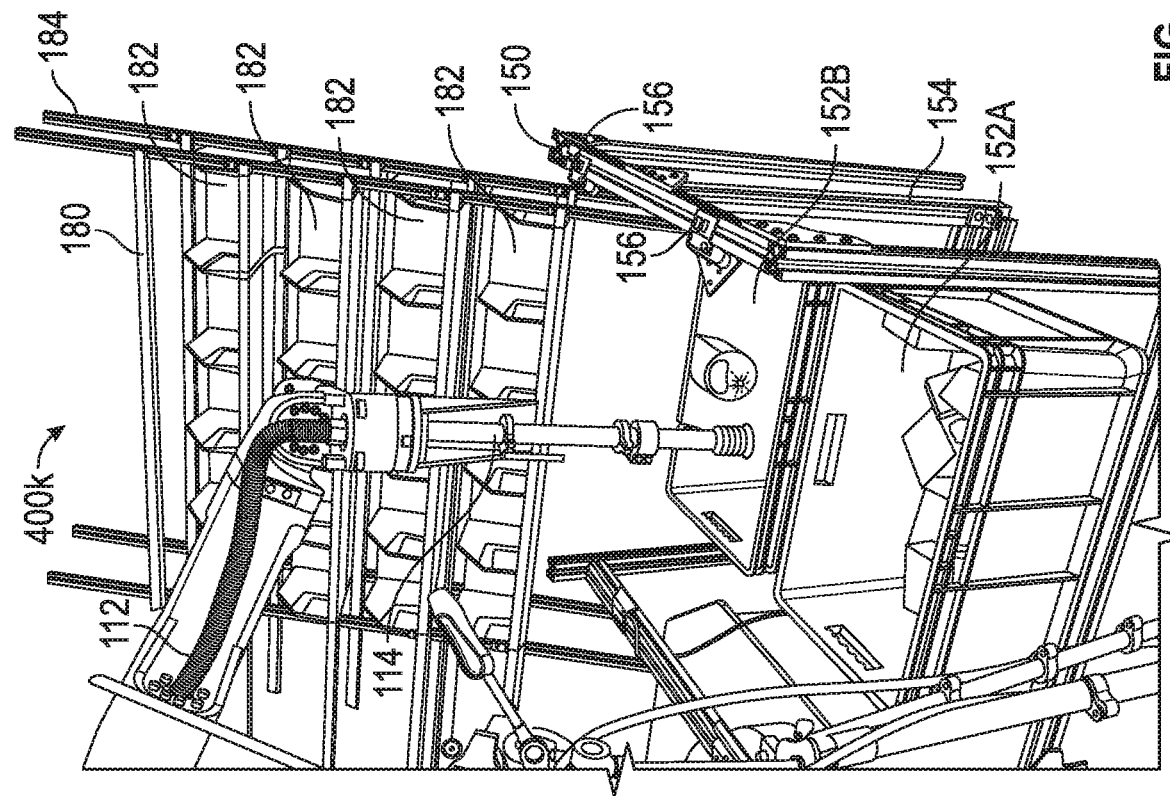
FIG. 4K illustrates exemplary placements of objects in accordance with some embodiments.
Figure 4J:
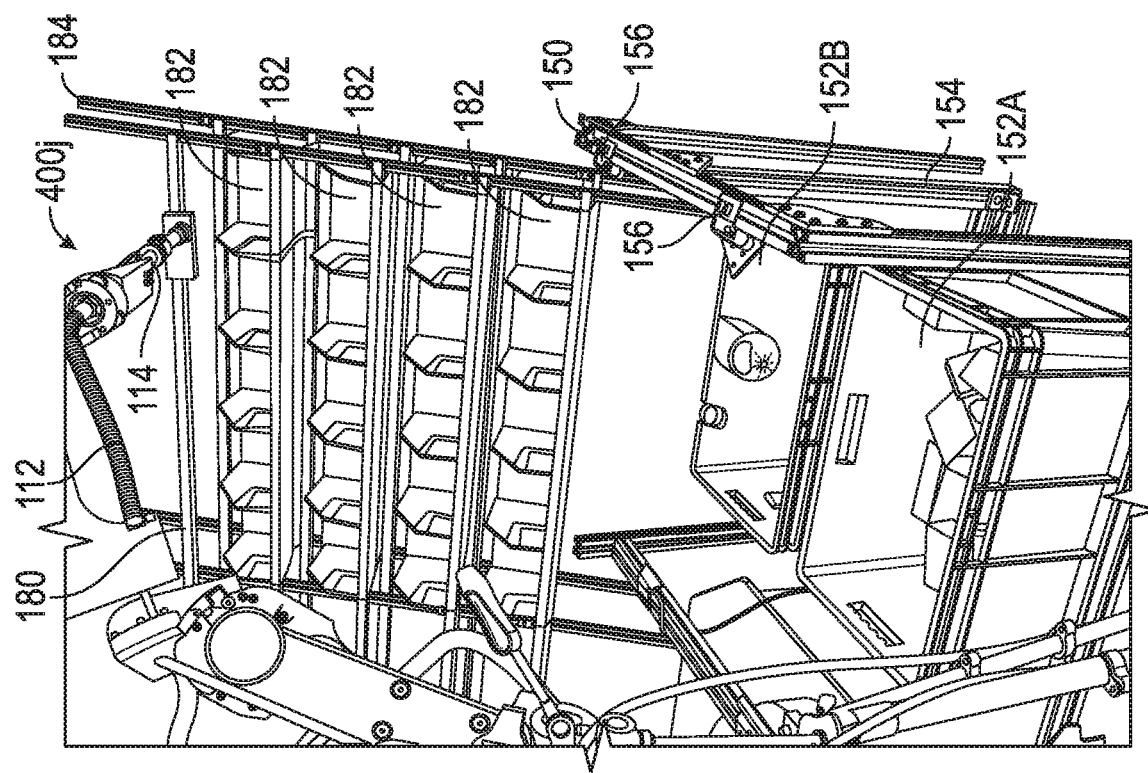
FIG. 4J illustrates exemplary placements of objects in accordance with some embodiments.

FIGS. 4D-4K show snapshots of an exemplary picking of an object 170A from a tote 152A and the placement of a first object 170A onto a shelf, bin 182A. In FIG. 4D, tote 152A contains several objects 170 to be picked and placed onto the shelf, bin 182A, which is tilting away from the robotic system 100. A robotic arm 102 with end effector 114 hovers above tote 152A as the robotic system captures image data for first object 170A using an image sensor. In FIG. 4E, robotic arm 102 lowers into tote 152A to acquire first object 170A using a suction. In FIG. 4F, robotic arm 102 picks up first object 170A and moves it toward a bar code scanner to be scanned. The movement includes translation, rotation, or a combination of both. In FIG. 4G, robotic arm 102 captures an image of first object 170A in order to identify its barcode. In FIG. 4H, robotic arm 102 rotates and/or translates first object 170A and continues to capture multiple images of it as the system identifies and reads the barcode. The barcode indicates the action to be taken on first object 170A. In this case, first object 170A is to be placed on the top rightmost cubby on the shelf, bin 182A. In FIG. 4I, the system determines a planned placement and a planned orientation of first object 170A relative to bin 182A and robotic arm 102 begins to move first object 170A towards bin 182A in accordance with that planned placement and planned movement. In FIG. 4J, robotic arm 102 reaches bin 182A and releases first object 170A into it. In FIG. 4K, robotic arm 102 returns to tote 152A and is ready to begin picking and placing a second object from the tote.

Figure 5A:
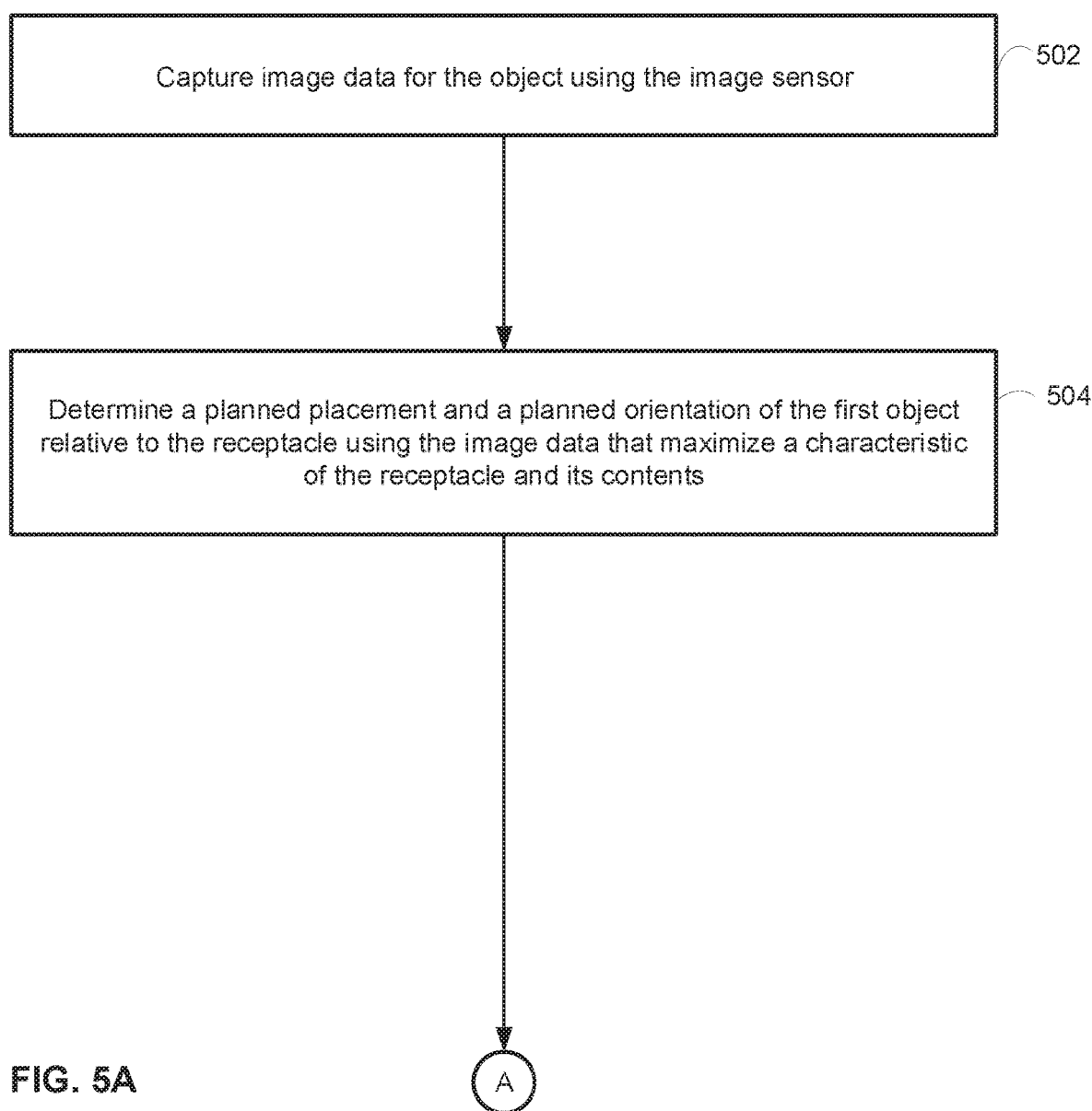
FIG. 5A is a flow diagram illustrating exemplary methods of placing objects in accordance with some embodiments.
Figure 5B:
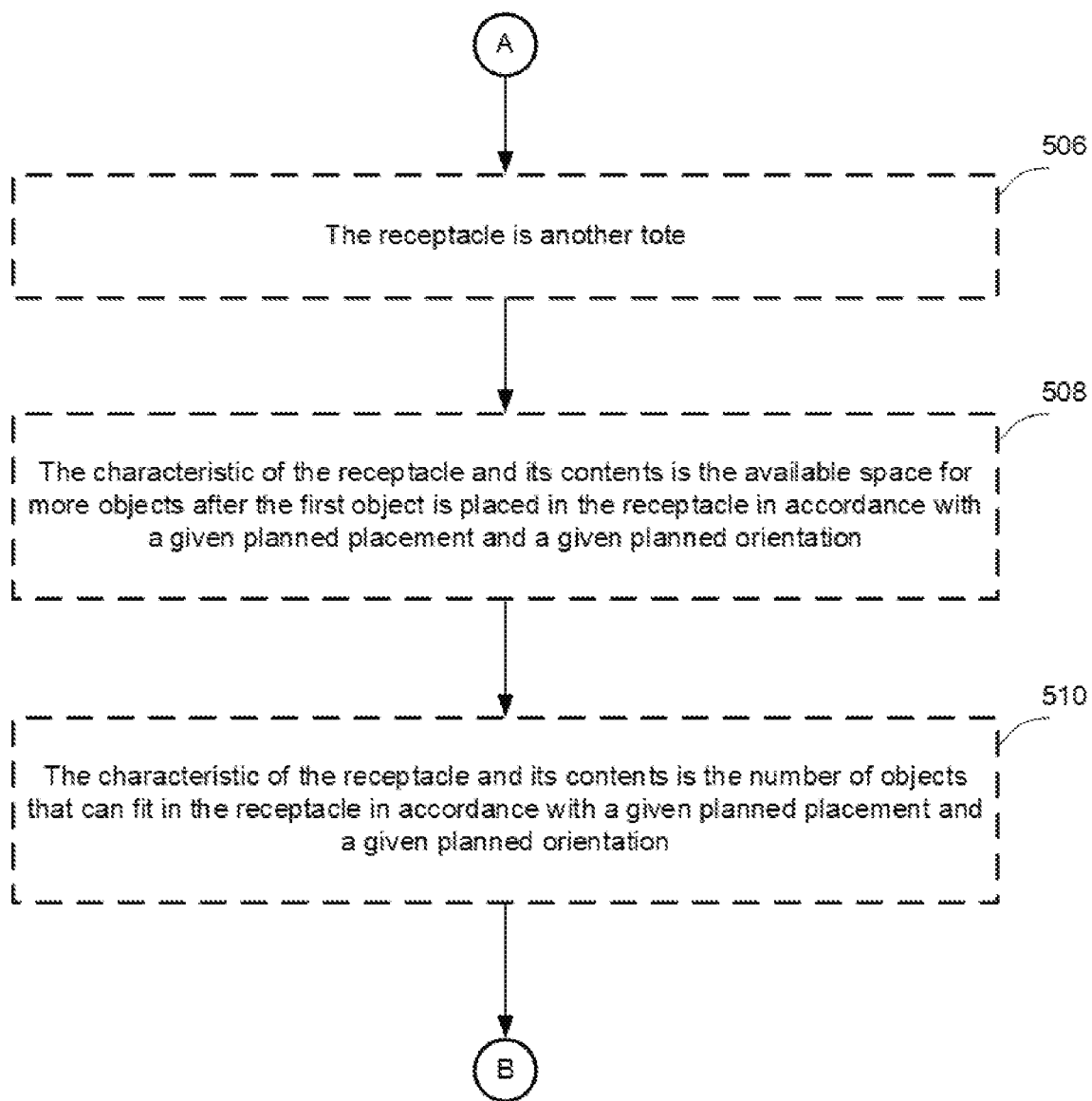
FIG. 5B is a flow diagram illustrating exemplary methods of placing objects in accordance with some embodiments.
Figure 5C:
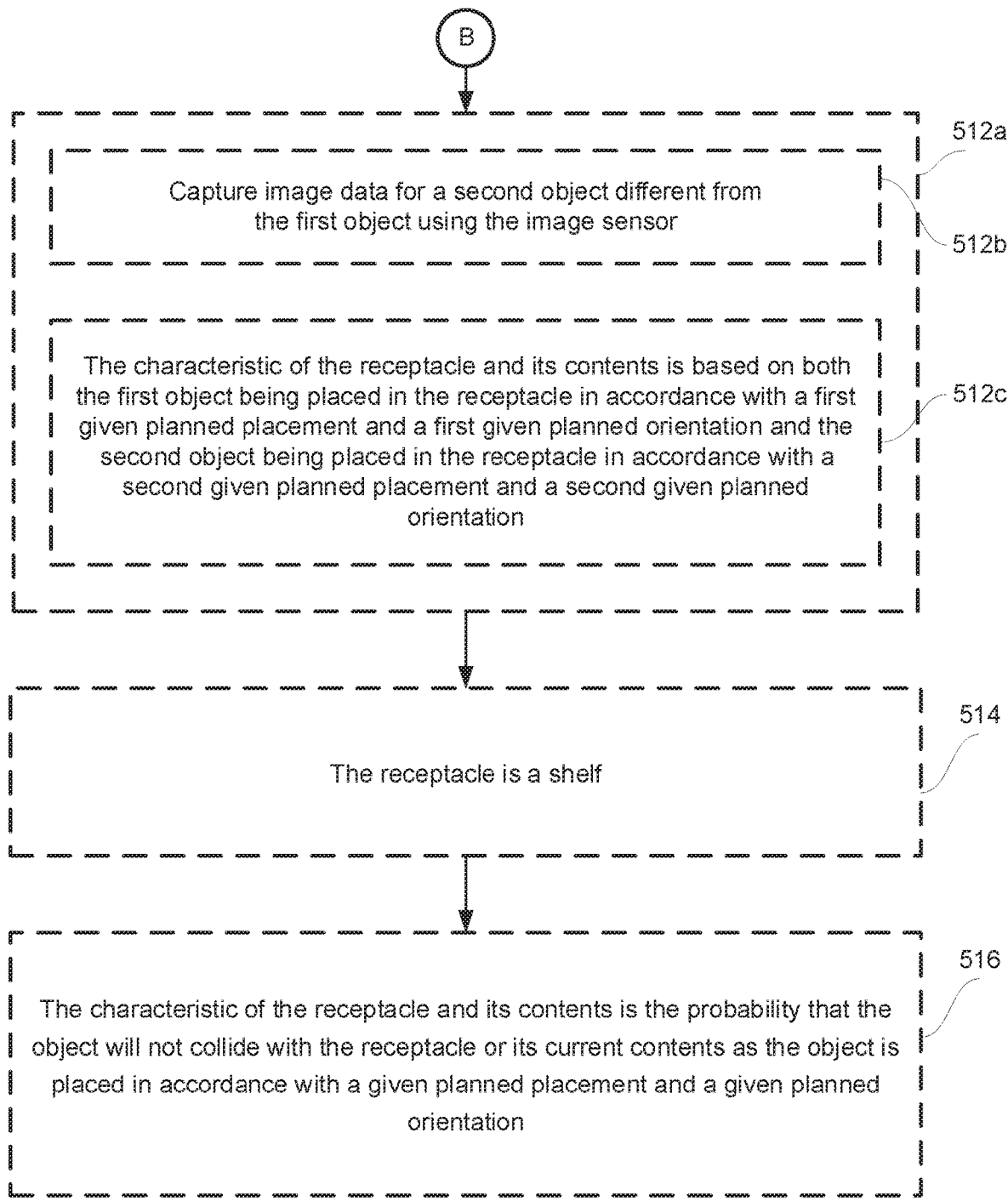
FIG. 5C is a flow diagram illustrating exemplary methods of placing objects in accordance with some embodiments.

FIGS. 5A-5C are flow diagrams illustrating a method 500 of placing objects in accordance with some embodiments. The method 500 is optionally performed at a robotic system as described above with reference to FIG. 1 and FIGS. 4A-4K. Some operations in method 500 are, optionally, combined and/or the order of some operations is, optionally, changed.

Figure 6A:
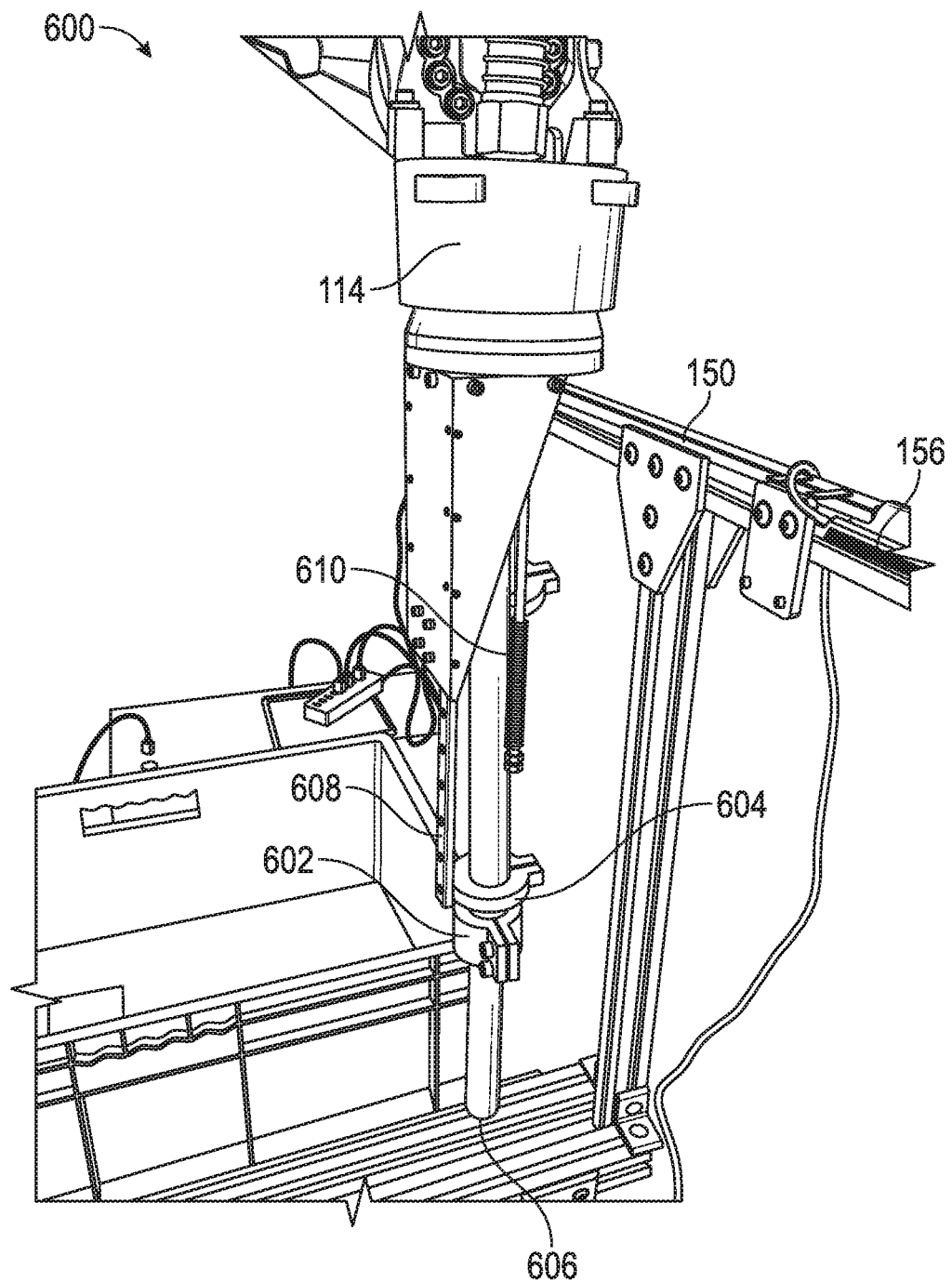
FIG. 6A illustrates an exemplary compliant end effector in accordance with some embodiments.

FIG. 6A depicts an example of end effector 114 (see FIG. 1). The end effector compliance is designed to minimize the risk of damage to the objects (e.g., due to imperfect perception from sensor data, such as captured image data, and processing algorithms) while the robotic system operates at a high motion speed (e.g., the end effector can contact an object at a higher speed when attempting to grasp the object). In addition to this feature or alternatively, the tote is attached to a compliant receptacle that effects the same relative motion between the end effector and the objects in the tote. In addition to avoiding the damage, the compliance here also ensures stable and firm contact with the object to guarantee a good seal or grip (in the case of gripper) despite the uncertainty of the exact location of the object due to imperfect image data and vision algorithms.

In this example of FIG. 6A, end effector 114 includes a suction gripper 602. This gripper uses a tube 604 to produce suction at end 606 to grip objects for picking and placing. End effector 114 also includes a compliance mechanism that allows for a greater tolerance in the amount of force that end effector 114 can apply to an object when attempting to grip the object. The compliance mechanism recoils when more than a threshold amount of pressure is applied to an object preventing damage to the object. For instance, when the contact force between an object and the end of the end effector is greater than the gravitational force on the moveable part of the end effector, the moveable part of the end effector will recoil. The threshold amount of force can be adjusted by adding components (e.g., springs, elastic components, actuators) to the end effector, as described below.

In the example of FIG. 6A, the compliance mechanism includes track 608 and optionally spring 610. As gripper 602 contacts an object, tube 604 will slide up along track 608. Spring 610 allows for tuning of the amount of force applied before the compliance mechanism is activated. As depicted in FIG. 6A, spring 610 increases the force needed to activate the compliance mechanism or alternatively provides additional force to return the moveable portion of the end effector after the force is removed. By changing the spring connection, however, the force needed to activate the compliance mechanism can also be reduced. Additionally, the amount of recoil can be tuned based on the movement tolerances of the robotic arm and errors associated with the vision system. In some other examples, the container for the objects being sorted (e.g., a tote) can also be supported by a compliance member (e.g., springs, foam, hydraulics) on sorting stand 150 or as an integrated part of the container. This compliance mechanism can be in place or in addition to the compliance mechanism on end effector 114. Optionally, gripper 602 can include a flexible suction nozzle on end 606 (see FIG. 1B). In some cases, end effector 114 allows for 100 mm or more of compliance.

FIGS. 6B-G depicts another example of end effector 620, with a compliance mechanism designed to minimize the risk of damage to an object (e.g., a package to be picked up) while the robotic system operates at a high motion speed and to ensure stable and firm contact with the object.

Figures 6B, 6C:
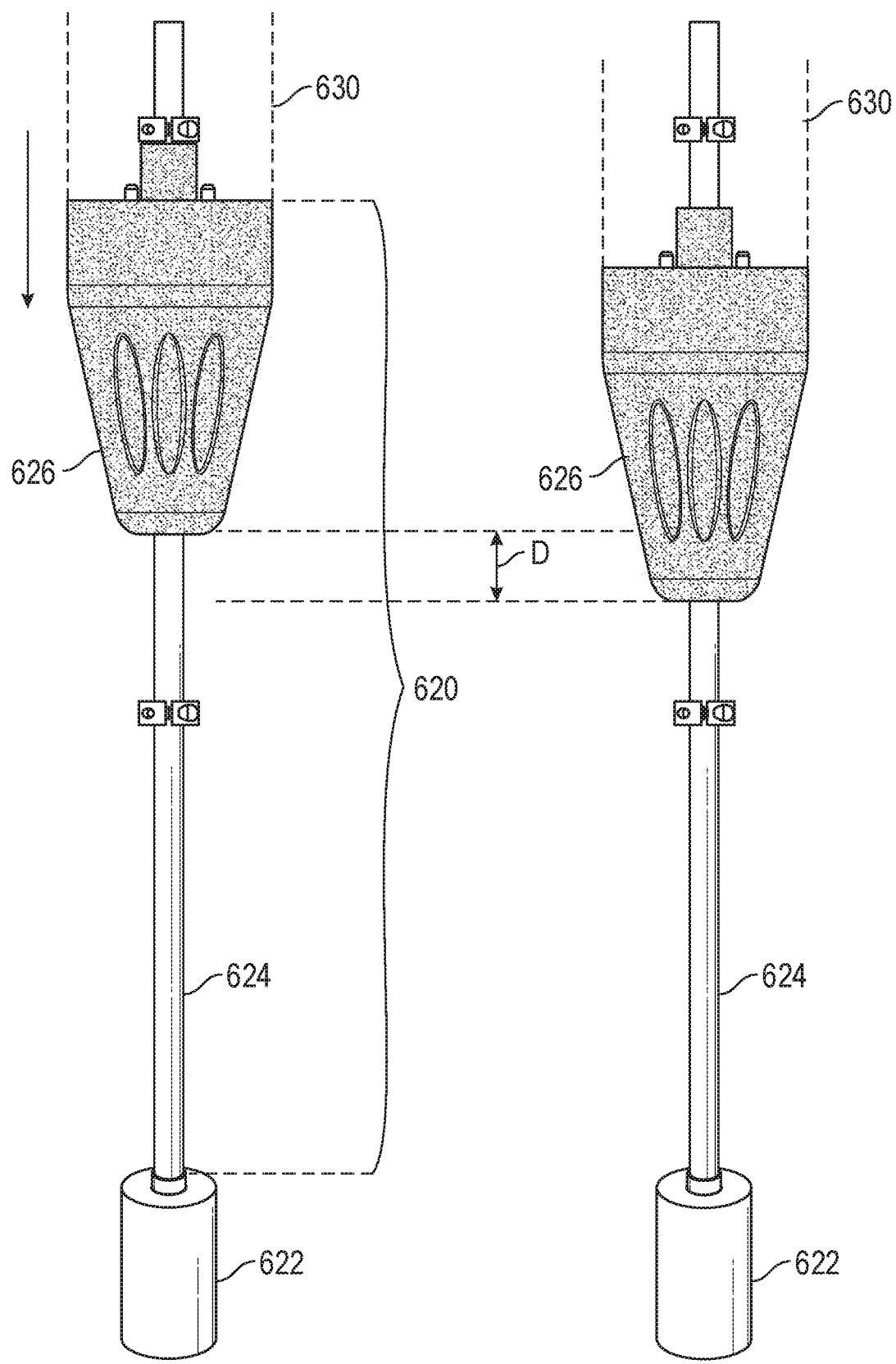
FIG. 6B illustrates an exemplary compliant end effector in accordance with some embodiments.
FIG. 6C illustrates an exemplary compliant end effector in accordance with some embodiments.

With reference to FIGS. 6B and 6C, the end effector 620 includes a rod 624 and a casing 626. The end effector 620 can further include any type of gripper (not depicted) attached to the distal end of the rod 624 for gripping and picking up objects. The end effector 620 can be attached to a motion device 630 (e.g., a robotic arm or a robotic arm phalange), such that the movement of the motion device causes movement of the end effector 620, as discussed further in FIGS. 19A-19D. In the depicted example in FIG. 6B, the robotic arm 630 moves downward, thus causing the end effector 620 to move downward until the distal end of the rod 624 of the end effector 620 comes in contact with a package 622.

If the robotic arm 630 continues moving downward when the distal end of the rod 624 is already in contact with the package 622, a compliance mechanism can be activated to prevent the distal end of the rod from moving further to minimize damage to the package 622. With reference to FIG. 6C, the robotic arm 630 continues moving downward, causing the casing 626 of the end effector attached to the robotic arm to move downward by a distance D. However, the compliance mechanism has been activated such that the distal end of the rod 624 does not move further. As shown in FIGS. 6B and 6C, the distal end of the rod 624 remains stationary, rather than colliding into the package 6C or pushing the package 622 away. Thus, the compliance mechanism minimizes damage to the package 622 even though the robotic arm 630 may operate (e.g., moving downward) at a high motion speed.

Figure 6D:
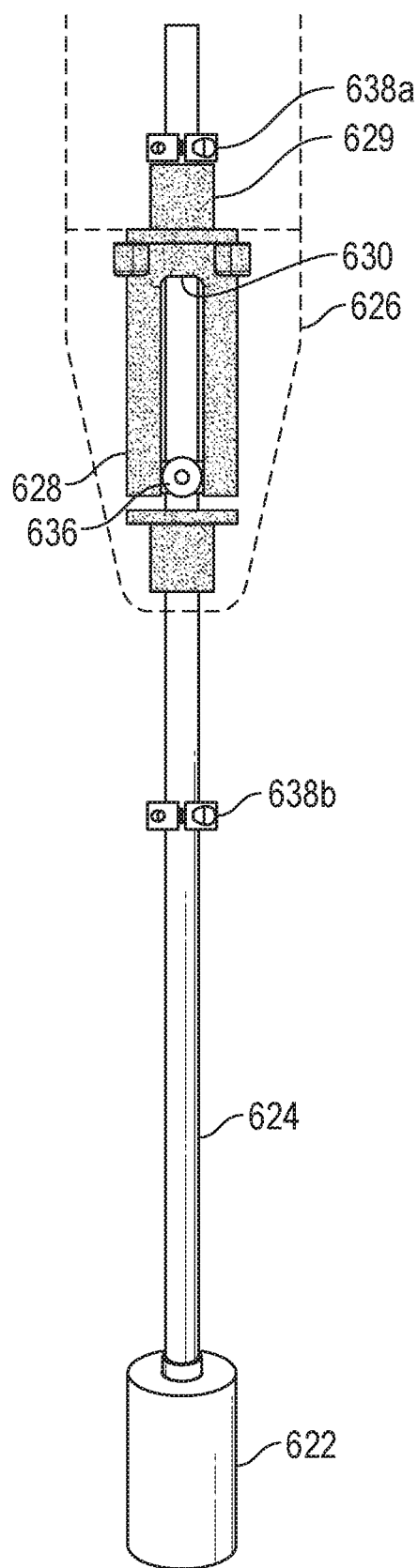
FIG. 6D illustrates an exemplary compliant end effector in accordance with some embodiments.
Figure 6E:
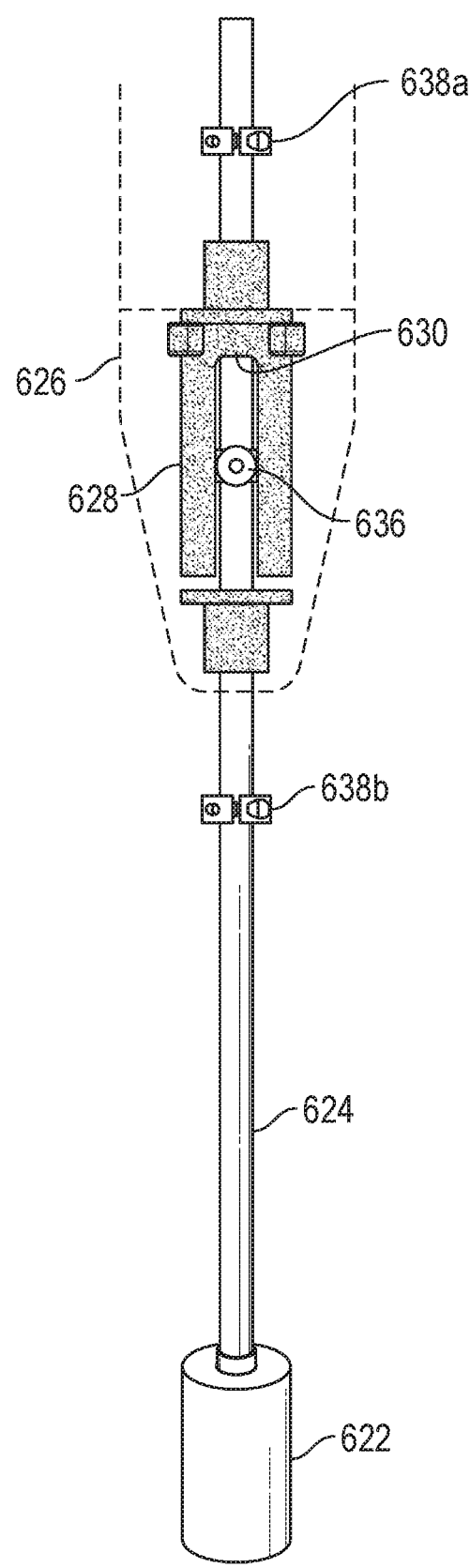
FIG. 6E illustrates an exemplary compliant end effector in accordance with some embodiments.

FIGS. 6D and 6E illustrate an exemplary operations of the compliance mechanism. With reference to FIG. 6D, the end effector comprises a sheath structure 628, which encloses a portion or a length of the rod 622. The sheath structure comprises a slot 630. Further, the rod 624 comprises a protruded piece 636 affixed to the rod, and the protruded piece 636 is positioned within the slot 630 of the sheath 628.

The sheath structure 636 is connected to the robotic arm 630 (FIG. 6B) and moves with the robotic arm. In other words, the sheath structure 636 remains stationary relative to the robotic arm. In FIG. 6D, the robotic arm has moved such that the distal end of the end effector is in contact with the object 622, similar to what is depicted in FIG. 6B.

When the robotic arm move further toward the package 622 and the distal end of the end effector is already in contact with the package 622, the compliance mechanism is activated such that the end effector does not damage the package 622. With reference to FIG. 6E, the robotic arm moves downward toward to the package 622 and causes the sheath structure 628 to move downward along the rod 624. The slot 630 of the sheath slides along the protruded piece 636 when the sheath structure 628 moves down the rod. The distal end of the rod 624 remains stationary, rather than colliding into the package 6C or pushing the package 622 away, similar to what is depicted in FIG. 6C.

As such, when the distal end of the end effector 620 contact the package 622 at a higher speed when attempting to grasp the package, the end effector does not collide into the package or push onto the package with significant force, thus minimizing the damage to the package. The compliance mechanism also ensures stable and firm contact with the object 622 to guarantee a good seal or grip.

In some embodiments, the sheath structure is configured to start moving along the rod when a resistance force between the distal end of the end effector and the object is above a predefined threshold. In some embodiments, the predefined threshold is 0.

Figure 6F:
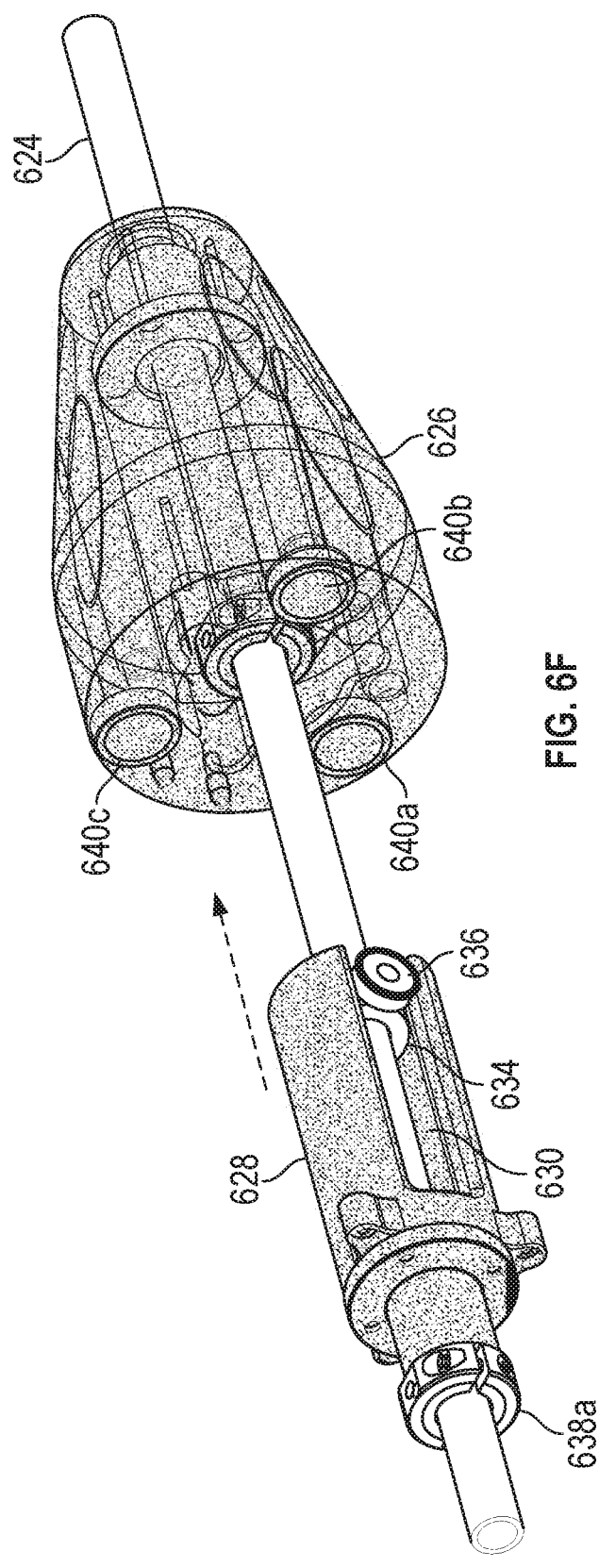
FIG. 6F illustrates an exemplary compliant end effector in accordance with some embodiments.
Figure 6G:
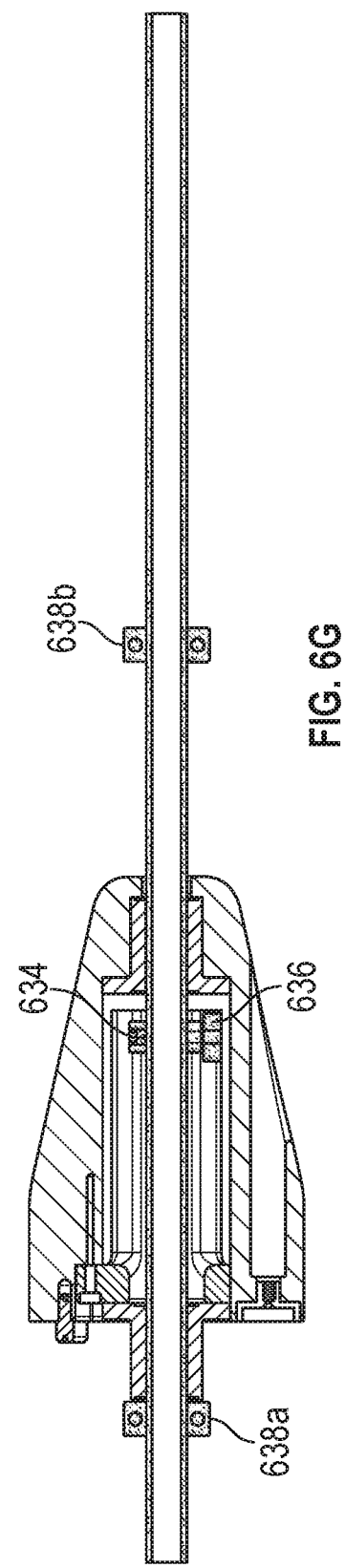
FIG. 6G illustrates an exemplary compliant end effector in accordance with some embodiments.

In some embodiments, the protruded piece is of a round shape. In some embodiments, the protruded piece is of a polygon shape. In some embodiments, the protruded piece 636 is affixed to a ring that wraps around the rod 624. As shown in FIGS. 6F and 6G, the protruded piece 636 is affixed to a ring 634, which wraps around the rod 624. As the dotted arrows in FIG. 6F indicate, the sheath structure 628 is to be enclosed within the casing 626.

In some embodiments, the end effector is coupled to the motion device via one or more magnetic components on the end effector. As shown in FIG. 6F, the end effector comprises magnets 640a, 640b, and 640c, for coupling with the robotic arm. The magnetic coupling mechanism is described in further detail below.

With reference to FIGS. 6D and 6E, in some embodiments, the end effector comprises a first end stopper 638a and a second end stopper 638b on the rod. The two end stoppers are affixed to the rod. Further, the casing 626 enclosing the sheath structure is placed between the first end stopper and the second end stopper. As such, when the end effector is not coupled to a motion device (e.g., a robotic arm), the end stoppers prevent the sheath structure and the casing from sliding off the rod 624. When the end effector is coupled with the robotic arm (e.g., via magnets 640a-c), the end piece 629 may be flush against the first end stopper 638 (as shown in FIG. 6D). When the compliance mechanism is activated, the casing 626 can move along the rod until the distal end of the casing reaches the second end stopper 638b or until the protruded piece 636 reaches the end of the slot 630.

In some embodiments, the distal end of the end effector comprises a gripper. In some embodiments, the gripper comprises a suction cup, and the hollow center of the rod 624 is configured to enable vacuum pass-through to produce suction at the distal end to grip objects for picking and placing. In some embodiments, the distal end of the end effector comprises other types of tools such as polishing tools, welding guns, or a combination thereof.

In some embodiments, the system comprises one or more sensors for detecting whether the compliant mechanism has been activated and how much retraction has occurred. The one or more sensors can include hall-effect sensors or inductance sensor. In some embodiments, the one or more sensors are mounted on the sheath structure to detect relative movement between the sheath structure and the protruded piece. In accordance with a determination that the compliant mechanism has been activated and/or the extent of retraction, the system can stop moving the robotic arm to prevent a collision.

In some embodiments, when the object is picked up (e.g., via suction cup) and lifted up in the air, the rod 624 can slide downward due to gravity until the end piece 629 is in contact with the end stopper 638a, thus returning to the extended length shown in FIG. 6D.

Figure 7:
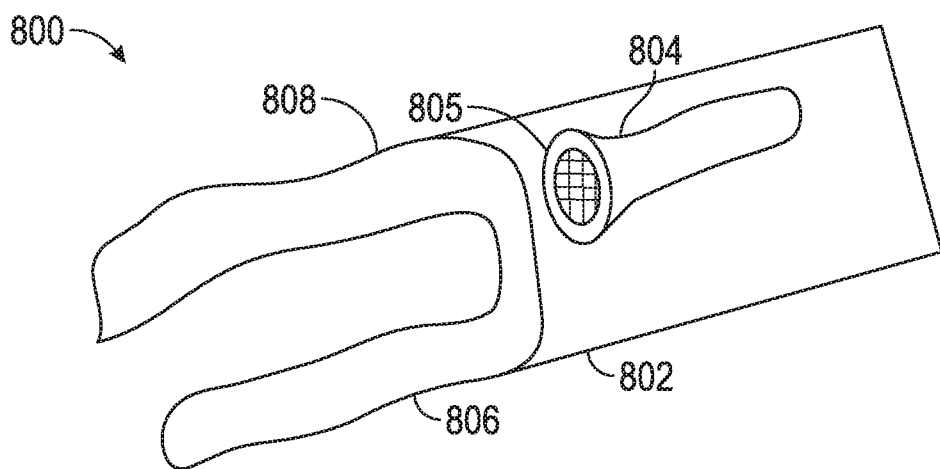
FIG. 7 illustrates an exemplary system for switching end effectors between a gripper and various suction nozzles as well as between high-vacuum and high-flow suction systems in accordance with some embodiments.
Figure 8:
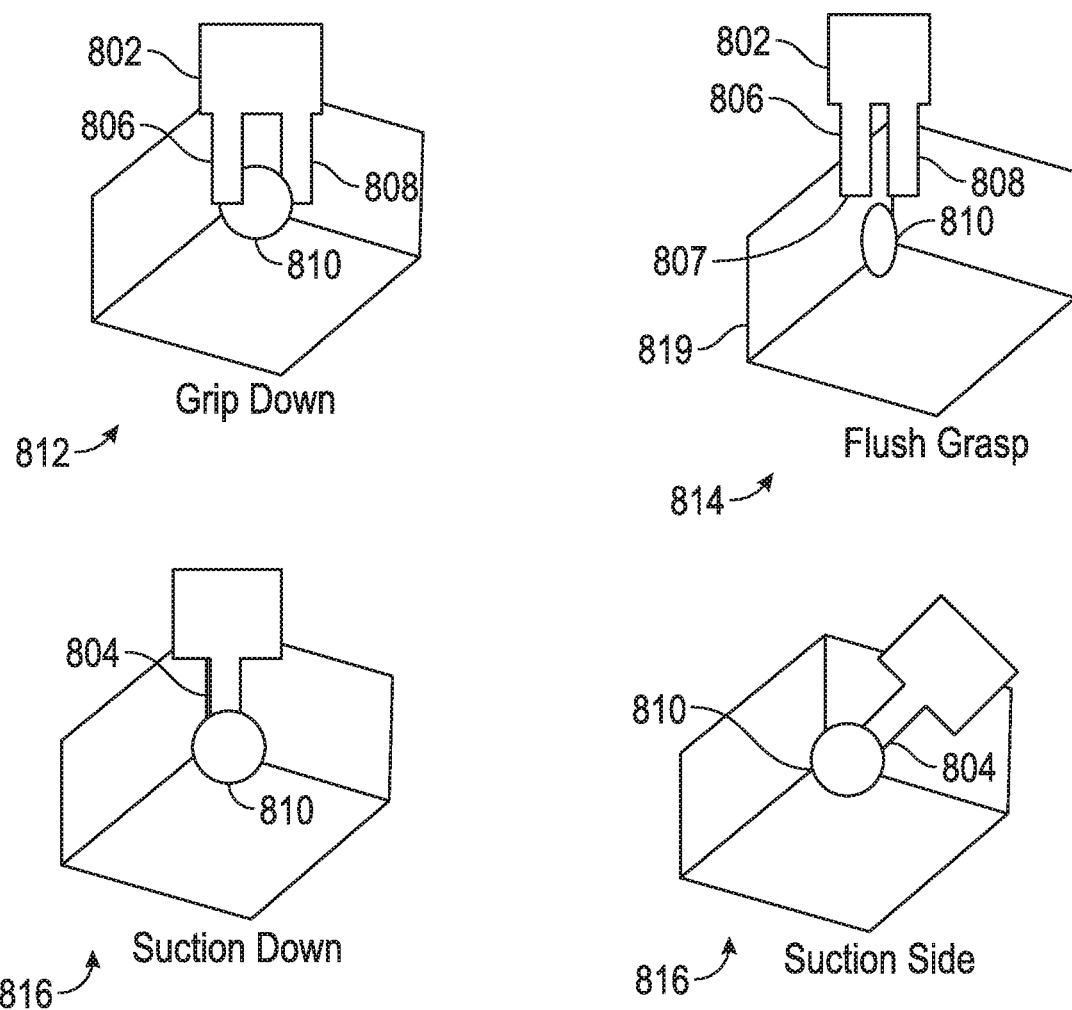
FIG. 8 illustrates an exemplary system for switching end effectors between a gripper and various suction nozzles as well as between high-vacuum and high-flow suction systems in accordance with some embodiments.

FIGS. 7-9 illustrate exemplary systems for switching configurations of an end effector between different types of grippers, such as finger grippers and various suction nozzles, as well as between high-vacuum and high-flow suction systems in accordance with some embodiments. The robotic system, such as system 100 described above, determines whether gripping at a particular location by a finger gripper or by a suction gripper would be more effective, and if by suction, what suction nozzle size is suitable. The robotic system contains both high-vacuum and high-flow suction systems. The system determines which of the two systems to use given the task at hand, and switches between the two accordingly.

The end effector can switch configurations by changing the properties of how the end effector grips or grasps an object. For example, one configuration of the end effector causes finger grippers to be used while another configuration causes the end effector to use a suction gripper. In this example, both grippers are coupled to the end effector but only one is configured for use at a time. Alternatively, only one of the grippers is present on the end effector and the two different grippers are automatically switched as necessary. In another example, two configurations for the end effector both use a suction gripper but the suction gripper is configured differently in each case. For instance, one configuration uses a high-level vacuum for suction and another uses a high-flow suction. These different configurations can be implemented using two different suction sources (e.g., a vacuum source and a high-flow generator) and switched using a valve or other technique.

Embodiments of the robotic system determine probability maps for a plurality of different end effector configurations. The probability maps describe the change of a successful grasp at various locations in a scene containing one or more (generally a plurality) of objects. The system then picks a configuration based on any combination of factors, such as the configuration with the highest success probability, the configuration that will produce the fastest cycle time, the cheapest configuration, the configuration least likely to result in damage to an object, or other similar factors.

FIG. 7 illustrates a robotic system according to various embodiments of the present disclosure. Robotic system 800 (partially shown) includes an end effector 802 having two fingers, a first finger 806 and a second finger 808, where the robotic system 800 is configured to pick an object by gripping the object 809 using the two gripper fingers 806 and 808 of the gripper end effector 802. Robotic system 800 also includes a suction gripper end effector 804 having a suction nozzle 805 and one or more suction generators (not shown), where the robotic system 800 is configured to pick an object using the suction gripper having a suction nozzle 805. In some embodiments, the suction nozzle 805 can have various sizes and shapes.

FIG. 8 illustrates exemplary motion primitives of the robotic system according to various embodiments of the present disclosure. Grip down motion primitive 812 optionally grips object 810 vertically using the gripper end effector 802 having two parallel fingers 806 and 808. The grip down motion primitive 812 can be used to pick up objects with smaller, irregular surfaces (e.g. small tools, deformable objects), or made of semi-porous materials that prevent a suction seal (e.g. cloth). Flush grip motion primitive 814 is optionally similar to the grip down motion primitive 812, but with the additional motion of using a flexible spatula 807 attached to the first finger 806 of the grip end effector 802 to slide the finger 806 between the object (e.g., 810) and a side of the receptacle 819 containing the object 810. Suction down motion primitive 816 optionally picks the object 810 vertically by placing the suction end effector 804 substantially vertically on the object 810 and generating a suction force. The suction down motion primitive 816 is effective for picking objects with large and flat suctionable surfaces (e.g. boxes, books, wrapped objects) or objects in heavy clutter (e.g., among a large number of other objects in the scene). Suction side motion primitive 818 optionally picks the object from an angle that is not substantially vertical by approaching with a suction end effector tilted at an angle other than substantially vertical. The suction down motion primitive is effective for picking thin and flat objects resting against a side of a receptacle containing the object, which may not have suctionable surfaces from the top.

FIG. 9 illustrates exemplary processes by which robotic system 100 determines to pick an object using a motion primitive associated with a suction gripper end effector (e.g., 804) according to various embodiments in the present disclosure. A simulation 821 of a robotic system 100 picking scene 822, i.e., a representation (e.g., visual representation, such as an image) is shown. Scene 822 of the physical environment in which the robotic system operates) optionally includes a plurality of objects (e.g., a cluttered scene). The robotic system (e.g., 100) optionally determines, using machine learning algorithms 824, a plurality of pixel-wise probability density maps 826 of scene 822, where each probability density map corresponds (one-to-one in some embodiments) to a motion primitive associated with the suction end effector (e.g., suction down primitive 816 or suction side primitive 818). A probability density map 826 may optionally be depicted as a grayscale image where, for example, regions 827a with 0% probability of success are labeled black, regions 827b with 100% probability of success are labeled white, and regions 827c with probabilities of success between 0% and 100% are in shade of grays that correspond to those probabilities. These pluralities of pixel-wise probability maps are translated into a plurality of maps that categorize each pixel. Map 828, which corresponds to scene 822 and is generated from the plurality of probability density maps 826, shows regions 829a (e.g. represented as blue) that are categorized as candidate locations to attempt picking, and subsets 829b of those regions (e.g. represented as magenta) that are categorized as the best locations to attempt first. In some embodiments, the robotic system 100 then chooses a suction motion primitive (e.g., suction down primitive 816) and a proposed suction point location to execute the chosen motion primitive. In other embodiments, the robotic system 100 executes one or more of the pushing, toppling, and pulling primitives on one or more objects to rearrange the scene before executing a suction motion primitive, which makes one or more better grasp points accessible to the robotic arm.

In some embodiments, robotic system 100 is configured to determine picking an object using a motion primitive associated with a grip end effector (e.g., 802) according to various embodiments in the present disclosure. In some embodiments the robotic system (e.g., 800) optionally processes a representation of the scene 822 by rotating the representation around the vertical axis at various angles, and determines a pixel-wise probability map of the scene for each gripper orientation. The robotic system 100 optionally determines a vertical column of 3D space in a 3D representation of scene as a 3D grip location. In some embodiments the robotic system 100 optionally determines, using machine learning algorithms, a plurality of pixel-wise probability maps of the scene 822. In some embodiments the robotic system 100 then chooses a grip motion primitive (e.g., grip down primitive 812) and a proposed grip point location to execute the motion primitive.

In various embodiments of the present disclosure, a robotic system can use suction or grip to pick an object. In various embodiments, the robotic system can further determine whether to use suction or grip to pick an object, what motion primitive to use, among other parameters. In some embodiments, the robotic system optionally has one or more arms. In some embodiments the robotic system can operate in one or more axes (i.e., degrees of freedom). In some embodiments, the robotic system optionally operates with six axes (i.e., a six-axis robotic system). In some embodiments, a robotic system (e.g., a pick and place robotic system 800) optionally has a first end effector (e.g., 804) and a second end effector (e.g., 802). In some embodiments, the robotic system (e.g., 800) optionally includes one or more end effectors configured to manipulate (e.g., pick, move, rotate, or place) an object. In some embodiments, when performing a task (e.g., picking an object having a certain size, shape, or composition, etc.) the robotic system (e.g., 800) optionally chooses an end effector among multiple end effectors.

In some embodiments, the first end effector (e.g., 804) is optionally configured to pick an object using suction, and the second end effector (e.g., 802) is configured to pick the object using grip (that is, each end effector is configured to pick an object using either suction (e.g., suction end effector) or grip (e.g., grip end effector). In some embodiments a suction end effector optionally picks up an object by pressing against a surface of the object and creating a suction force through the end effector. In some embodiments, a grip end effector uses a plurality of (e.g., two) grippers to grip the object.

In some embodiments, the robotic system (e.g., 800) optionally determines a plurality of probability maps of a scene including the object and at least one other object. In some embodiments, the scene (e.g., 822) includes the object to be picked and at least another object (e.g., the scene is cluttered). In some embodiments, the object and the another object can be different types. In some embodiments, each probability map corresponds respectively to a different motion primitive among a plurality of motion primitives. In some embodiments, the robotic system (e.g., 100 or 800) has one or more motion primitives (e.g., predefined motions that the robotic system can take). In some embodiments, each motion primitive is associated with a corresponding probability map (e.g., 826 or 836). In some embodiments, each motion primitive and its corresponding probability map optionally has a one-to-one correspondence.

In some embodiments, each motion primitive is associated with using the first end effector (e.g., 804) or the second end effector (e.g., 802) to pick the object; in other words, each motion primitive of the robotic system is associated with picking the object using either a suction end effector (e.g., a suction motion primitive such as 816 or 818) or a grip end effector (e.g., a grip motion primitive such as 812 or 814).

In some embodiments, the robotic system (e.g., 800) optionally chooses a motion primitive among a plurality of motion primitives to use in picking the object (e.g., 810) based on the plurality of probability maps. In some embodiments, the robotic system (e.g., 800) optionally chooses the motion primitive whose corresponding probability map indicates the highest likelihood of picking the object (e.g., 810) successfully.

In some embodiments, the plurality of motion primitives optionally include a first motion primitive (e.g., 812) using the second end effector (e.g., 802). In some embodiments, the plurality of motion primitives optionally include a second motion primitive (e.g., 814) different from the first motion primitive (e.g., 812) using the second end effector. In some embodiments, the first motion primitive (e.g., 812) and the second motion primitive (e.g., 814), different from the first motion primitive (e.g., 812), are optionally associated with using the suction end effector to pick the object. In some embodiments, the plurality of motion primitives optionally includes a third motion primitive (e.g., 816) using the first end effector (e.g. 804) and a fourth motion primitive (e.g., 818) different from the third motion primitive using the first end effector. In some embodiments, the third motion primitive and the fourth motion primitive, different from the third motion primitive, are optionally associated with using the grip end effector to pick the object.

In some embodiments, the plurality of motion primitives optionally includes a gripping down motion primitive using the second end effector (e.g., 802), which grips objects vertically using a grip end effector (e.g., 802) having two parallel gripper fingers (e.g., 806 and 808). In some embodiments, the plurality of motion primitives optionally includes a flush gripping motion primitive (e.g., 814) using the second end effector (e.g., 802). In some embodiments, the flush gripping motion primitive (e.g., 814) is similar to the grip down motion primitive, but with the additional motion of using a flexible spatula (e.g., 807) attached to the grip end effector to slide one gripper between the object (e.g., 810) and a side of a receptacle (e.g., 809) containing the object. In some embodiments, the plurality of motion primitives optionally includes a suction down motion primitive (e.g., 816) using the first end effector (e.g., 804). In some embodiments, the suction down motion primitive optionally picks the object (e.g., 810) vertically by placing a suction end effector substantially vertically on the object (e.g., 810) and generating a suction. In some embodiments, the plurality of motion primitives optionally includes a suction side motion primitive (e.g., 818) using the first end effector (e.g., 804). In some embodiments, the fourth motion primitive associated with using the suction end effector to pick the object (e.g., 810) is optionally a suction side motion primitive. In some embodiments, the suction side motion primitive optionally picks the object (e.g., 810) from an angle that is not substantially vertical by approaching with a suction end effector tilted at an angle other than substantially vertical.

In some embodiments, the robotic system (e.g., 800) further determines a plurality of probability maps (e.g., 826 and 836) of the scene including the object (e.g., 810) and at least another object In some embodiments, the robotic system (e.g., 800) has not determined previously a probability map of a scene including the object (e.g., 810). In other words, the object (e.g., 810) to be picked and other objects in the scene are optionally novel, and the robotic system (e.g., 800) can pick the object (e.g., 810) without any a priori training for objects that have not previously appeared in a scene for which the robotic system (e.g., 800) has determined a probability map.

In some embodiments, the plurality of probability maps are optionally pixel-wise probability maps. In other words, the robotic system (e.g., 800) optionally assigns a probability value to each pixel of a digital image of the scene. In some embodiments, the plurality of probability maps are pixel-wise binary probability maps (i.e., positive or negative).

In some embodiments, the robotic system (e.g., 800) optionally determines a probability map of the scene (e.g., 836) corresponding to a motion primitive associated with the first end effector (e.g., 804) by determining a proposed suction point (e.g., a three-dimensional position where a suction end effector should come in contact with the object's surface in order to pick and lift it successfully) corresponding to a pixel of an image of the scene (i.e., each pixel corresponds to a different position on which to execute the primitive), a local geometrical quantity of the proposed suction point (e.g., computed from a projected 3D point cloud), and a probability (e.g., between zero and one, where a value closer to one implies a more preferable suction point) of picking the object (e.g., 810) at the proposed suction point using a machine learning algorithm (e.g., 826). In some embodiments, the robotic system (e.g., 800) optionally outputs a pixel-wise binary probability map of the scene. In some embodiments, the pixel-wise binary probability map of the scene is optionally based on the determination of the proposed suction point, the local geometrical quantity of the proposed suction point, and the probability of pick the object (e.g., 810) at the proposed suction point.

In some embodiments, the first end effector (e.g., 804) is optionally configured to couple with a first attachment (e.g., suction nozzle 807). In some embodiments the robotic system (e.g., 800) optionally chooses a suction nozzle among multiple available suction nozzles having various sizes, shapes, etc., and optionally couples the suction nozzle with the suction end effector. In some embodiments, the robotic system (e.g., 800) optionally determines a probability map of the scene that corresponds to each configuration of a suction nozzle coupled with the suction end effector. In some embodiments, the robotic system (e.g., 800) optionally determines a plurality of probability maps of a scene by determining a first probability map of the scene corresponding to a motion primitive associated with the first end effector (e.g., 804) coupled with the first attachment (e.g., suction nozzle 807).

In some embodiments, the robotic system (e.g., 800) optionally includes a first suction generator (e.g., a vacuum pump) configured to generate suction and a second suction generator different from the first suction generator. In some embodiments, the first suction generator and the second suction generator are of different types (e.g., a vacuum pump and a high-flow air blower or exhauster). In some embodiments, the robotic system (e.g., 800) chooses a motion primitive among a plurality of motion primitives to use in picking the object (e.g., 810) based on the plurality of probability maps by: in accordance with the chosen motion primitive (e.g., 816 or 818) being associated with using the first end effector (e.g., 804), determining whether to generate suction using the first suction generator (e.g., a vacuum pump) or the second suction generator (e.g., a high-flow air blower or exhauster). In other words, in some embodiments where the robotic system (e.g., 800) chooses a motion primitive associated with using the suction end effector to pick the object (e.g., 810) (e.g., the suction down motion primitive 816 or the suction side motion primitive 818), the robotic system (e.g., 800) optionally determines which type of suction generator should be used to generate the suction force. In some embodiments, because different types of suction generators have different suction force characteristics (e.g., a high-flow suction generator is optionally more effective than a vacuum pump suction generator for picking an object with a porous surface such as fabrics), the robotic system (e.g., 800) optionally determines a probability map of the scene that corresponds to each configuration of the suction end effector coupled with the vacuum pump suction generator or the high-flow suction generator.

In some embodiments, the robotic system (e.g., 800) optionally includes a first sensor measuring a first property associated with the first suction generator, and a second sensor measuring a second property different from the first property associated with the second suction generator. In some embodiments, where the robotic system (e.g., 800) uses a suction motion primitive (e.g., suction down primitive or suction side primitive) to pick an object and where the robotic system (e.g., 800) optionally includes both a high-level vacuum pump suction generator and a high-flow air exhauster suction generator, different types of sensors are optionally used to measure the suction when the suction end effector is in contact with the object. In some embodiments, in accordance with determining to generate suction using the first suction generator, the robotic system (e.g., 800) optionally determines a first end effector's suction grip based on the first property measured at the first sensor, and in accordance with determining to generate suction using the second suction generator, the robotic system (e.g., 800) optionally determines the first end effector's suction grip based on the second property measured at the second sensor. For example, in some embodiments, where a vacuum pump suction generator is used to generate suction, a vacuum pressure sensor is optionally used to measure the air pressure; the air pressure is in turn indicative of the level of suction grip the suction end effector has on the object (e.g., 810) (e.g., lower air pressure indicates a more secure suction grip, and vice versa). In some embodiments, where a high-flow suction generator is used to generate suction, a mass airflow sensor is optionally used to measure the air flow rate, which is in turn indicative of the level of suction grip the suction end effector has on the object (e.g., 810) (e.g., lower air flow rate indicates a more secure suction grip, and vice versa).

In some embodiments, the robotic system (e.g., 800) optionally determines a probability map of the scene corresponding to a motion primitive associated with the second end effector (e.g., 802) by determining a proposed three-dimensional (3D) grip location corresponding to a three-dimensional representation of the scene. In some embodiments, the robotic system (e.g., 800) optionally determines a vertical column of 3D space in the scene as a 3D grip location. In some embodiments, the robotic system (e.g., 800) optionally determines a middle point between a first gripper and a second gripper of the second end effector. In some embodiments, the robotic system (e.g., 800) optionally determines an angle corresponding to the orientation of the first gripper and the second gripper (e.g., an angle which defines the orientation of the gripper around the vertical axis along the direction of gravity). In some embodiments, the robotic system (e.g., 800) optionally processes the visual representation of the scenes to account for a plurality of different gripper orientations around the vertical axis and determines a pixel-wise probability map of the scene for each gripper orientation. In some embodiments, the robotic system (e.g., 800) optionally determines a width between the first gripper and the second gripper at the proposed grip location (e.g., based on the 3D visual representation of the scene). In some embodiments, the robotic system (e.g., 800) optionally determines a probability of picking the object (e.g., 810) at the proposed three-dimensional location. In some embodiments, the robotic system (e.g., 800) optionally outputs a pixel-wise binary probability map of the scene. In some embodiments, the robotic system (e.g., 800) outputs a pixel-wise binary probability map of the scene based on the determination of the proposed grip point, the local surface geometry of the proposed suction point, and the probability of picking the object (e.g., 810) at the proposed suction point.

In some embodiments, the robotic system (e.g., 800) optionally determines the distance between the proposed three-dimensional grip location relative to a side of a receptacle containing the object (e.g., 810) and the at least one other object. That is, the robotic system (e.g., 800) optionally determines the distance of each proposed grip point from sides of the receptacle. In some embodiments, the robotic system (e.g., 800) optionally determines whether to use the third motion primitive (e.g., 812) or the fourth motion primitive (e.g., 814) based on the plurality of probability maps, the width between the first gripper and the second gripper at the proposed grip location, and the distance between the proposed three-dimensional grip location relative to a side of a receptacle containing the object (e.g., 810) and the at least one other object. In some embodiments, the robotic system (e.g., 800) optionally determines whether to use the grip down motion primitive or the grip side motion primitive based on the probability maps, and the distance between the proposed three-dimensional grip location relative to the sides of the receptacle containing the object (e.g., 810) and other objects.

Figure 10A:
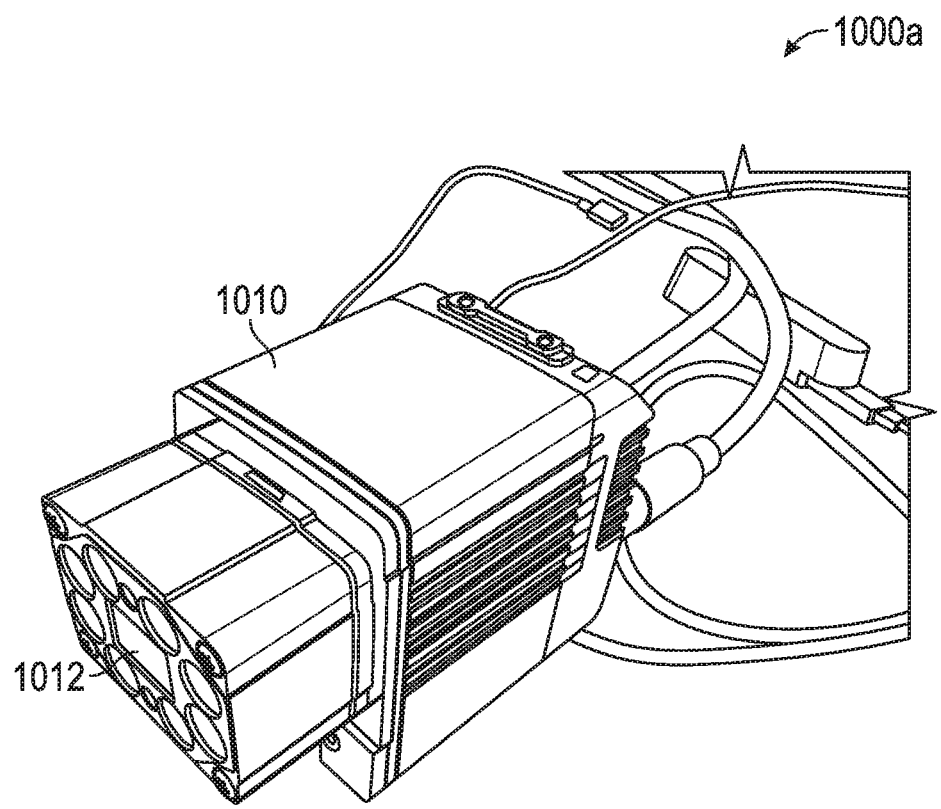
FIG. 10A illustrates an exemplary system for detecting barcodes in order to avoid picking on them in accordance with some embodiments.
Figure 10B:
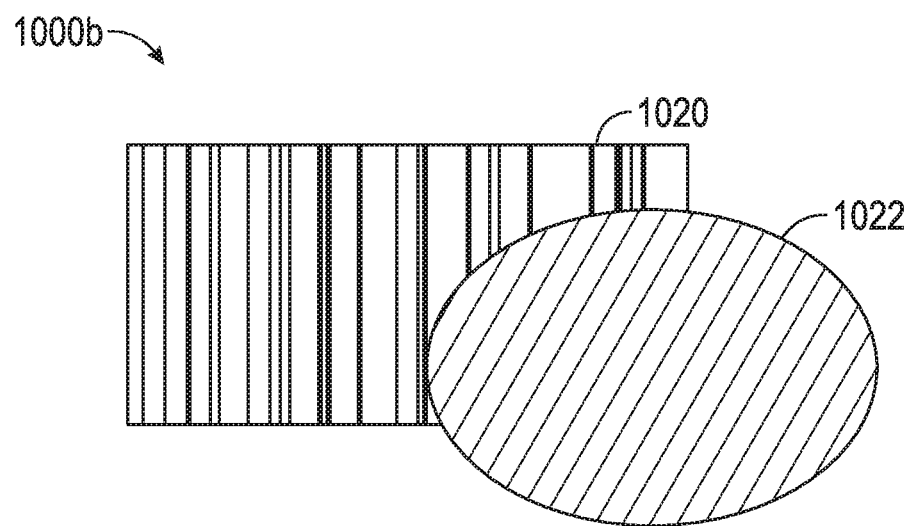
FIG. 10B illustrates an exemplary system for detecting barcodes in order to avoid picking on them in accordance with some embodiments.
Figure 10C:
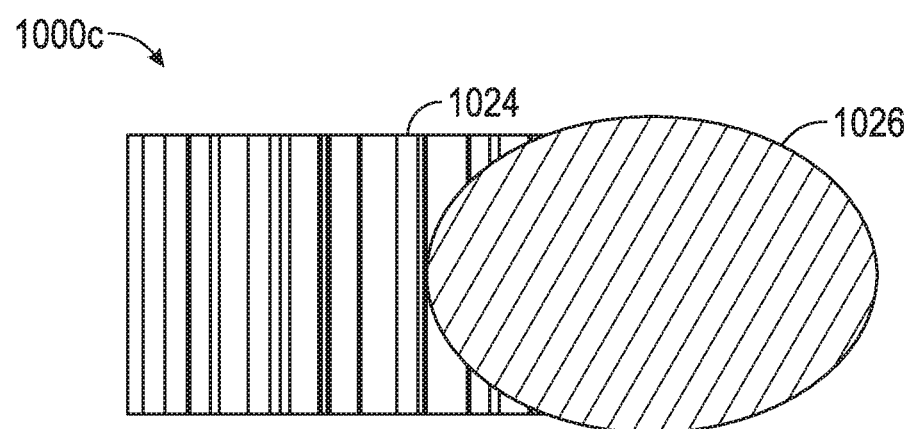
FIG. 10C illustrates an exemplary system for detecting barcodes in order to avoid picking on them in accordance with some embodiments.

FIGS. 10A-10C illustrate exemplary systems for detecting barcodes in order to avoid picking on them in accordance with some embodiments. The robotic system takes an image and then identifies a location for picking, either by suction or with a gripper as the end effector. The location is selected based on a success probability map across the pixels of the image, wherein the probability map is generated from a machine learning algorithm.

In some embodiments, the robotic system comprises a robotic arm, an acquisition device (e.g., an end effector), an image sensor, a database, and a processor. The robotic system determines a location in a scene, wherein the scene includes a plurality of objects to be picked, for a robotic system to acquire an object in the plurality of objects. There may be no specific instruction as to which object is picked up first. Such a system may have been trained on a dataset where users have indicated suitable locations to pick up objects in various scenes. This dataset is stored in the database.

First, the system captures image data for the scene using the image sensor. The image sensor may be a depth-sensing device that produces depth information for image recognition and other artificial intelligence techniques in addition to taking images. Second, the system generates, based on the image data for the scene, a probability map comprising a plurality of probabilities each corresponding to a region in a plurality of regions on the object, wherein the plurality of probabilities is based on the likelihood that the corresponding region in the plurality of regions is a barcode portion, and data stored in the database. The resolution of the probability map may be as high as the image data. In other embodiments, the resolution of the probability map is on par with the resolution of the robotic arm and acquisition device (e.g., an end effector). In some embodiments, the probabilities are determined with machine learning algorithms trained on the dataset stored in the database.

Next, the system determines a location on the object by selecting a region on the object corresponding to a probability in the plurality of probabilities that exceeds a threshold probability. The threshold probability indicates an acceptable chance that attempting to pick up the object at that location will succeed. The threshold probability may be, for example, 90%, 95%, or 99%. In some embodiments, the user may set the threshold probability. In other embodiments, the threshold probability is determined by other constraints on the system, such as maximum permitted time to successfully pick up an object. In other embodiments, the threshold probability adjusts dynamically during the picking process.

In some embodiments, in accordance with a determination that the acquisition device coming into contact with the object at a region causes the barcode on the object to be occluded, a probability of zero is assigned to the region. In this sense, a barcode is "occluded" when one or more bars in the barcode are completely covered. Note that partial coverage of one of more bars is acceptable if at least a portion of each bar is readable. In such embodiments, the probability that the barcode cannot be read is minimized. For example, FIG. 10B depicts a barcode 1020 that is partially covered by acquisition device contact area 1022. However, since all the bars have portions that are not covered, the entire barcode is still readable when scanned across its top row, by, for example, the Cognex device 1010 depicted in FIG. 10A with scanner 1012. In contrast, FIG. 10C depicts a barcode 1024 that is occluded: Even though some bars are unaffected by acquisition device contact area 1026, there are some bars that are completely covered by acquisition device contact area 1026, so the barcode cannot be interpreted when scanned in any direction.

In some embodiments, the system leverages dense probabilities for speed picking by attempting multiple different acquisitions in quick succession until at least one of them is successful. The system determines a plurality of locations on the object by selecting regions on the object corresponding to probabilities in the plurality of probabilities that exceeds a threshold probability, wherein the distance between the locations is beyond a threshold distance.

In some embodiments, the system enters a troubleshooting mode if it cannot find the barcode on an object or if none of the probabilities are above a threshold. The system may not be able to find the barcode if, for example, the surrounding lighting and shadows from other objects make the barcode difficult to detect. The barcode may even be missing. In some embodiments, a system in troubleshooting mode will make another attempt at finding the barcode by picking up the object, rotating it, and putting it back into the scene. The system will then repeat the process of capturing image data for the scene and generating a probability map. In other embodiments, a system in troubleshooting mode avoids repeating unsuccessful attempts. For example, after an unsuccessful attempt to pick up the object, the system sets the probabilities corresponding to regions within a threshold radius of the attempted location to zero. As discussed above, locations close to one another tend to have highly correlated probabilities of success. Thus, moving to a different region further away from a failed location is more likely to result in a successful pick up location.

Figure 11A:
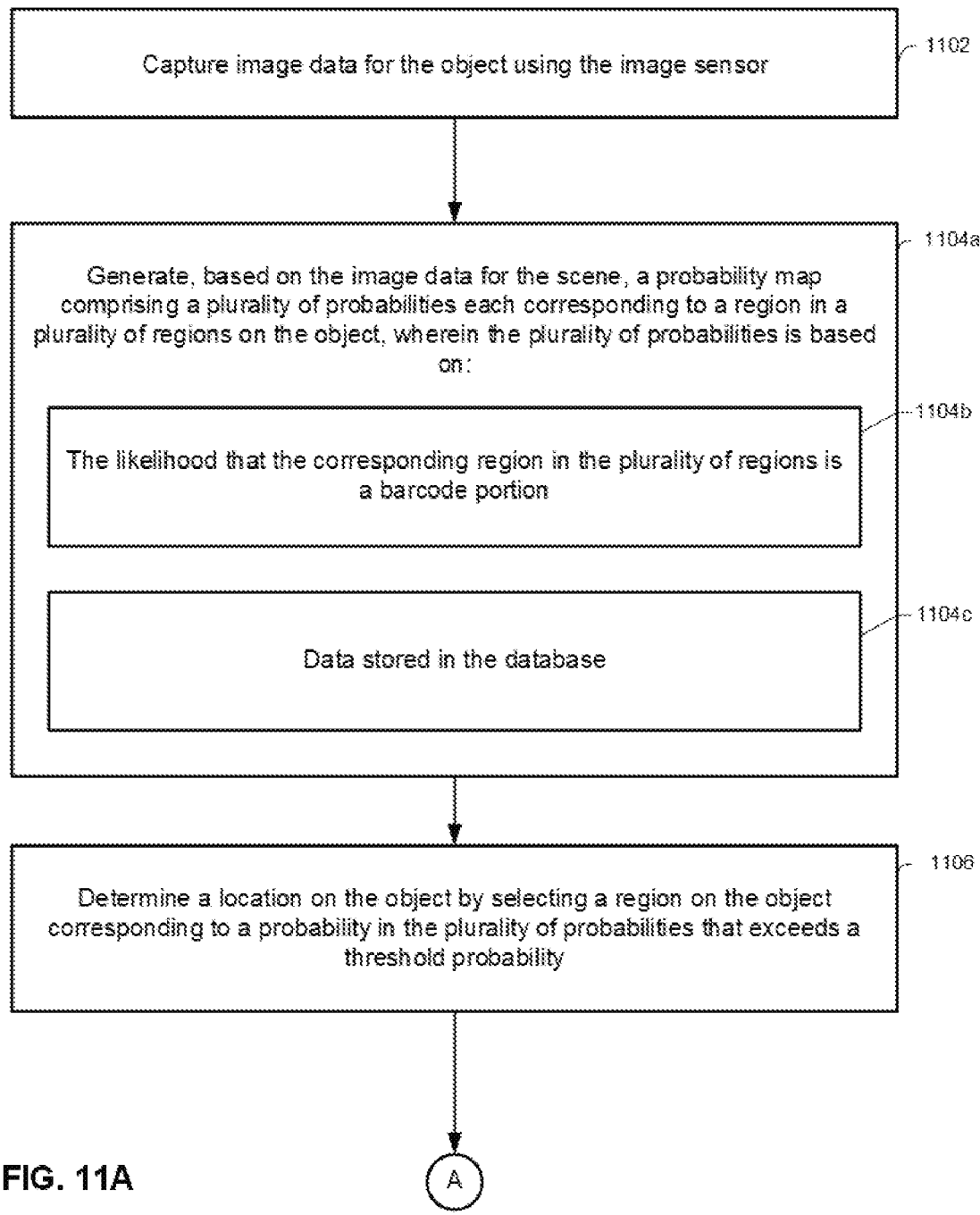
FIG. 11A is a flow diagram illustrating exemplary methods of picking based on barcode scanning in accordance with some embodiments.
Figure 11B:
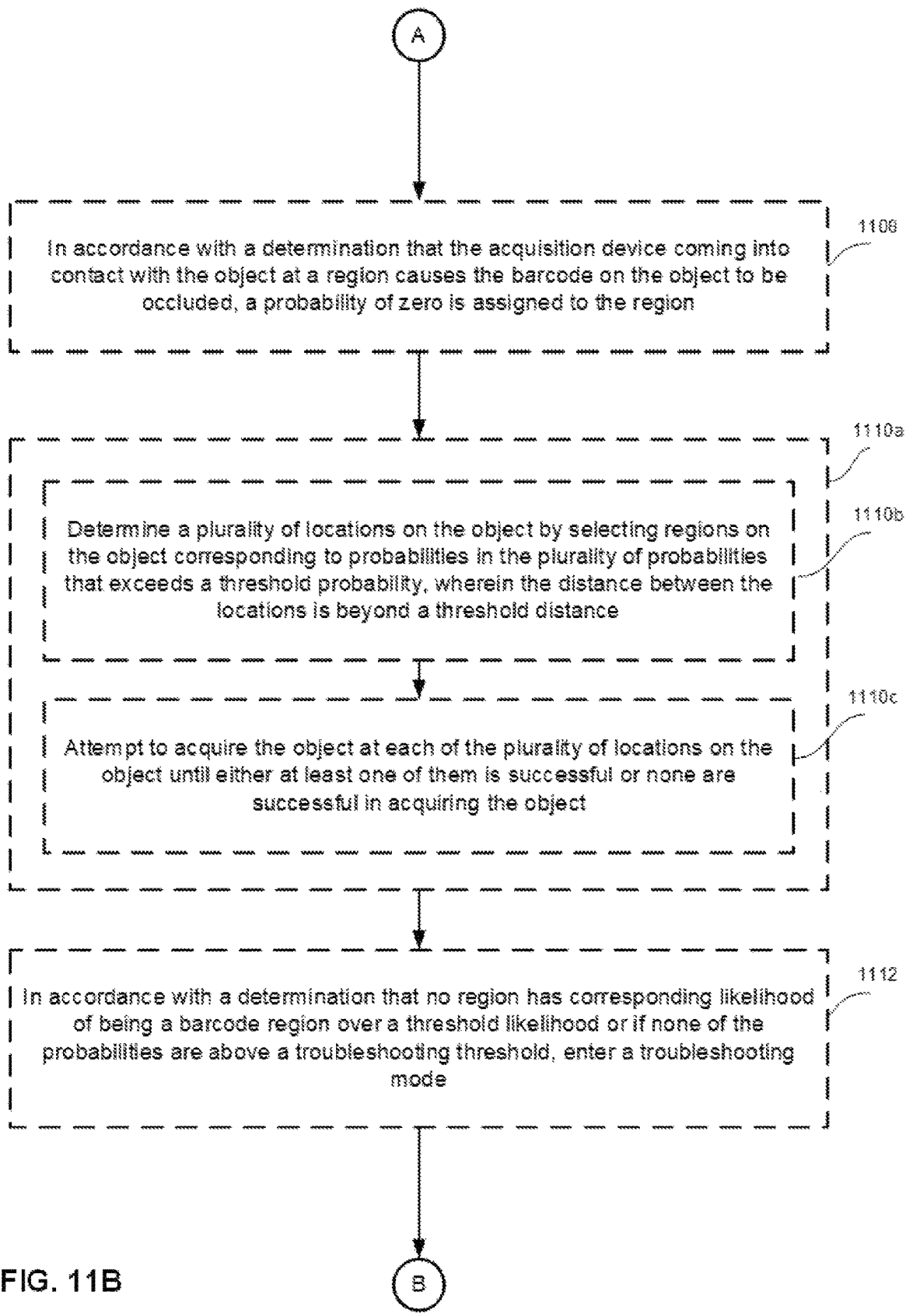
FIG. 11B is a flow diagram illustrating exemplary methods of picking based on barcode scanning in accordance with some embodiments.
Figure 11C:
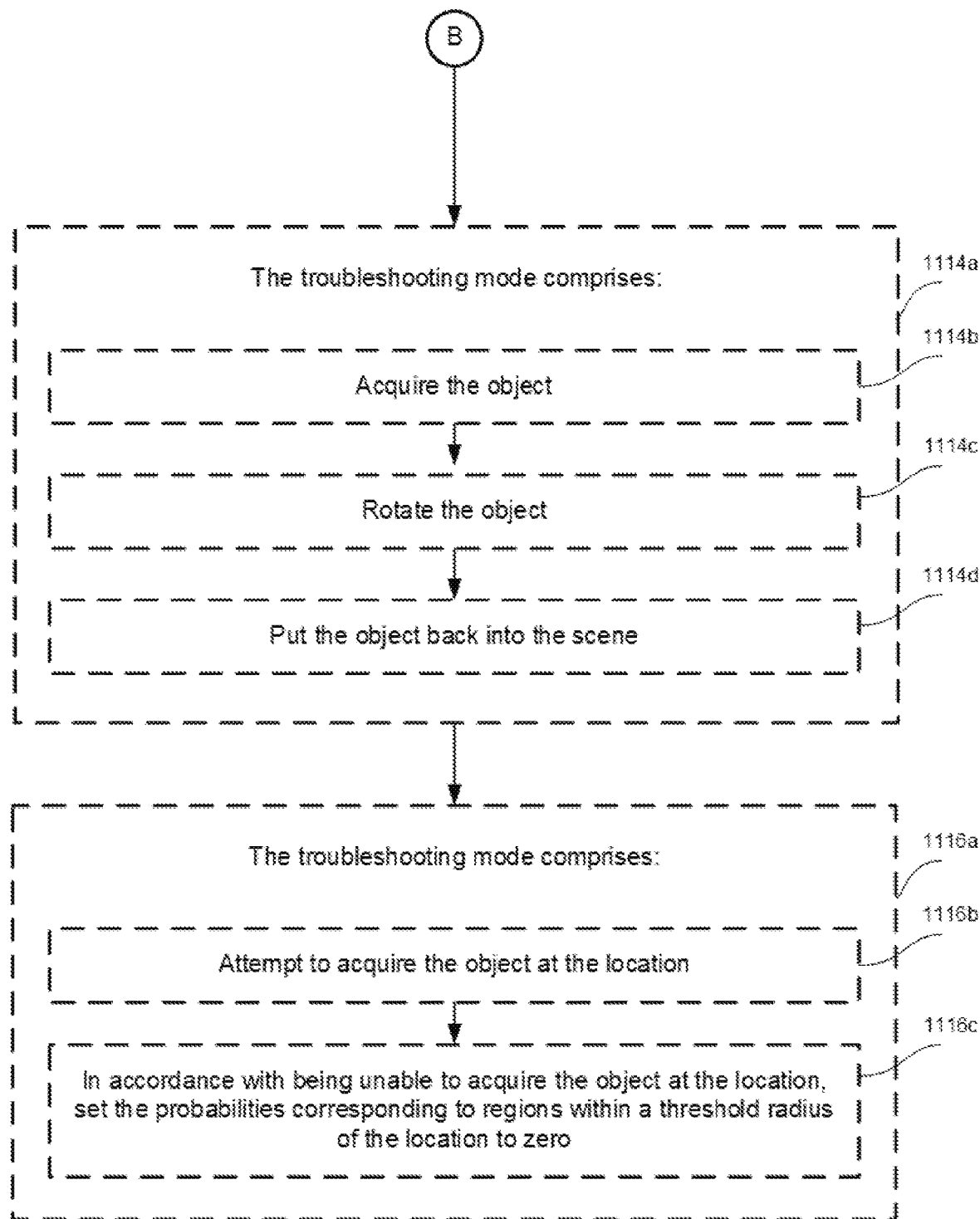
FIG. 11C is a flow diagram illustrating exemplary methods of picking based on barcode scanning in accordance with some embodiments.

FIGS. 11A-11C are flow diagrams illustrating a method 1100 of picking based on barcode scanning in accordance with some embodiments. The method 1100 is optionally performed at a robotic system as described above with reference to FIG. 1 and FIGS. 10A-10C. Some operations in method 1100 are, optionally, combined and/or the order of some operations is, optionally, changed.

Figure 12:
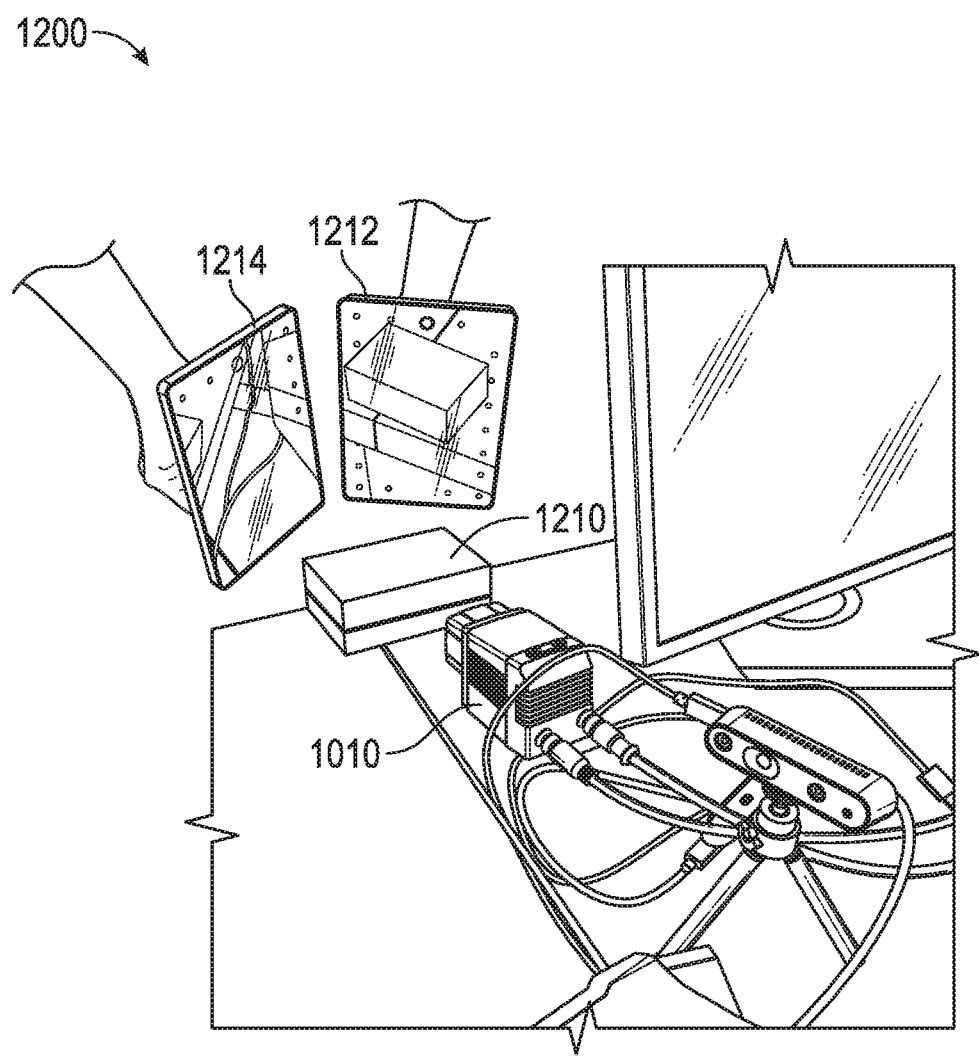
FIG. 12 illustrates exemplary systems for barcode scanning in accordance with some embodiments.
Figure 13A:
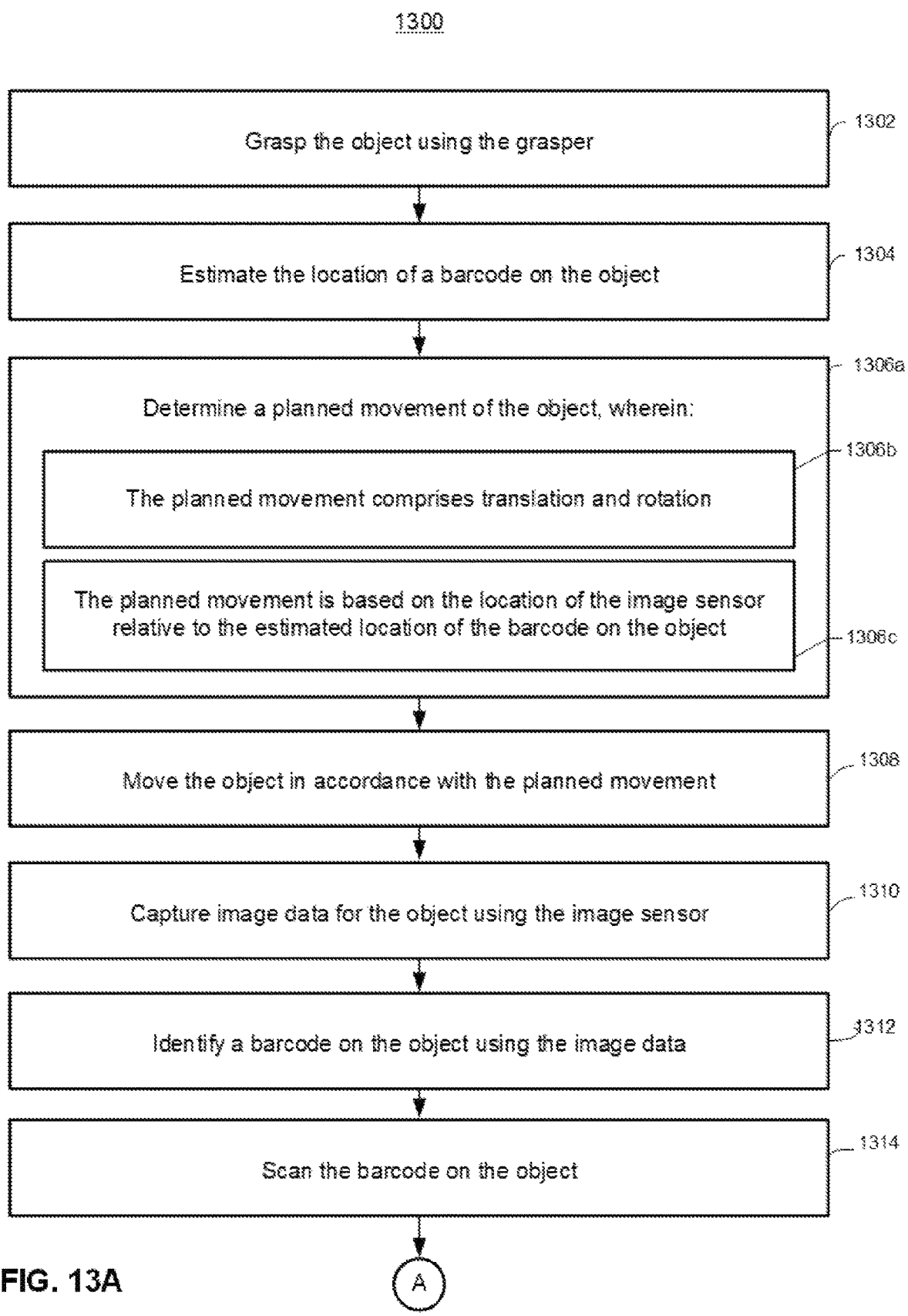
FIG. 13A is a flow diagram illustrating exemplary methods of barcode scanning in accordance with some embodiments.
Figure 13B:
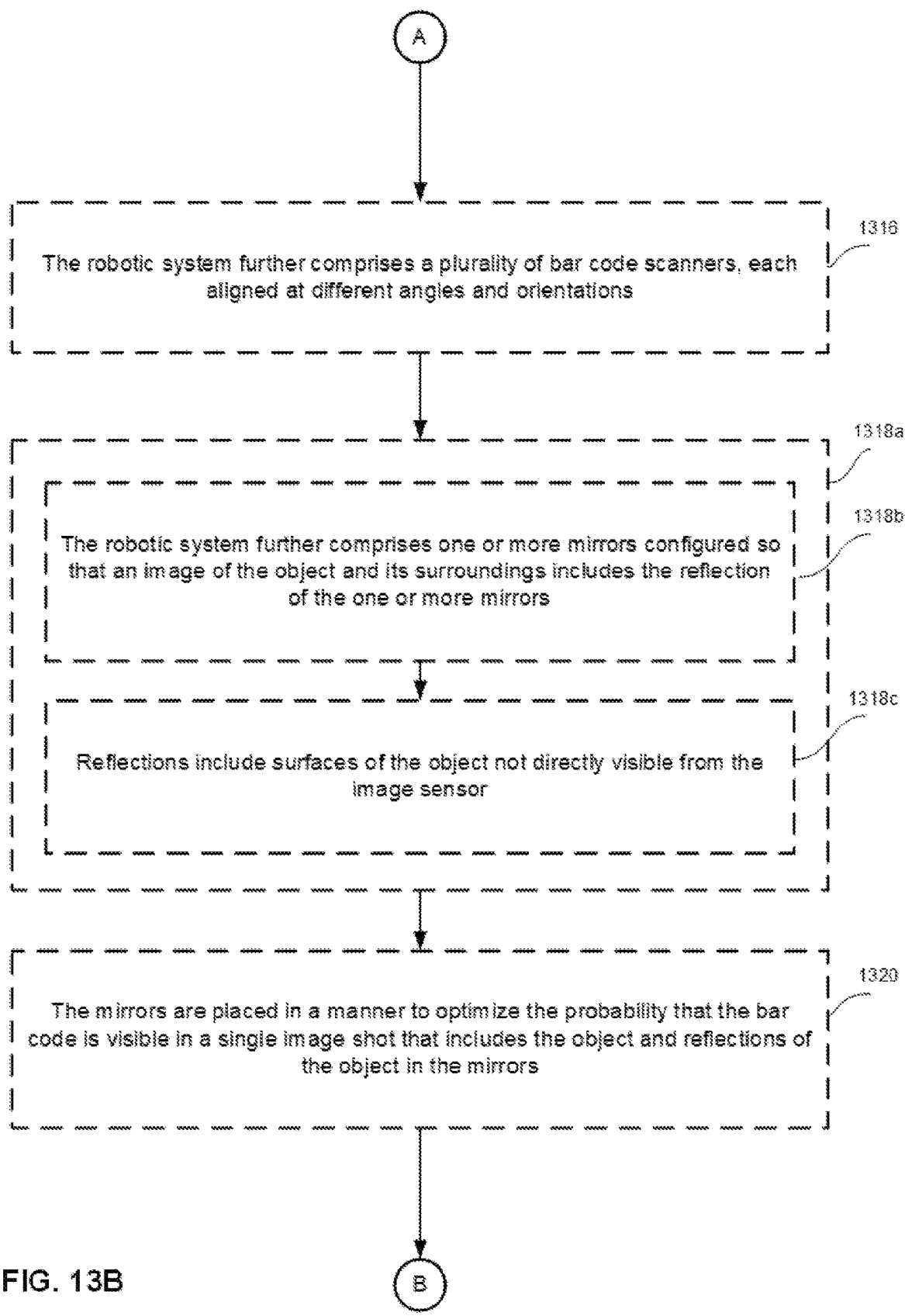
FIG. 13B is a flow diagram illustrating exemplary methods of barcode scanning in accordance with some embodiments.
Figure 13C:
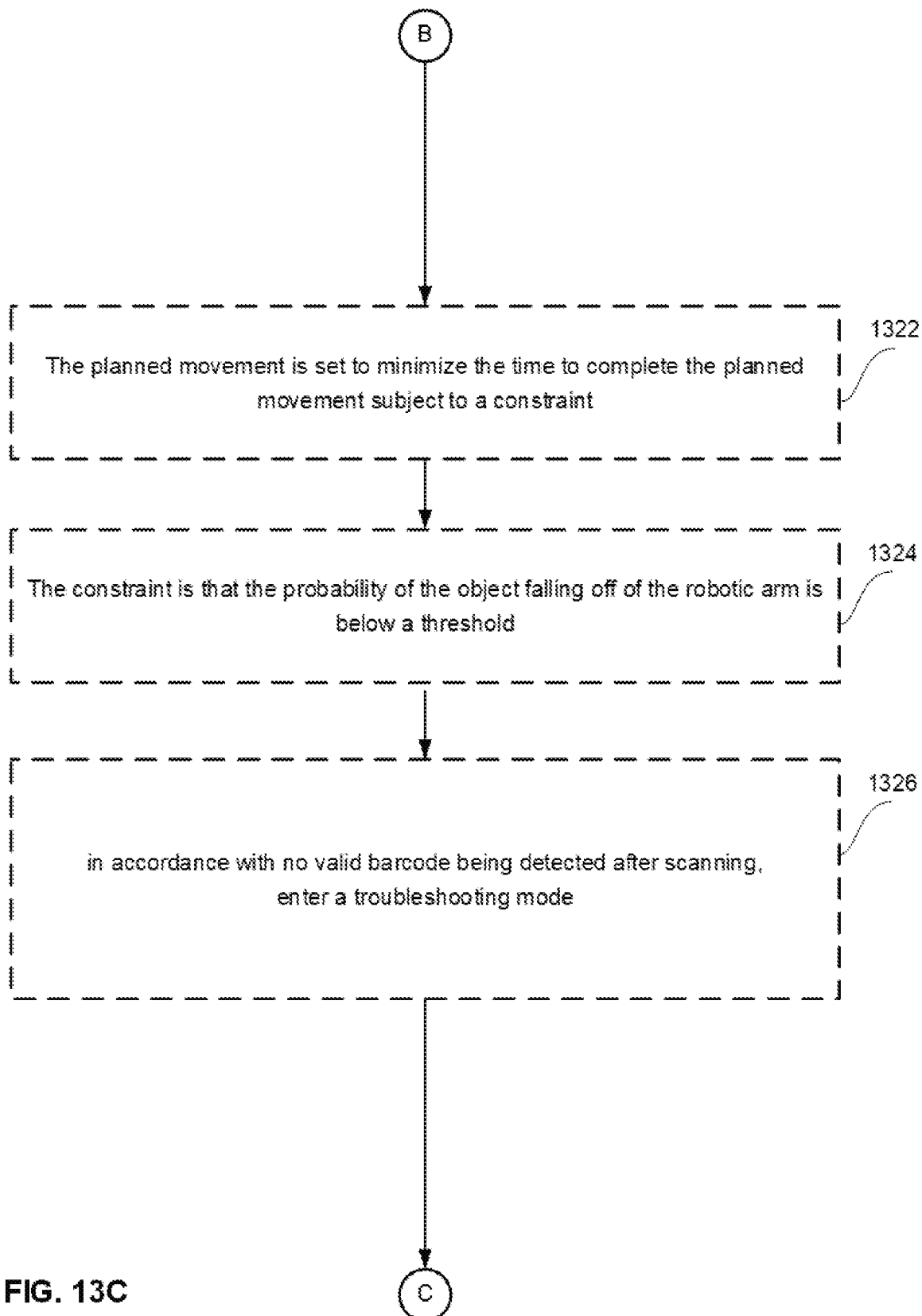
FIG. 13C is a flow diagram illustrating exemplary methods of barcode scanning in accordance with some embodiments.
Figure 13D:
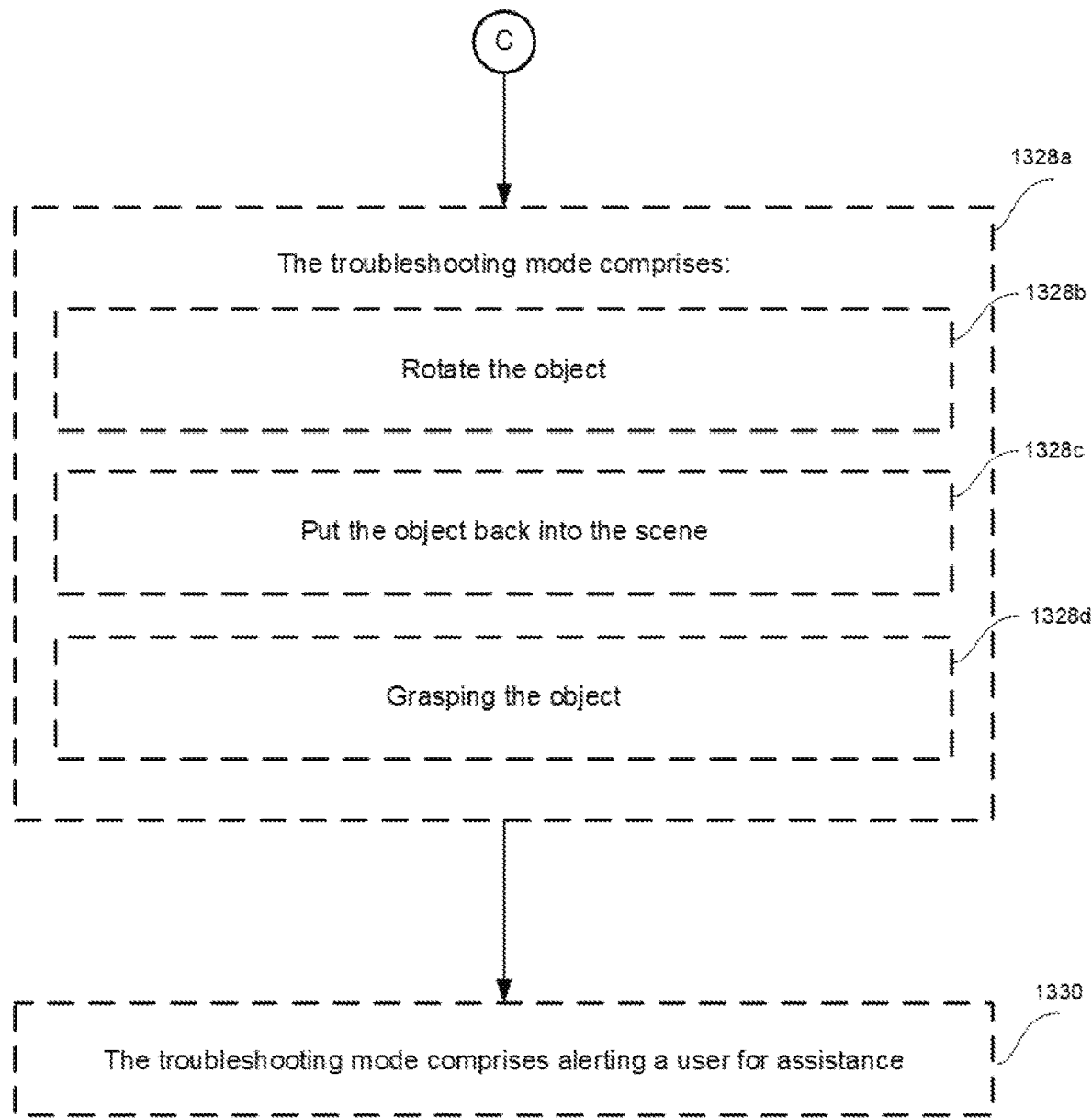
FIG. 13D is a flow diagram illustrating exemplary methods of barcode scanning in accordance with some embodiments.

FIG. 12 illustrates exemplary systems for barcode scanning in accordance with some embodiments. The robotic system identifies the optimal way to move the object to increase the likelihood that the bar code can be seen in a scan station. The total time it takes the system to rotate the object, image it, and scan the bar code is minimized.

In some embodiments, a robotic system comprising a robotic arm, a gripper, and an image sensor scans a barcode on an object. First, the system grips the object using the gripper. This may be accomplished, for example, by the means described earlier, including methods that determine which location to acquire an object and whether to use a gripper. Next, the system estimates the location of a barcode on the object. This estimation may include, for example, previous images the system has of the scene. Alternatively, the system may capture images or video as the object is gripped and estimate the location of the barcode from the images or video. Since these initial images and videos are intended to merely estimate the location of the barcode and not to read the barcode, the system may use lower resolution image sensors for this task in order to save energy, processing power, and/or time. For example, a low-resolution camera may capture an image of the scene from a top view. If no barcode is detected on the top face of an object, the system may estimate that the barcode is on one of the other faces of the object. In some embodiments, the system assigns probabilities to locations on the object where the barcode may lie.

The system then determines a planned movement of the object, wherein the planned movement comprises translation and rotation; and the planned movement is based on the location of the image sensor relative to the estimated location of the barcode on the object. For example, if the barcode is estimated to be at the bottom of the object and the image sensor is on the side, then the planned movement is to rotate the object 90 degrees from the bottom to the side.

The system then moves the object in accordance with the planned movement. Due to the planned movement, the barcode is now more likely to be in view of the image sensor than it was before the planned movement. The system then captures image data for the object using the image sensor. Next, the system identifies a barcode on the object using the image data. This may include, for example, applying image recognition techniques to the image data. Finally, the identified barcode on the object is scanned. In some embodiments, the image sensor and the barcode scanner are the same device.

In some embodiments, the robotic system further comprises a plurality of bar code scanners, each aligned at different angles and orientations. Such an arrangement enables the system to collectively capture most or all possible locations of barcodes. The system may be configured to execute all the scanners simultaneously in order to save time. In the event that more than one scanner reads a barcode, the multiple readings may act as an error check. For example, if two scanners agree on a barcode reading but a third scanner does not, the system may use the reading agreed upon by the first two scanners and ignore the reading from the third scanner. In an alternative embodiment, if the barcode readings are not unanimous across all scanners that have registered a reading, then the system may re-scan the barcode or may ask for human assistance to resolve the discrepancy. In some embodiments, the system is configured to detect objects that have multiple different barcodes attached. Under such circumstances, the system may ask for human assistance.

In some embodiments, the robotic system uses mirrors to increase the probability that the image sensor can capture the barcode. Such a system further comprises one or more mirrors configured so that an image of the object and its surroundings includes the reflection of the one or more mirrors, wherein reflections include surfaces of the object not directly visible from the image sensor. Thus, if the estimated position of the barcode is incorrect, there is an improved probability that the barcode will be visible in one of the surfaces reflected by a mirror to the image sensor. One such system is depicted in FIG. 12, where two mirrors 1212 and 1214 are configured behind object 1210 at an angle so that the image sensor 1010 (a bar code scanner, such as a Cognex scanner) is able to capture multiple sides of the object in a single image capture. In some embodiments, the mirrors are configured so that most or all possible locations of barcodes appear in the resulting image. In such embodiments, the mirrors are placed in a manner to optimize the probability that the bar code is visible in a single image capture that includes the object and reflections of the object in the mirrors. Otherwise, if the first image shot fails to find the barcode in the first image, the system may move the object and capture a second image.

In some embodiments, the planned movement is set to minimize the time to complete the planned movement subject to a constraint. For example, if a planned movement comprises both a non-zero rotation and a non-zero translation, it is efficient to execute both degrees of motion simultaneously. However, if such an execution would cause the object to touch a second object, then a different execution is followed, e.g., one where the object moves around the second object. In some instances, the motion speed and/or perception algorithm is adjusted for delicate object handling (i.e., to provide for more conservative operation of the system). In some embodiments, the constraint is that the probability of the object falling off of the robotic arm is below a threshold. The system accordingly adjusts the motion speed and perception algorithms for delicate object handling. In some embodiments, the minimization of time to complete the planned movement subject to a constraint is determined by machine learning algorithms.

In some embodiments, when the system detects no valid barcode after scanning, it enters a troubleshooting mode. In some embodiments, the troubleshooting mode entails trying again: the system rotates the object, puts the object back into the scene (presumably at a different orientation from where it was originally before it was picked up the first time), and grips the object again. Additionally or alternatively, the system may perform non-gripping actions such as toppling, pulling, and/or pushing to rearrange the objects in the bin to increase the chance of a successful grasp. It is possible that the barcode was in an inaccessible orientation the first time, and a second barcode scan may be successful. However, in some embodiments, after a threshold number of failed attempts, the system may enter a second troubleshooting mode, which comprises alerting a user for assistance.

In some embodiments, the robotic system has external lights that are intelligently controlled to improve the visibility of the barcode on an object. For example, if the robotic system is in a dimly lit location or if obstacles nearby otherwise cast shadows into the barcode scanning area, the robotic system may increase the intensity of the external lights. Conversely, if the surface of the object on which the barcode sits is somewhat reflective, the robotic system may decrease the intensity of the external lights. In some embodiments, the external lights are each configured at different angles to focus on different surfaces of the object and are independently controlled. In some embodiments, a plurality of light sensors detects the intensity of light around the barcode scanning region and feeds information to the robotic system to intelligently control the external lights.

FIGS. 13A-13D are flow diagrams illustrating a method 1300 of barcode scanning in accordance with some embodiments. The method 1300 is optionally performed at a robotic system as described above with reference to FIG. 1 and FIG. 12. Some operations in method 1300 are, optionally, combined and/or the order of some operations is, optionally, changed.

Figure 14B:
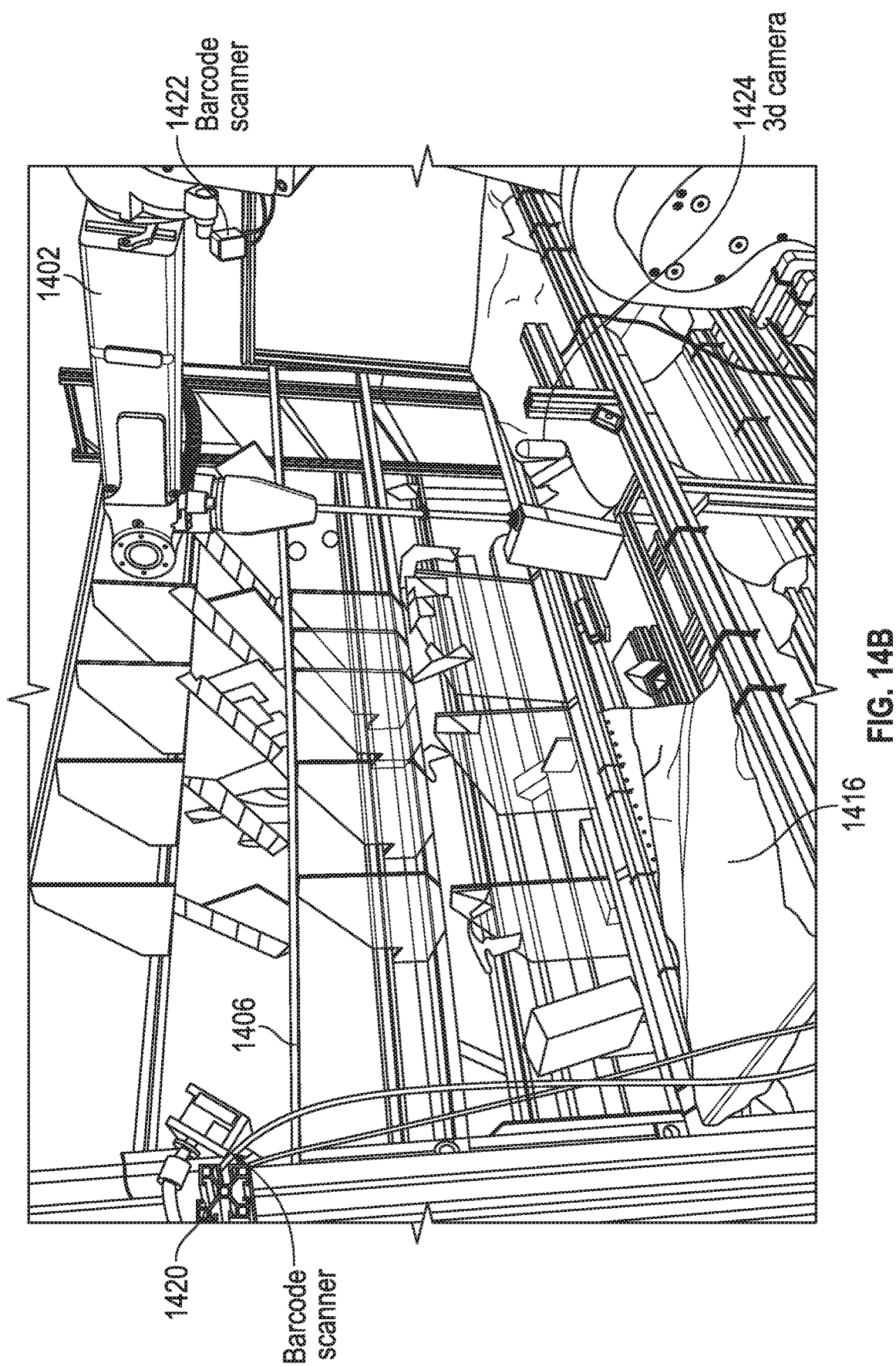
FIG. 14B depicts an exemplary pick and place system in accordance with some embodiments.

FIGS. 14A-B depicts pick and place system 1400. As shown in FIG. 14A, system 1400 includes robotic arm 1402 (which is, for example, the same or similar to robotic arm 102 described above with respect to FIG. 1 or another motion device); tote conveyor 1404 (which, for example, transports receptacles (e.g., totes) to a sorting position adjacent to robotic arm 1402; and put wall 1406 (which, for example, includes bins that receive items that are sorted from the receptacles by the robotic arm and control system (not shown)). User 1408 supervises, operates, and/or otherwise interacts with pick and place system 1400 through an user interface (not shown) or may manually interacting with the robotic arm, totes, put wall, and/or items that are going to be sorted, are actively being sorted, or have been sorted. FIG. 14B depicts barcode scanners 1420 and 1422 (e.g., similar as or the same as barcode scanner 1012 (FIG. 10A)) and 3D camera 1424 (e.g., similar as or the same as camera 158) that is part of a vision system (e.g., similar as or the same as the vision system described with respect to FIG. 1).

Referring again to FIG. 14A, tote conveyor 1404 includes input conveyor 1410 that directs totes, such as input tote 1412, to a location in front of robotic arm 1402. Justifying conveyor 1414 aligns totes to robotic arm 1402 and/or put wall 1406. In some cases, justifying conveyor 1414 aligns totes under optional funnel 1416 that helps redirect items that are dropped, either intentionally or inadvertently, by robot arm 1402. Output conveyor 1418 directs totes, e.g., after its contents are done being sorted, away from robotic arm 1402 so that another tote and be positioned so that its contents may be sorted. Input conveyor 1410, justifying conveyor 1414, and/or output conveyor 1418. Each conveyor can be implemented with any number of components that move and/or position totes. In one case, the conveyors are implemented with passive rollers to allow totes to move in response to gravity or external sources (e.g., user 1408 or a robot pushing the tote). In another case, the conveyors are implemented with driven rollers or other active components that move and/or position totes along the conveyors. The conveyors can also include belts, bearings, chutes, tracks, and/or any combinations these and/or other components.

In some cases, tote conveyor 1404 is modular and that one or more components of tote conveyor 1404, such as input, justifying, and/or output conveyors are modules that are positioned together (and in some cases coupled together or with other components in the system). Optionally, tote conveyor 1404 automatically feeds the tote (following the arrow in FIG. 14A) to the work area in front of robotic arm 1402. In the previous design, it was done by a person. The automated system can include tamper, pop-up cates, photo sensors, and conveyor rollers that are adjustable to allow precise justification of the tote.

Totes are fed into the system by various means, including another conveyor carrying totes containing items from a batch-picked (wave-picked) order that are transitioned onto input conveyor 1410 or onto justifying conveyor 1414. Human operators can also provide totes to the system by carrying (e.g. with a cart) totes onto input conveyor 1410 or onto justifying conveyor 1414. An autonomous ground vehicle could also be used to supply totes in a similar manner (e.g., loading them onto input conveyor 1410 or onto justifying conveyor 1414).

Figure 15:
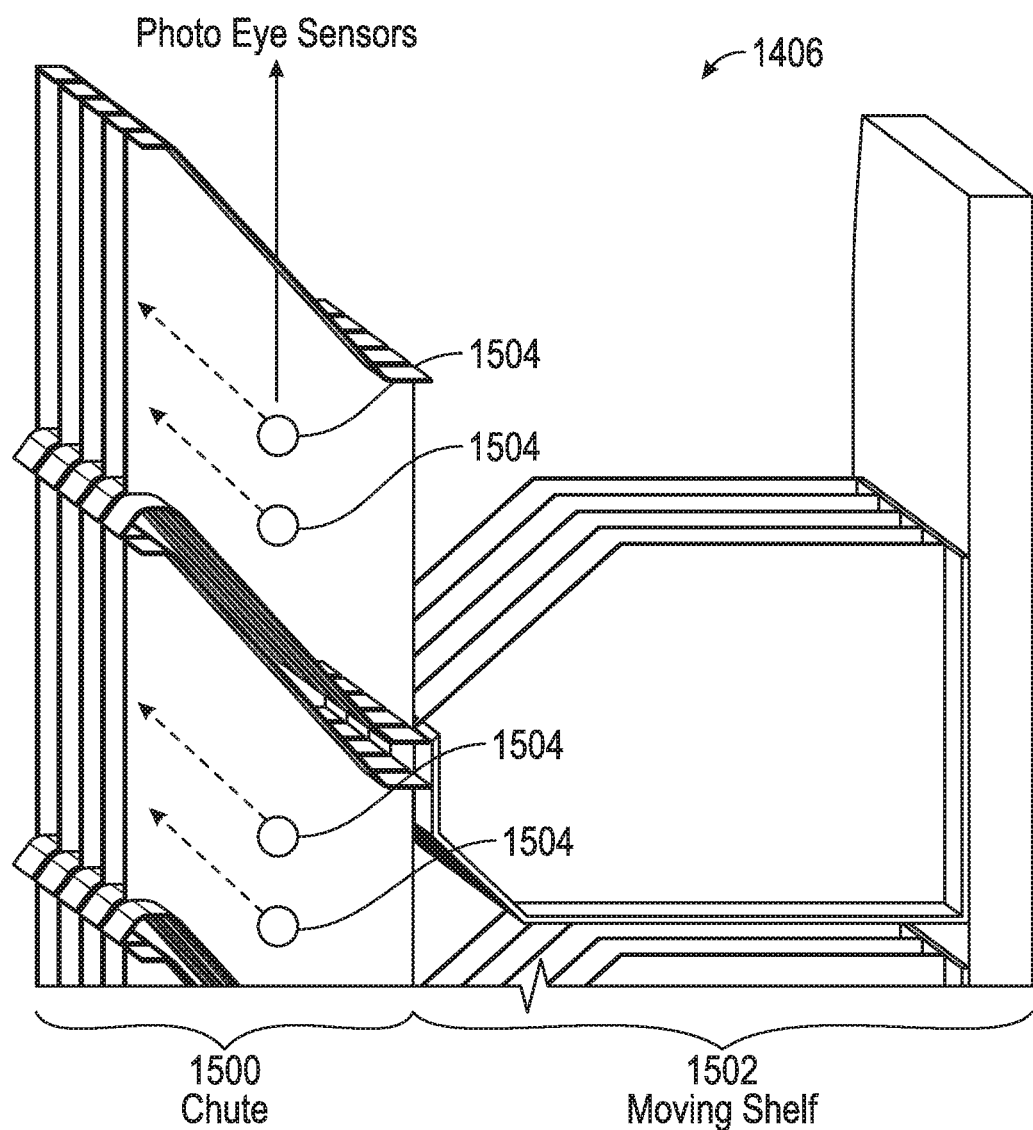
FIG. 15 depicts an exemplary put wall in accordance with some embodiments.

FIG. 15 depicts a side view of put wall 1406 that includes chute 1500 that directs picked items on to moving shelf 1502. Put wall 1406 optionally includes optical sensors 1504 (e.g., photo diodes, image sensors, or optical sensors) that detect when an item is successfully directed onto moving shelf 1502. The sensor can be placed at the entrance of a bin or in the middle through holes or in between the shelf and the chutes.

Figure 16:
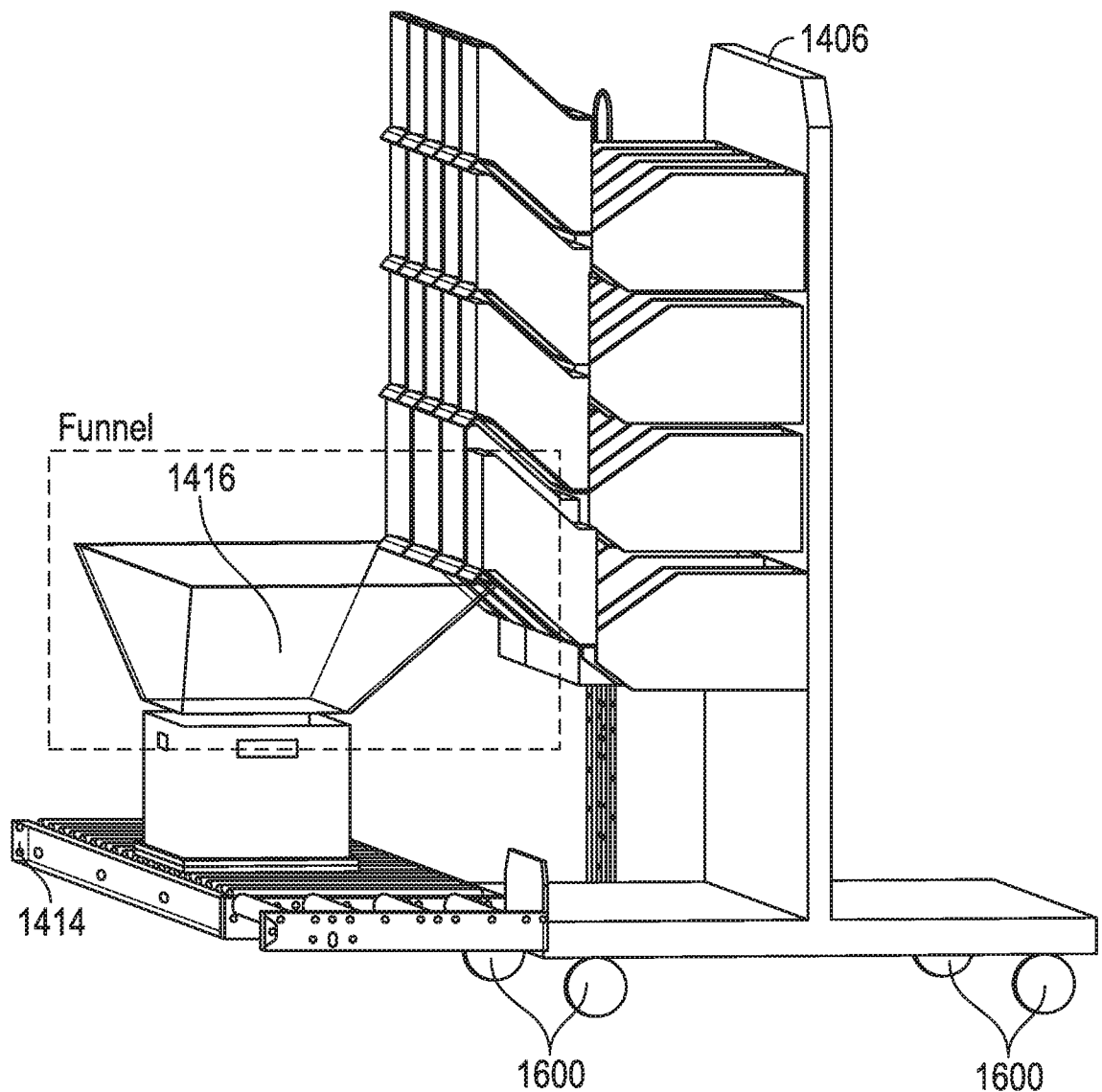
FIG. 16 depicts an exemplary mobile put wall coupled to a conveyor in accordance with some embodiments.

FIG. 16 depicts justifying conveyor 1414 connected to put wall 1406. In FIG. 16, put wall 1406 include wheels 1600 that allow for a human or autonomous robot to move put wall 1406 to another location, such as a packing station) after all picked items have been placed on moving shelf 1502. Alternatively, if moving shelf 1502 includes removable bins or other containers, a human operator or autonomous robot can move the bins or other containers to another conveyor or vehicle to be taken another location, such as a packing station. The bins on the moving shelf may have damping foam on the bottom, shocks, or other components that reduce impacts of picked items that are dropped into a particular bin.

FIG. 16 also include funnel 1416 for fault recovery. It redirects misplaced items back into the tote to recover put wall 1406 placing actions that fail. Funnel 1416 is designed to avoid occlusion of machine vision cameras and prevent dropped items from landing on justifying conveyor 1414. In some cases, funnel 1416 is lined with a soft and/or slippery material to facilitate return of items to the tote. In some cases, funnel 1416 has asymmetric sloped sides that provide a larger area to catch items next to put wall 1406 than next to robotic arm 1402 or adjacent sides.

Figure 17:
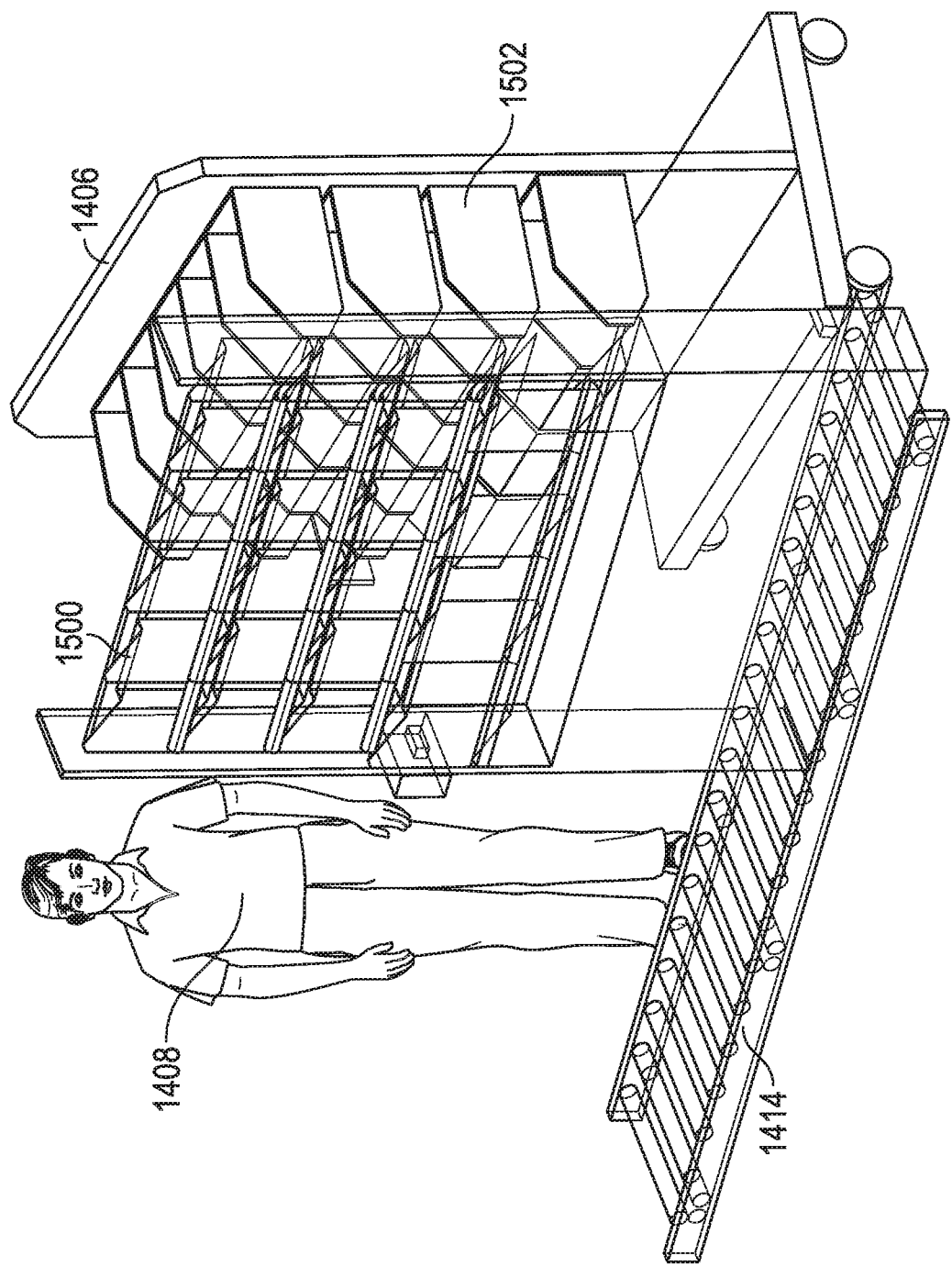
FIG. 17 depicts an exemplary mobile put wall decoupled from a conveyor in accordance with some embodiments.

FIG. 17 depicts a variation of put wall 1406 where chute 1500 is detachable and justifying conveyor 1414 is separate from the rest of put wall 1406 (e.g., moving shelf 1502). Moving shelf 1502 can be detached, rolled away to a packaging station, and replaced with an empty moving shelf. For example, Moving shelf 1502 can be unlocked from the packing station via a lock mechanism (e.g., latches, fasteners, or magnets). In some cases, after robotic arm 1402 (FIGS. 14A-B) finishes a picking task, a human operator (e.g., user 1408) will move the shelf to another packaging station. Alternatively, automated machinery move the shelf to another location (e.g., by lifting it from the bottom and carrying it away).

A vibrator may be attached or coupled to the tote to vibrate it so that the objects inside the tote are separated and/or spread out (e.g., a more flat arrangement). In some cases, this will reduce the difficulty for a suction cup end effector to grip the objects.

Exemplary pick and place system 1440 sorts a tote (or other container) of objects that need to be sorted (batch-picked warehouse SKUs or parcels in a sortation center) comes from the system's upstream (e.g., conveyor, human, or mobile robot). When the tote arrives, the system admits it or temporarily buffers it. The system performs a pick process (e.g., similar to the same as the pick processes described above).

After identifying a target pick location, the system picks up an associated object and lifts it in the air while moving it during barcode scanning and pose estimation. The system will put the object back into the tote (or another container to let a human or a machine to handle it later) in the case of an unsuccessful barcode scanning, detection of double picking, unsuitable pose, or other error so that another object can be picked for placing into the chute next. When putting the object back to the tote, the system will calculate a preferred pose to place so that it does not create a tall stack, which complicates the later picks.

When a successful pick and object identification (e.g., by a barcode scan) occurs, the system places the object into the corresponding destination chute bin opening. For example, the destination is chosen based on whether items associated with the picked item already reside or will reside in the future or the destination is chosen based on a chute for a bin that has been assigned an order to which the picked object belongs. To assist in placing the object, the system optionally uses cameras to estimate pose, orientation, or other characteristics of the picked object in order to successfully place the object in the destination chute in opening (e.g., ensuring that the object will fit in the chute opening and/or reducing the likelihood of the object colliding with the chute opening). Additionally, in some cases the chute has optional optical sensors to confirm the object has fallen into the correct chute bin opening. The object falls into the bin on the mobile shelf aligned to the chute.

After finishing sorting, a human may carry the mobile shelf to the packaging station or directly take things out of the bins of the bins on the shelf. A mobile robot may also take carry the shelf away. The human-machine interface (e.g., see FIG. 18) has a teleoperation interface to guide the robot picking in the case of repeated failures.

Figure 18:
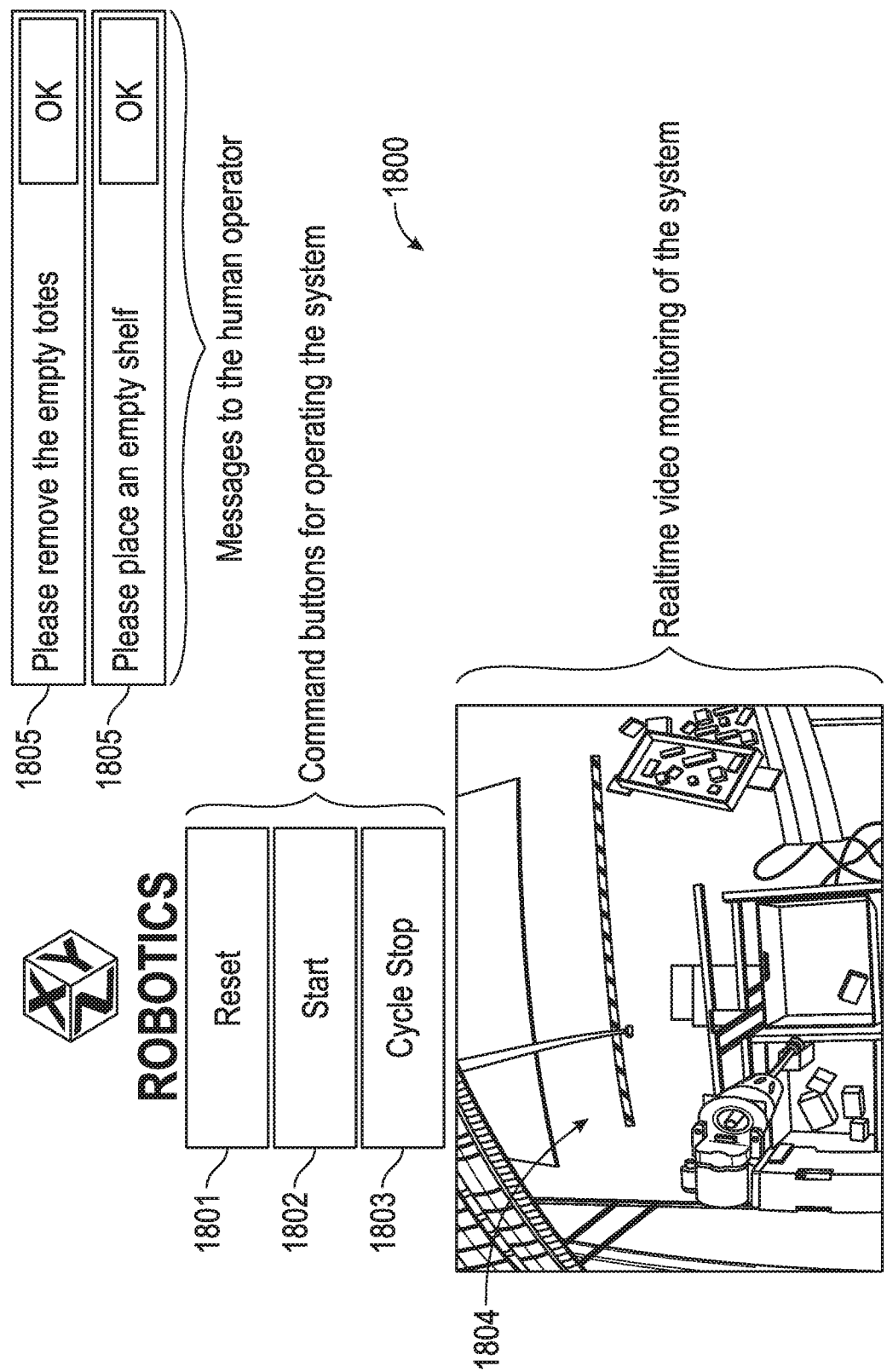
FIG. 18 depicts an exemplary user interface for a user to interact with a pick and place system.

FIG. 18 depicts user interface 1800 for a human operator to easily control pick and place system 1400. In some cases, the focus of interface 1800 is facilitating system start, reset and fault recovery, e.g., with command buttons (e.g., physical or virtual) 1801-1803. User interface 1800 optionally also provides for real time video 1804 of the system operation and/or system messages 1805 to the human operation. The system will also display alert information to the operator should the system detects error that needs human intervention or double checking. User interface also includes a teleoperation functionality to support picking in the case of repeated failures. In some instances, the interface allows an operator to guide the picking of an object in the case of repeated failures by the robot to automatically pick the object.

Figure 19A:
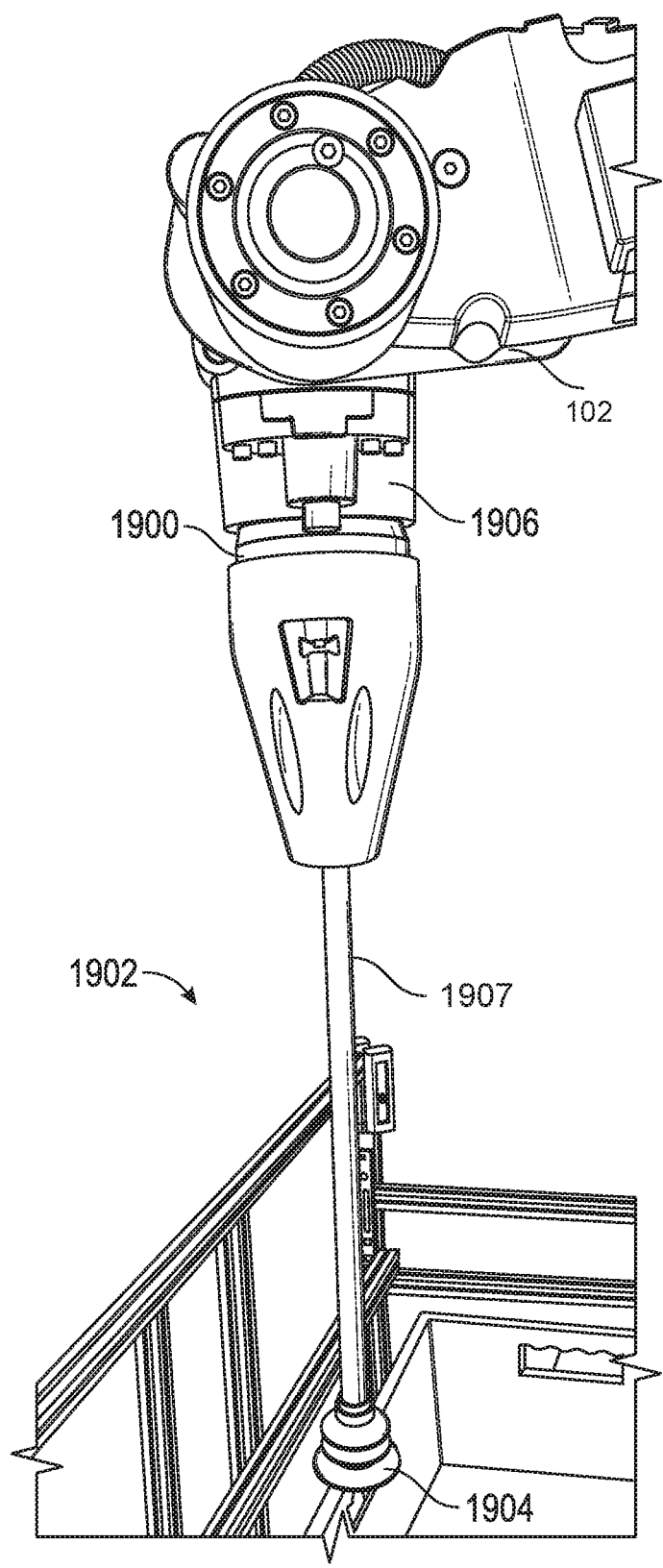
FIG. 19A depicts an exemplary magnetic coupling for an end effector.

FIGS. 19A-D depict compliant magnetic coupling for robotic arm end effectors. In FIG. 19A, end effector 1902 (which in some cases is the same or similar to end effector 114 of FIG. 1 or other end effectors described above) includes a rod 1907 and a suction gripper 1904. The end effector 1902 is attachable to the distal surface 1900 of robotic arm phalange 1906 of robotic arm 102 via a compliant magnetic coupling mechanism.

The compliant magnetic coupling mechanism allows for breakaway when excessive force is applied to robotic arm 102, end effector 1902, and/or gripper 1904 without damaging high value and high down time components. Typical overload scenarios are automatically resettable by an additional retention system that keeps the magnetic coupling in close proximity to the robotic arm 102's phalange 1906. The compliant magnetic coupling mechanism also allows for quick replacement of end effector 1902 within minutes.

Figure 19B:
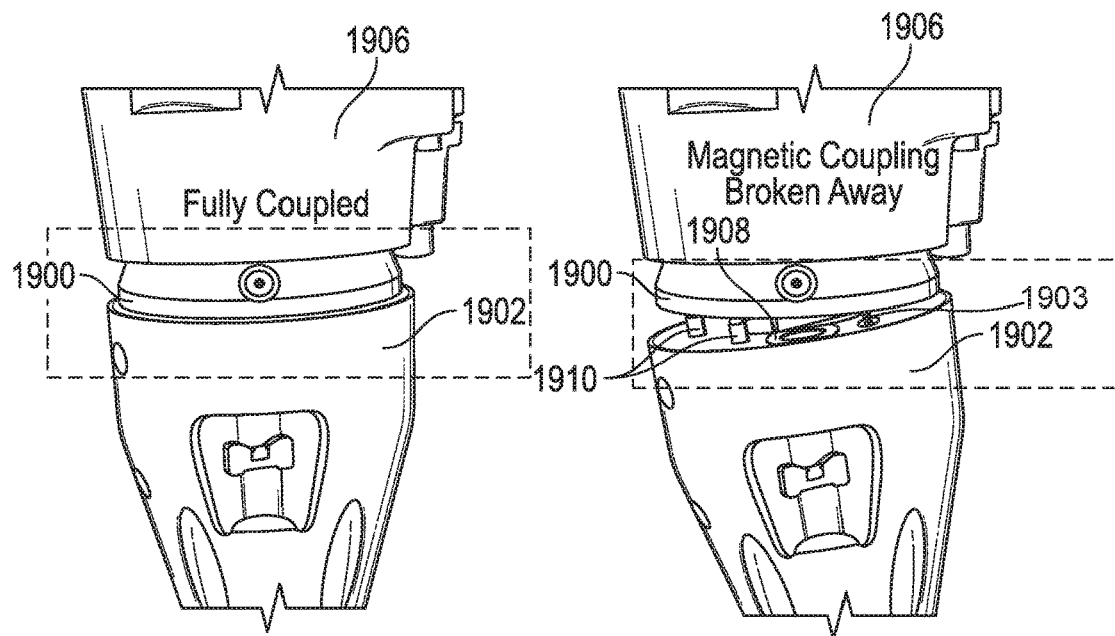
FIG. 19B depicts an exemplary magnetic coupling for an end effector.
Figure 19C:
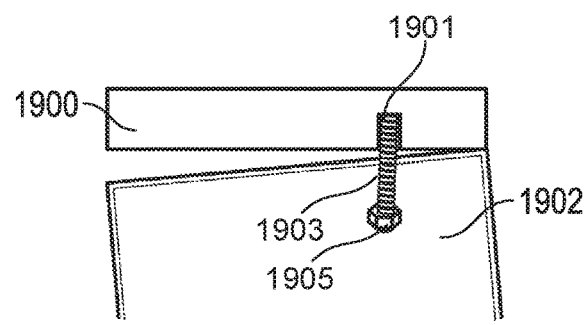
FIG. 19C depicts an exemplary magnetic coupling for an end effector and a cross-section view of the magnetic coupling.
Figure 19D:
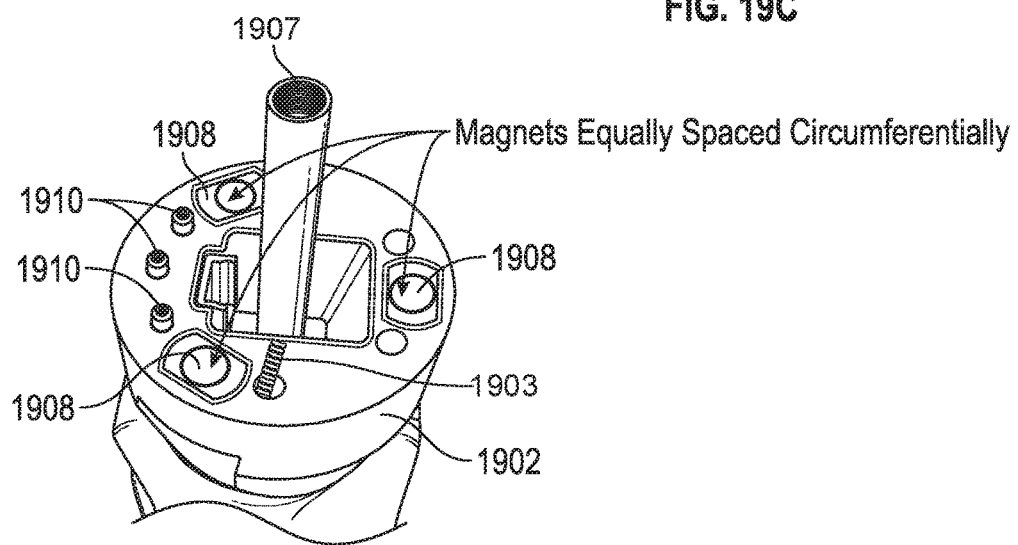
FIG. 19D depicts an exemplary magnetic coupling for an end effector.

FIG. 19D shows an example configuration of magnets 1908 that provide for the magnetic coupling. With reference to FIG. 19D, the end effector 1902 comprises a plurality of (e.g., 3) magnetic components 1908 arranged on the proximal surface of the end effector 1902. The magnetic components can be glued or screwed onto the proximal surface. In the depicted example, the three magnetic components 1908 are equally spaced circumferentially (i.e., 60 degrees apart). Further, the distal surface 1900 of the robotic arm phalange 1906 comprises another set of magnetic components (not depicted) that are arranged in the same configuration. As such, the magnetic components 1908 on the end effector are configured to attract the magnetic components arranged on the distal surface 1900 of the robotic arm phalange 1906, thus coupling the end effector and the robotic arm.

FIG. 19B show the compliant magnetic coupling mechanism in the coupled state. In FIG. 19B, the proximal surface of the end effector 1902 is attached to the distal surface 1900 of the robotic arm via the magnetic components 1908 on the end effector and a corresponding set of magnetic components arranged on the surface 1900 (not depicted).

FIG. 19C shows the mechanism in the decoupled state with magnet 1908 and pins 1910 showing. When a force (e.g., a lateral force) above a certain threshold is applied to any part of the system (e.g., the end effector 1902), the system allows the end effector and the robotic arm to temporarily break away without completely detaching from each other, such that they can automatically reattach to each other later. With reference to FIG. 19C, the end effector 1902 further comprises an elongated member 1903 extending through a hole in the proximal surface of the end effector. In the depicted example, the elongated member is a screw. The proximal end of the elongated member can be affixed to the distal surface 1900 of the motion device, for example, via a screwing mechanism. For example, the elongated member 1902 can be screwed into a screw hole in the surface 1900 of the robotic arm when the end effector is first attached to the robotic arm.

The elongated member comprises an end stopper piece 1905 configured to prevent the distal end of the elongated member 1903 from passing through the hole in the proximal surface of the end effector. In the depicted example, the end stopper piece 1905 is a bolt, but it should be appreciated that any end stopper piece that cannot pass through the hole in the proximal surface of the end effector can be used.

As shown in FIG. 19C, when a force above a certain threshold is applied to the system, it can cause one or more of the magnetic components 1908 to detach from one or more of the magnetic components on the surface 1900 of the robotic arm. However, the elongated member 1903 remain affixed to the surface 1900 and the end stopper piece 1905 prevent the end effector from completely detaching from the robotic arm.

When the force causing the breakaway is no longer present, the magnet components 1908 cause the proximal surface of the end effector to automatically attach to the distal surface of the motion device, thus automatically resetting the connection and maintaining the previous alignment between the robotic arm and the end effector.

In some embodiments, one of the distal surface of the robotic arm and the proximal surface of the end effector comprises one or more pins; and the other one of the distal surface of the robotic arm and the proximal surface of the end effector comprises one or more openings for receiving the one or more pins. As shown in FIGS. 19C and 19D, proximal surface of the end effector comprises three pins 1910. The surface 1900 of the robotic arm comprises three openings or holes (not depicted) arranged in the same configuration for accommodating the pins. The pins have tapered tops that make it easier to fit into the openings. The pins allow for a more precise and secure resetting.

In some embodiments, the proximal end of the rod 1907 (FIG. 19D) is attached to a flexible tube in the robotic arm. Thus, during the temporary breakaway (FIG. 19C), the tube in the robotic arm can extend or stretch such that the connection between the rod 1907 and the tube in the robotic arm remain secure.

In some embodiments, the compliant magnetic coupling mechanism comprises a plurality of elongated members 1903 operating in a substantially similar manner to ensure a precise and secure automatic resetting.

In some embodiments, the system comprises one or more sensors to detect the occurrence of a breakaway (e.g., between the robotic arm phalange and the end effector), and the degree of the breakaway. Any type of sensors can be used, such as hall-effect sensors or inductance sensors. In some embodiments, the sensors are arranged on the motion device (e.g., the phalange), the end effector, or both, and are configured to detect detachment or increase of distances between components on the motion device and the components on the end effector. For example, based on the signals from the sensors, the system can determine that a magnetic component on the motion device is temporarily detached from the corresponding magnetic component on the end effector. In accordance with a determination that a detachment has occurred, the system moves (e.g., retracts) the robotic arm to prevent further detachment. In some embodiments, the system can determine the degree of the breakaway (e.g., one magnetic component detached, two magnetic components detached, all magnetic components detached, one or more pins detached, distance between the proximal surface of the end effector to the end stopper piece) and provides an output accordingly. For example, the system can move the robotic arm to prevent further breakaway. As another example, the system can move the robotic arm away to allow for automatic resetting. As another example, the system can issue an alert such that a human operator can inspect the environment and make adjustments accordingly (e.g., to the packages, to the robotic system).

FIGS. 19E-G depict an exemplary magnetic coupling mechanism for robotic arm end effectors, in accordance with some embodiments. In FIG. 19E, a robotic arm tool 1920 comprises a rod 1922 and a tool base 1924. The tool base 1924 is affixed to the distal end of the rod 1922. A magnetic coupling mechanism is used to couple a detachable tool 1926, such as a suction gripper, to the tool changer base 1922 of the robotic arm tool. Magnetic coupling between the robotic arm tool 1920 and the detachable tool 1926 allows for breakaway when a sufficient force is applied to the robotic arm tool 1920 and/or the detachable tool 1926 to separate the two. In some embodiments, the decoupling is achieved via a tool rack, as discussed in further details herein. Further, the magnetic coupling mechanism can be used for any coupling purposes, for example, for coupling any motion device and any detachable end effector.

FIG. 19F depicts an exemplary tool changer base 1924, in accordance with some embodiments. The tool changer base 1924 comprises an embedded magnet 1930 at the distal end. The embedded magnet can be affixed to the rest of the tool changer base 1924 via, for example, glue or urethane resin. In the depicted example, the cross-section of the embedded magnet 1930 is of a ring shape. It should be appreciated that the cross-section of the embedded magnet can be of any shape, such as circle shape, ellipse shape, or polygon shape (e.g., rectangle, square). In some embodiments, the tool changer is compact and cylindrical in shape with a diameter of 35 mm to facilitate reaching into deep containers and gripping items near walls and corners. The tool changer can also be of any shape including shapes that facilitate the coupling of detachable tools in a desirable orientation. As discussed above, the tool changer base 1924 is affixed to the distal end of a rod. In some embodiments, the rod has a hollow center, and a hollow space is formed and extends longitudinally through the rod and the tool changer base 1924.

FIG. 19G depicts an exemplary detachable tool 1926, in accordance with some embodiments. The detachable tool 1926 comprises an embedded magnet 1932 at the proximal end of the detachable tool. The embedded magnet 1932 can be affixed to the rest of the detachable tool via, for example, glue or urethane resin. In the depicted example, the cross-section of the embedded magnet 1932 is of a ring shape and is identical or substantially identical to the cross-section of the embedded magnet 1930.

The embedded magnet 1930 and the embedded magnet 1932 are arranged such that the distal end of the embedded magnet 1930 and the proximal end of the embedded magnet 1932 attract each other. In some embodiments, the embedded magnets are configured to produce a pull force above a predefined threshold. In some embodiments, the embedded magnets can attach to each other with 30 pound-force (lbf) of force or more to effectively facilitate high speed tool changing and picking of items.

In operation, when the tool changer base 1924 and the detachable tool 1926 are placed in proximity with each other, the embedded magnet 1930 and the embedded magnet 1932 are coupled together via magnetic force. In some embodiments, the embedded magnet 1930 and the embedded magnet 1932 are configured to align in a manner such that the hollow space formed through rod 1922 continues to extend longitudinally into the detachable tool. Accordingly, the detachable tool 1926 is securely coupled to the distal end of the robotic arm tool 1920 in an aligned manner.

The automatic alignment can be achieved, for example, by making sure that the cross-sections of the embedded magnets have identical or substantially identical shapes and, optionally, have identical or substantially identical dimensions. Because magnets have magnetic fields that attract and these fields, when of similar strengths and sizes naturally align with each other, such configuration of the embedded magnets would allow the magnets to automatically align and center. For example, cross-sections of embedded magnet 1930 and 1932 each include a circular hole, and the embedded magnets 1930 and 1932 can automatically align in a manner such that the circular holes are concentric and/or match up.

The robotic arm tool 1920 and the detachable tool 1926 can comprise a gripping mechanism for gripping objects. In the depicted example in FIG. 19G, the detachable tool 1926 comprises a vacuum cup 1934 at the distal end. In some embodiments, the detachable tool comprises a longitudinal hollow center that extends longitudinally through the length of the detachable tool. As such, when the detachable tool 1926 is coupled to the distal end of the robotic arm tool 1920, a single hollow space is formed and extends longitudinally through the robotic arm tool 1920 (including the rod 1922 and the tool changer base 1924) and the detachable tool 1926. The hollow space can function as a vacuum chamber. In operation, when the detachable tool 1926, specifically, the vacuum cup 1934, is placed at a desirable location on the surface of an object, the robotic system activates vacuum pass-through such that the vacuum cup is coupled to the object and achieves gripping.

The robotic arm tool 1920 and the detachable tool 1926 can support a variety of gripping mechanisms configured to manipulate objects of different sizes, weights, and surface areas. For example, different detachable tools can include suction cups of different sizes, with the larger suction cup configured to manipulate heavier and/or larger objects. Further, the robotic arm tool and the detachable tool can accommodate for pass-through of positive pressure pneumatics and electrical connections, while maintaining minimal impact to cycle time. The tool changer can also be adapted to support actively actuated grippers, which can be controlled (e.g., opened and closed) via different types of pass-through (e.g., pneumatics, electrical).

As depicted in FIG. 19G, the detachable tool 1926 comprises a groove section 1928. The groove section 1928 is configured to interface with a tool rack, which can retain the detachable tool 1926 in the z direction, as discussed below.

Figure 19H:
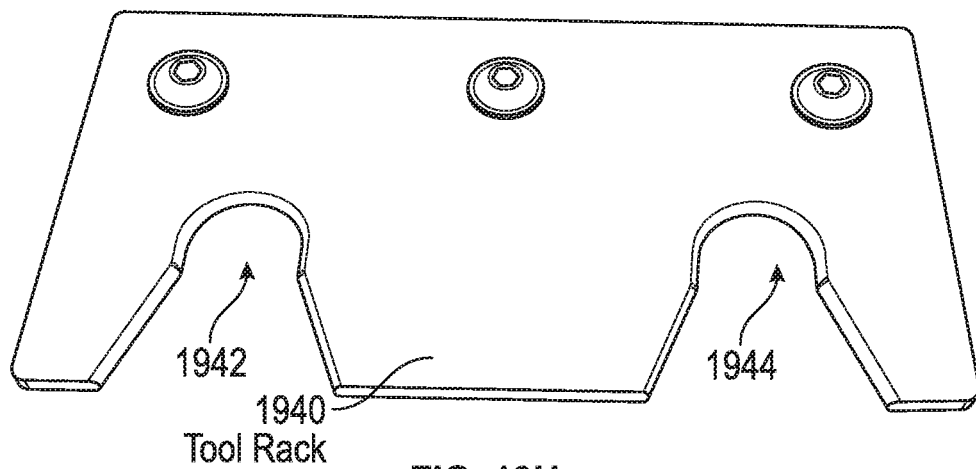
FIG. 19H depicts an exemplary tool rack for a detachable tool in accordance with some embodiments.
Figure 19I:
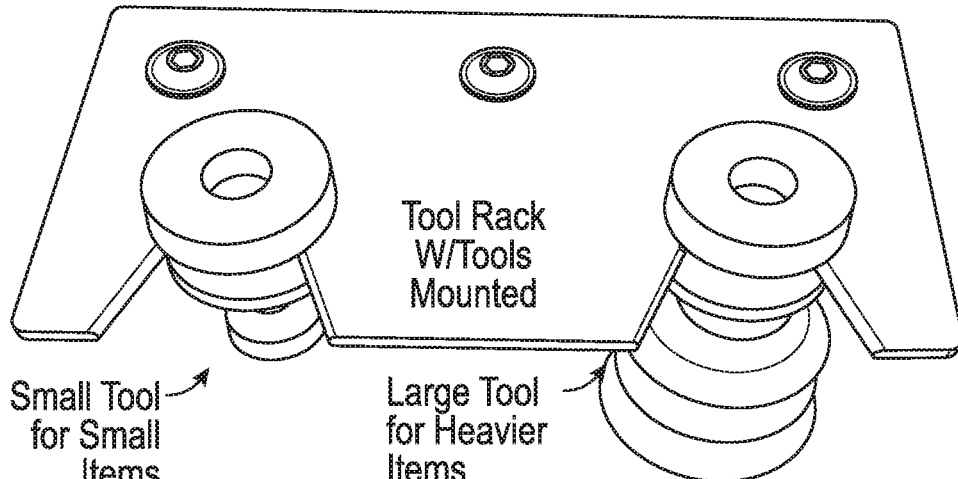
FIG. 19I depicts an exemplary tool rack for a detachable tool in accordance with some embodiments.
Figure 19J:
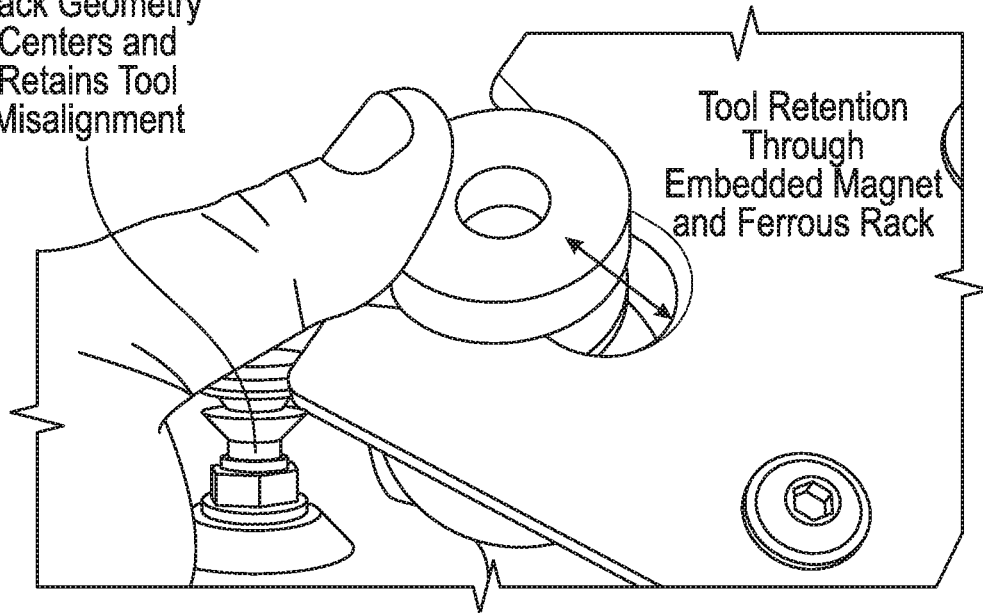
FIG. 19J depicts an exemplary tool rack for a detachable tool in accordance with some embodiments.

FIGS. 19H-J depict a tool rack for accommodating one or more detachable tools, in accordance with some embodiments. In FIG. 19H, a tool rack 1940 is secured to a base via a number of (e.g., 3) bolts such that it remains stationary. The tool rack comprises one or more slots 1942 and 1944. In the depicted example, the tool rack 1940 has two slots. Each slot has a widened opening for receiving a detachable tool and a notch for retaining the received detachable tool in the z direction.

As shown in FIG. 19I, the tool rack 1940 supports two detachable tools via the two slots. In the depicted example, the two detachable tools include identical tool changer bases but include suction cups of different sizes, with the bigger suction cup configured to manipulate heavier/bigger objects. Although suction cups are depicted, it is contemplated that other detachable tools can be retained by the tool rack in a similar manner. For example, detachable tools having actively actuated grippers that mechanically open and close can also be received by the tool rack.

FIG. 19J depicts a detachable tool being received, via the widened opening of the slot, into the notch of the slot. The notch interfaces with the groove section of the detachable tool such that the detachable tool is retained in the z direction. Further, a magnetic force is generated between the embedded magnet of the detachable tool and the material of the rack (e.g., ferrous rack) such that the detachable tool is securely mounted.

The tool rack 1940 can facilitate the coupling between the robotic arm tool and the detachable member. In operation, the robotic arm moves to place the tool changer base in proximity to (e.g., over) a detachable tool mounted over the tool rack. The tool changer base is lowered in the z direction such that it makes contact with the detachable tool. According to the magnetic coupling mechanism described above, the tool changer base and the proximal end of the detachable tool are coupled together in an aligned and centered manner. After coupling is achieved, the robotic arm moves the detachable tool out of the notch (e.g., via a movement on the x-y plane) and away from the tool rack. In some embodiments, after the robotic arm moves the detachable tool out of the notch such that the groove section of the detachable tool no longer interfaces with the notch, the robotic arm subsequently pulls upwards in the z direction to move the detachable tool away from the tool rack.

The tool rack 1940 can further facilitate the decoupling between the robotic arm tool and a detachable tool coupled to the robotic arm tool. In operation, the robotic arm, which is coupled to the detachable tool, moves the detachable tool toward a widened opening of an available notch (e.g., via a movement on the x-y plane) such that the groove section of the detachable tool eventually interfaces with the notch. Accordingly, the detachable tool is retained by the tool rack via the notch in the z direction. Further, an attraction force is generated between the embedded magnet of the detachable tool and the tool rack to further secure the retention. Subsequently, the robotic arm pulls upwards (e.g., along the z direction), thus decoupling the robotic arm tool and the detachable tool, which remains mounted by the tool rack.

The tool rack can be secured in any orientation or angle, and the motion paths of the robotic arm can be programmed accordingly to achieve coupling and decoupling described above. For example, the tool rack can be secured in an upright orientation, with the widened openings of the slots facing upward. Accordingly, the robotic arm can move downward (e.g., along the z direction) such that the groove section of a detachable tool interfaces with a slot and pull (e.g., via a movement on the x-y plane) to decouple the detachable tool from the robotic arm. It should be appreciated that the motion paths of the robotic arm can be curved and/or angled based on the orientation of the tool rack.

In some embodiments, while the robotic arm tool is coupled with a first detachable tool, the system determines whether a second detachable tool is needed. In some embodiments, the determination is based on characteristics (e.g., surface, shape, size, weight) of the object to be gripped, characteristics of the second detachable tool (e.g., size, type of griping mechanism, location on the tool rack), characteristics of the first detachable tool, or any combination thereof. The system can make the determination before attempting to grip the object, or make the determination after the system attempts to and fails to grip the object (e.g., due to the surface, shape, size, or weight of the object).

In accordance with a determination that the second detachable tool is needed, the robotic arm tool decouples from the first detachable tool, for example, by mounting the first detachable tool onto an available slot on a tool rack and pulling away from the tool rack to decouple the first detachable tool from the tool changer base. In some embodiments, the system stores an association between the first detachable tool and the location of the slot that retains the first detachable tool. Further, the robotic arm tool subsequently couples the tool changer base with the second detachable tool, for example, by picking up the second detachable tool from the tool rack.

In some embodiments, when a detachable tool is held in a tool rack, the system stores the corresponding location (e.g., corresponding slot of the tool rack) of the detachable tool. In some embodiments, the location is pre-assigned to the detachable tool. Further, one or more pre-programmed motion path of the robotic arm can be stored in association with the detachable tool and/or the location on the tool rack. In operation, based on characteristics of a target object (e.g., size, height, or shape), the system may determine an appropriate detachable tool (e.g., the appropriately sized suction cup) and retrieve the corresponding location. The system may then execute a pre-programmed motion (e.g., a up-side-down U path) to attach the detachable tool to the robotic arm and effect the tool change.

The above-described magnetic coupling mechanism provides a flexible manipulation solution for manipulating objects of a wide array of sizes, weights, and surfaces, while minimizing impact to cycle time. In some embodiments, the mechanism allows for quick and secure tool exchange within 0.5-1 second (e.g., 0.5 second, 0.6 second, 0.7 second, 0.8 second, 0.9 second, 1 second), compared to over 5 seconds for currently available methods.

Advantageously, the above-described magnetic coupling mechanism and tool rack can securely exchange tools at a speed equal to or faster than a single item pick cycle without any manual intervention. As such, potential bottleneck caused by tool changes is reduced or eliminated. For example, a warehouse that handles a wide range of package sizes may require frequent tool exchanges to allow the robotic arm to properly grip the packages during picking and sorting. Frequent tool exchanges that take over 5 seconds each time may unreasonably constrain the throughput of the picking and sorting process. However, if the tool exchange takes equal to or less than the cycle time, then the picking and sorting of different items can be streamlined more easily and be performed more efficiently.

A further advantage of the magnetic coupling mechanism and the tool rack is that manual intervention is not necessary. The magnetic coupling mechanism is self-aligning once the tool changer base is in close proximity to the detachable tool. The self-aligning nature of the magnetic coupling mechanism obviates the need for manual intervention, which is both labor and time intensive, as compared to the automated system described herein. A human worker takes longer to change detachable tools, during which time packages are not being moved or sorted.

A further advantage of the magnetic coupling mechanism is that mechanical coupling methods are not necessary to achieve gripping and/or maintain contact. Mechanical coupling methods require additional complexity such as moving parts and electrical wiring, which increases costs as compared to the magnetic coupling mechanism. Furthermore, mechanical systems introduce additional failure points through moving parts. Mechanical coupling methods also require additional time to properly couple (or decouple) the detachable tool to the tool changer base. Specifically, additional contact needs to be established between the detachable tool and the tool changer base (e.g., latches, electrical wiring, clamps), addition motion or maneuvering of the robotic arm is needed, and complex actuation mechanisms may be required. Although mechanical coupling methods are unnecessary, it is contemplated that mechanical coupling methods can be used in addition to the magnetic coupling mechanism if additional security is needed. For example, some packages may weigh more than the pull force that the magnetic coupling mechanism is capable of, and mechanical coupling mechanisms may be additionally deployed. In another example, the magnetic coupling mechanism can facilitate self-aligning for additional mechanical coupling mechanisms.

A further advantage of the magnetic coupling mechanism is that the robotic arm tool and the detachable tool have a compact form-factor. For example, the tool changer base can have a diameter of 35 millimeters. A compact form-factor is desirable because the robotic arm tool can pick small objects out of a deep container. A compact form-factor is further beneficial when gripping items near walls and corners. Since warehouses handle a wide variety of package sizes, the ability to flexibly maneuver the robotic arm tool to facilitate picking and sorting is desirable.

Figure 20:
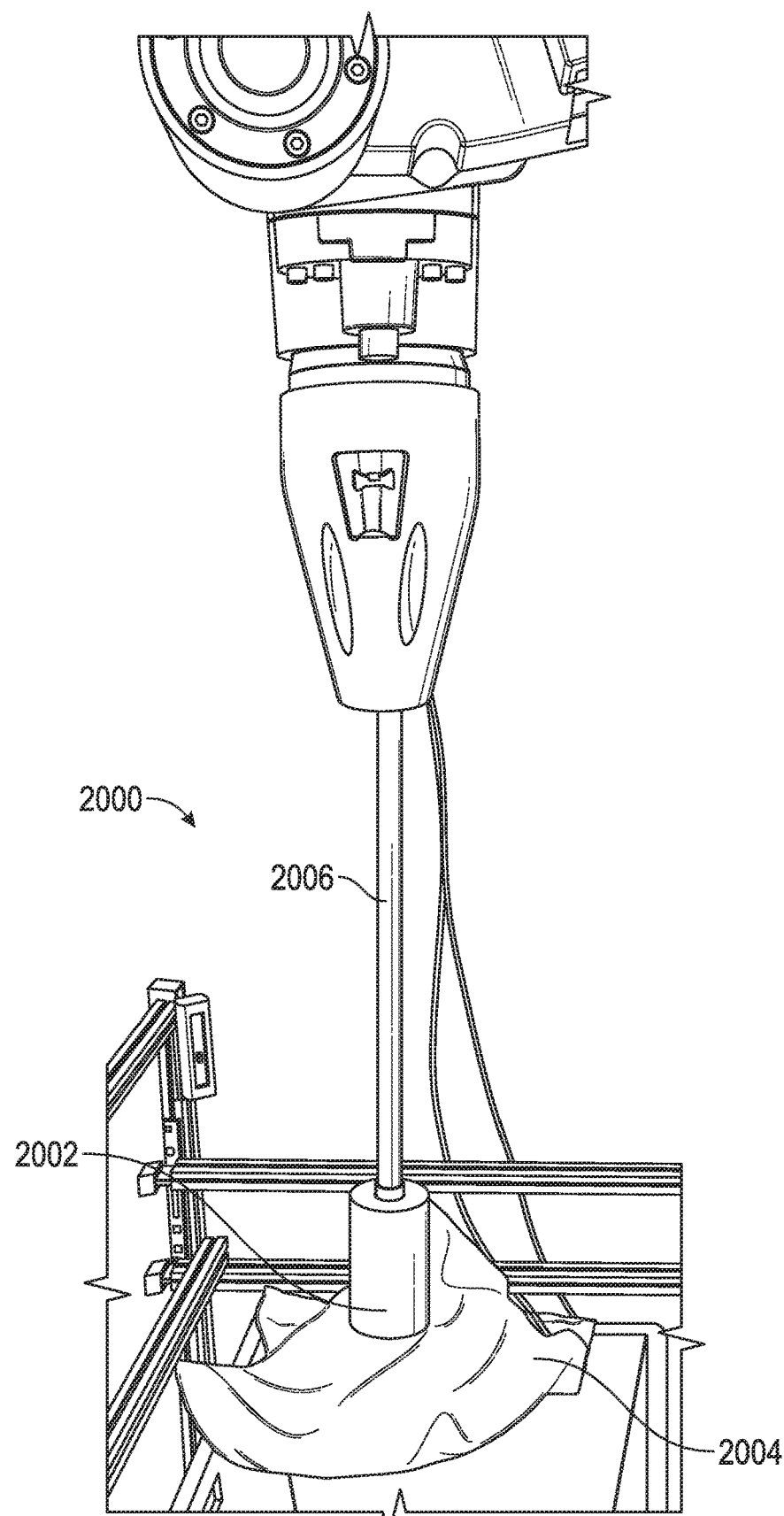
FIG. 20 depicts an exemplary loose bag cup gripper.

FIG. 20 depicts end effector 2000 with loose bag cup gripper 2002, which is designed to increase the ability to pick, hold, and manipulate items like a loose polybag 2004. Loose bag cup gripper 2002 sucks the bag 2004 into the cup. The increased surface area provides for secure holding without a large volume of air flow. As compared to the suction nozzle gripper described above with respect to FIG. 6A, loose bag cup gripper 2002 is optionally more rigid, deeper, and/or wider.

FIGS. 21A-E depict an exemplary loose bag cup gripper for robotic arm end effectors, in accordance with some embodiments. In FIG. 21C, the loose bag cup gripper 2002 comprises a proximal end 2102 and a distal end 2104. The proximal end 2102 can be attached to the end effector via a magnetic attachment, similar to embodiments described above. The proximal end 2102 can also be attached to the end effector via other means; for example, via mechanical means (e.g., latches) or via threaded connections (e.g., screw-on).

FIG. 21B depicts a cross-sectional view of loose bag cup gripper 2002. Loose bag cup gripper 2002 comprises a primary chamber 2106 and secondary chamber 2108. In some embodiments, secondary chamber 2108 is external to primary chamber 2106 and surrounds primary chamber 2106. In the depicted example, the primary chamber 2106 and the secondary chamber 2108 are both cylindrical, wherein the primary chamber 2106 has a smaller diameter than the secondary chamber 2108. Secondary chamber 2108 optionally surrounds and is concentric with primary chamber 2106. This configuration can be achieved, for example, by placing a first hollow cylinder inside a second hollow cylinder, thus forming a primary chamber (i.e., the first hollow cylinder) and a secondary chamber (i.e., the space between the first hollow cylinder and the second hollow cylinder).

In some embodiments, secondary chamber 2108 is connected to primary chamber 2106 via one or more connections 2110 (e.g., holes) such that air can flow between the primary chamber 2106 and the secondary chamber 2108. In the depicted example, secondary chamber 2108 connects to primary chamber 2106 at four levels, with five connections 2110 at each level. However, it should be noted that any connection arrangement can be used. In one embodiment, connection 2110 is 4 millimeters wide and 20 millimeters long.

In some embodiments, the primary chamber 2106 comprises an opening at the proximal end 2102 and an opening at the distal end 2104. In the depicted example, the cross-section of the opening at the proximal end 2102, the cross-section of the opening at the distal end 2104, and the cross-section of the primary chamber 2106 are all of a ring shape. It should be appreciated that the cross-sections of the opening at the proximal end 2102, the opening at the distal end 2104, and the primary chamber 2106 can be of any shape, such as ellipse shape or polygon shape (e.g., rectangle, square). The cross-sections of the opening at the proximal end 2102, the opening at the distal end 2104, and the primary chamber 2106 can optionally be the same shape. Alternatively, one or more of the cross-sections can be a different shape than the other cross-sections. In one embodiment, the opening at the distal end 2104 is small enough so that only one bag 2004 is gripped at one time. In some embodiments, the loose bag cup gripper 2002 has an outer diameter of 50 millimeters and a length of 110 millimeters. The dimensions of loose bag cup gripper 2002 can also be scaled to work with bags of different thicknesses and different weights.

The depicted embodiment shows that the opening at proximal end 2102 has a diameter that is smaller than a diameter of the primary chamber 2106. The depicted embodiment also shows that the opening at the distal end 2104 is shaped as a curved funnel. The opening at the distal end 2104 may also be shaped as other shapes, for example a cone.

As shown in FIG. 21B, the opening at the proximal end 2102 of the loose bag cup gripper 2002 can be configured to align with the distal end of a robotic arm to create a single hollow space that forms and extends longitudinally through the rod 2006 and the loose bag cup gripper 2002, specifically, primary chamber 2106 and secondary chamber 2108. The hollow space can function as a vacuum chamber. In operation, when the loose cup gripper 2002 is placed at a desirable location in proximity to a loose bag 2004, the robotic system activates a vacuum pass-through such that the loose bag cup gripper 2002 grips the loose bag 2004.

FIGS. 22A-B depict loose bag cup gripper 2002 in operation. In FIG. 22A, a vacuum flow is created through the primary chamber 2106 of loose bag cup gripper 2002 (e.g., via an air flow source) and the bag 2004 is drawn upward into the primary chamber 2106 through the opening at the distal end 2104. After the bag 2004 is drawn upward and embedded in the primary chamber 2106, the bag 2004 obstructs and arrests the vacuum flow. In some embodiments, primary chamber 2106 is long enough such that its geometry prevents bag 2004 from being vacuumed completely into the primary chamber 2106. One or more connections 2110 therefore remains unblocked by bag 2004, thereby maintaining the air flow connection between primary chamber 2106 and secondary chamber 2108. The arrested vacuum flow creates a pressure differential between the inside of bag 2004 and hollow chambers 2106, 2108, thereby gripping bag 2004 vertically and laterally.

In one embodiment, gripper 2002 is made from slippery plastic such as Delrin or PTFE, although other materials may be used. In another embodiment, gripper 2002 is made from slippery cast urethane resins. The vacuum force for primary chamber 2106 may be 10 pounds-force axially, and the vacuum force for secondary chamber 2108 may be 16 pounds-force laterally.

In the depicted example, loose bag 2004 is composed of plastic and is deformable. The deformability allows a portion of the bag 2004 to be drawn into primary chamber 2106. Once a portion of the bag 2004 is drawn into primary chamber 2106, the pressure differential between the inside of the bag 2004 (i.e., pressure of the atmosphere) and the pressure of the primary/secondary chambers causes the bag to adhere to the lateral wall of the primary chamber. Once the robotic arm tool has repositioned itself to a desired drop-off location, the vacuum flow can be turned off, allowing the bag 2004 to exit through distal end 2104 of the bag's own weight. Although a plastic bag is depicted, it is contemplated that loose bag cup gripper 2002 can be used to grip other deformable materials, like paper or fabric.

In some embodiments, the system will identify regions on bag 2004 that are likely to contain a label (e.g., barcode) in accordance with the embodiments described in FIGS. 10A-C. The system may position gripper 2002 with sufficient distance from the regions that are likely to contain a label such that the label is not obscured when the bag 2004 is gripped by gripper 2004.

Applying a lateral suction force has the advantage of making the bag 2004 resistant to pullout from both gravitational and side-loaded forces. The loose bag cup gripper 2002 can securely hold a polybag during high acceleration or during high loading scenarios. The present embodiment further has the advantage of reducing the need to employ multiple vacuum cups in an array to prevent side-loaded pullout. Multiple vacuum cup arrays are bulky, complex, costly, and still do not fully mitigate side-loaded detachment of gripped polybags. The present embodiment further has the advantage of reducing the need to employ parallel actuation methods, like mechanical grippers that can be opened and closed. Parallel actuation methods also increase the complexity and cost of the actuation system. Although depicted embodiments reduce the need to employ additional actuators and/or additional actuation methods, additional actuators and/or actuation methods can nevertheless be used if additional gripping security is desired. The present embodiment further has the advantage of being able to securely grip any part of readily available polybags. Specialized bags with specific suction regions are not required, reducing the complexity of the robotic arm system and the cost of the employed bags.

In an alternate embodiment, loose bag cup gripper 2002 can be modified to include a suction cup located at the distal end 2104. The suction cup is optionally less rigid than loose bag cup gripper 2002, thereby allowing the suction cup to better grip rigid surfaces. The suction cup is coupled to the loose bag cup gripper 2002 such that it continues the vacuum pass-through comprising the robotic arm tool 1920 and the loose bag cup gripper 2002. In this embodiment, the same robotic arm end effector attachment can be used to grip both polybags and items with rigid surfaces, like boxes.

In operation, the modified loose bag cup gripper 2002 is placed at a desirable location in proximity to a target item. The robotic system then activates a vacuum pass-through such that the modified loose bag cup gripper 2002 applies a vertical suction force to the target item. If the target item is a polybag, the target item will be at least partially drawn into primary chamber 2106 and also held laterally by secondary chamber 2108, in accordance with embodiments described in FIGS. 22A-B. If the target item is rigid, the target item will be suctioned to the suction cup, thereby achieving gripping.

The system is able to switch the type of end effector (e.g., switching between the gripper 1904 and gripper 2002) during the operation automatically based on the object characteristics (e.g. dimension, weight, surface material) in the tote. There are multiple types of end effectors (e.g., multiple types of cups) that are placed on a fixture nearby the robot. When the robot needs to switch the end effector, it will conduct a certain motion so that the current engaged end effector will be left on the fixture and then engage another cup on the fixture. In some cases, the end effectors are attached with magnetic force or vacuum force.

FIG. 23 depicts a package orientation system 2300 for orienting package 2302 so that label 2304 is detectable by scanner 2306, in accordance with some embodiments. Detecting label 2304 has the advantage of confirming that the package's orientation is suitable for label reading at a later step. For example, if scanner 2306 is located directly above upper conveyor belt 2308, scanner 2306 will preferably only detect label 2304 when package 2302 is oriented with its label 2304 facing upwards. Orienting packages with labels facing upwards is advantageous because many existing warehouses have pre-existing infrastructure built to read labels that are facing up. Since packages are often oriented in other orientations during transit and picking, it is desirable to create a compact, quick, and cost-efficient system to re-orient packages so that their labels face a desirable direction (e.g., upwards).

Package orientation system 2300 comprises a scanner 2306, an upper conveyor belt 2308, a flipping conveyor belt 2310, and a lower conveyor belt 2312. In some embodiments, flipping conveyor belt 2310 is located at a proximal end of upper conveyor belt 2308. In a preferred embodiment, flipping conveyor belt 2310 is further located such that, when it is in a first orientation (e.g., upright orientation), package 2302 travelling on upper conveyor belt 2308 runs into and cannot continue past flipping conveyor belt 2310. As discussed in detail below, the flipping conveyor belt 2310 is an angled conveyor to facilitate reorient the object via controlled tumbling manipulation. The first orientation of the flipping conveyor belt is tuned to optimize the success rate in reorienting objects. In some embodiments, the first orientation of the flipping conveyor belt is 90 degrees (i.e., perpendicular to the upper conveyor belt) or substantially 90 degrees (e.g., 80 degrees-100 degrees).

Lower conveyor belt 2312 is preferably located below upper conveyor belt 2308 and flipping conveyor belt 2310. In some embodiments, C-chute 2314 is located at a distal end of upper conveyor belt 2308.

Scanner 2306 is preferably located at or near the point where package 2302 cannot continue past flipping conveyor belt 2310. In one embodiment, scanner 2306 is located directly above upper conveyor belt 2308 and points down at upper conveyor belt 2308. However, it should be appreciated that scanner 2306 can be placed in other positions relative to upper conveyor belt 2308 as well. Scanner 2306 can be configured to recognize the label 2304 on package 2302. Label 2304 can comprise any method of storing information about a package. For example, label 2304 can be a 1D/2D barcode, fiducial marker, a QR code, or any combination thereof. Label 2304 can be machine-readable or readable by humans. In one embodiment, scanner 2306 continuously attempts to detect a label.

Figure 24B:
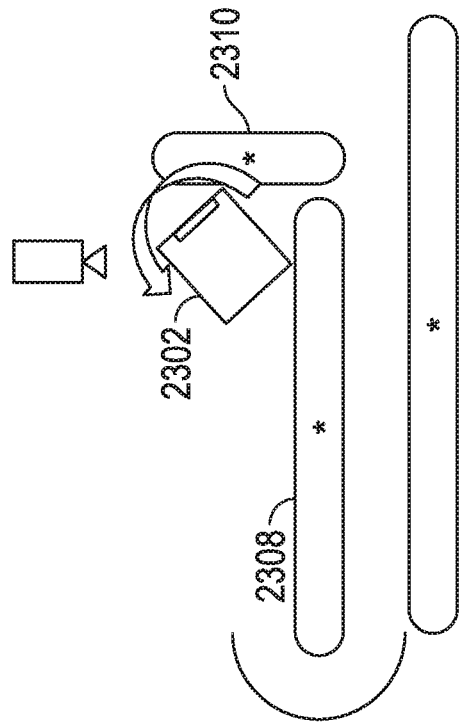
FIG. 24B depicts an exemplary package orientation system in accordance with some embodiments.
Figure 24D:
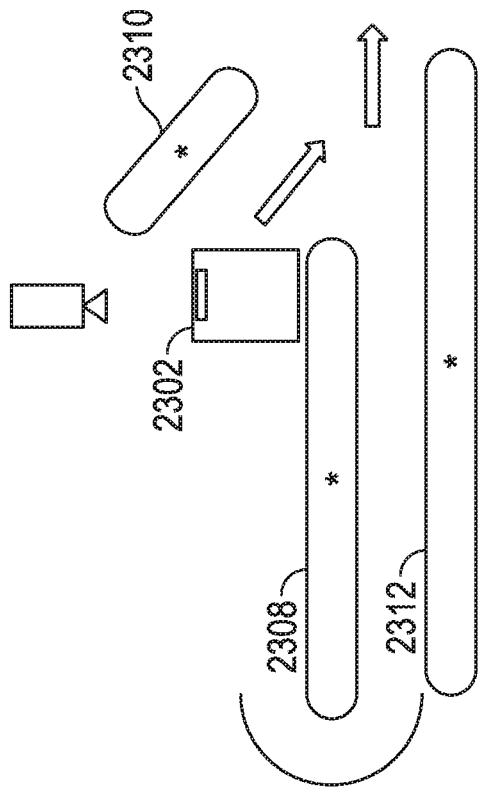
FIG. 24D depicts an exemplary package orientation system in accordance with some embodiments.
Figure 24A:
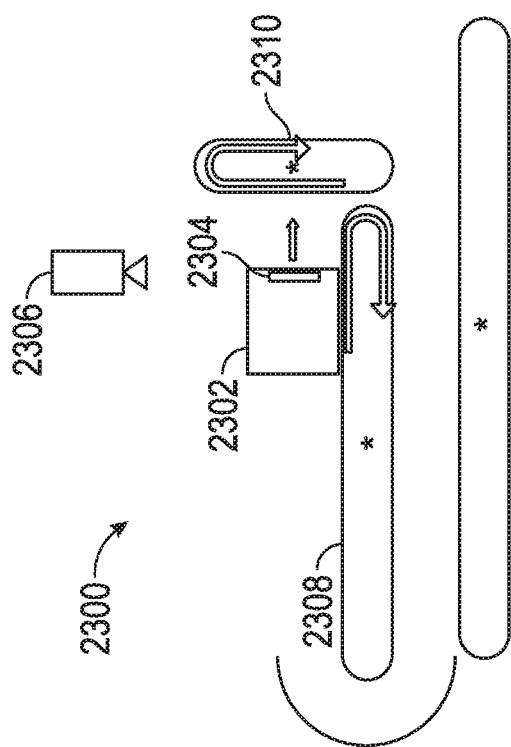
FIG. 24A depicts an exemplary package orientation system in accordance with some embodiments.

FIGS. 24A-D depict package orientation system 2300 in operation. Package 2302 is placed on upper conveyor belt 2308 by any method of transporting packages. For example, package 2302 can be placed onto belt 2308 by a robot, a human, or a different conveyor belt. In some embodiments, upper conveyor belt 2308 is already running when package 2302 is placed on upper conveyor belt 2308. Alternatively, upper conveyor belt 2308 can begin to run when package 2302 is placed onto the belt 2308. In FIG. 24A, package 2302 is placed in a first orientation such that label 2304 is not recognizable by scanner 2306, so upper conveyor belt 2308 continues to run, moving package 2302 along belt 2308 and towards flipping conveyor belt 2310.

If the package is placed onto the conveyor belt 2308 with the bar code on its two lateral side, flipping the package would not make it visible to the scanner 2306. Thus, in some embodiments, before placing the package 2302 onto the conveyor belt 2308, the system makes sure that the barcode is not on the two lateral surfaces of the package. In some embodiments, the package is picked up using a robotic arm and rotated continuously (e.g., along the z-axis) while a second scanner scans the package. Based on the image captured by the second scanner, the system determines whether the package has been rotated such that the surface with the barcode on is one of the four sides that would be flipped when the package is placed onto the conveyor belt, rather than the two lateral sides. In accordance with a determination that the surface is one of the four sides that would be flipped, the robotic arm places the package onto the conveyor belt 2308. In accordance with a determination that the surface with the barcode on is not one of the four sides, the robotic arm continues to rotate the package around the z-axis (e.g., by rotating the gripper).

In FIG. 24B, package 2302 moves along upper conveyor belt 2308 and comes into contact with flipping conveyor belt 2310. Flipping conveyor belt 2310 preferably runs in a direction that will pull package 2302 upwards and away from upper conveyor belt 2308 so that package 2302 tumbles into a second orientation. Flipping conveyor belt 2310 can be continuously running. Alternatively, flipping conveyor belt 2310 can begin running when scanner 2306 detects package 2302, but does not detect label 2304. If label 2304 is still not recognizable by scanner 2306 in the second orientation, belts 2308 and 2310 will continue to run and package 2302 will continue to tumble into different orientations.

In some embodiments, one or both of the upper conveyor belt 2308 and flipping conveyor belt 2310 are cleated to help grip package 2302 and to facilitate tumbling, pivoting, or flipping package 2302 into a second orientation (e.g., by 90, 180, 270 degrees). In one embodiment, the upper conveyor belt 2308 employs a cleated conveyor belt with low friction such that scanner 2306 has time to detect label 2304 before package 2302 tumbles into the second orientation. In another embodiment, the flipping conveyor belt 2310 employs a conveyor belt with high friction to facilitate tumbling package 2302. It is contemplated that any combination of cleated conveyor belts, high friction belts, and low friction belts may be used.

Figure 24C:
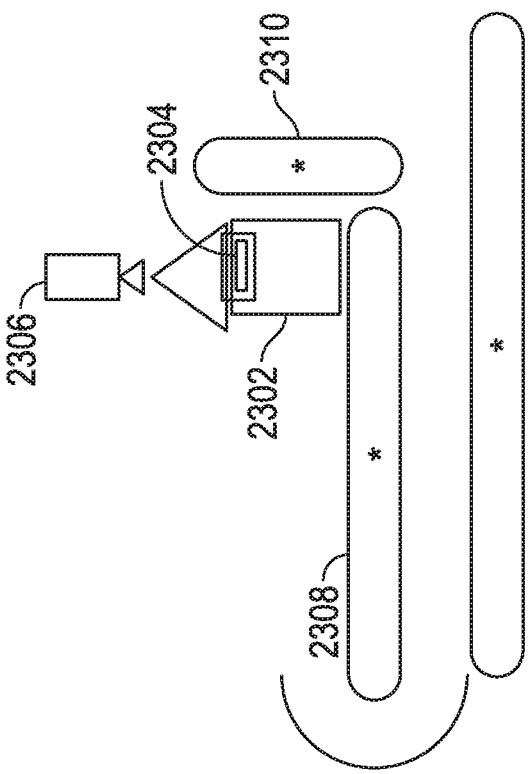
FIG. 24C depicts an exemplary package orientation system in accordance with some embodiments.

In FIG. 24C, the system determines that the package 2302 has tumbled into an orientation such that it is ready to be processed by a downstream sorter. For example, if the downstream sorter has a single barcode reader that requires the barcode label of the object facing upwards, the system would determine that the package is in the appropriate orientation when the scanner 2306 recognizes a barcode on the top surface of the package. As another example, if the downstream sorter has a 5 sided scanning tunnel, the system would determine that the package is in the appropriate orientation when the bar code is not on the bottom surface of the package (e.g., based on an output of a scanner scanning the bottom surface). Once the system determines that the package is in the appropriate orientation, upper conveyor belt 2308 and flipping conveyor belt 2310 stop running so that package 2302 stops tumbling.

Figure 24E:
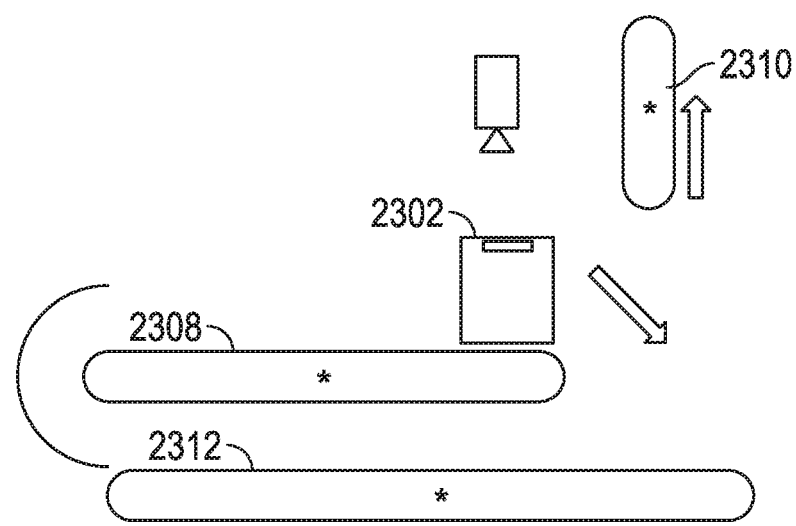
FIG. 24E depicts an exemplary package orientation system in accordance with some embodiments.

In FIG. 24D, flipping conveyor belt 2310 moves so that package 2302 has an unobstructed path to continue along upper conveyor belt 2308. In a preferred embodiment, flipping conveyor belt 2310 moves to a second orientation (e.g., swings open), creating sufficient space between flipping conveyor belt 2310 and upper conveyor belt 2308 for package 2302 to pass through. It should be appreciated that flipping conveyor belt 2310 can move via other methods as well. For example, flipping conveyor belt 2310 can slide upwards to create sufficient space between flipping conveyor belt 2310 and upper conveyor belt 2308 for package 2302 to pass through, as shown in FIG. 24E.

Figure 24F:
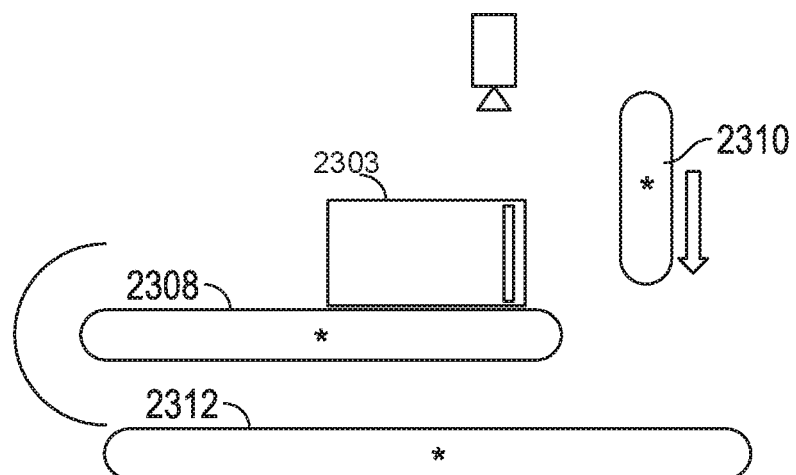
FIG. 24F depicts an exemplary package orientation system in accordance with some embodiments.

In some embodiments, when a second package is placed onto the conveyor belt 2308, the flipping conveyor belt 2310 moves to the first orientation (e.g., upright as shown in FIG. 24A) or position (lower as shown in FIG. 24F) in response to a determination that the second package on the conveyor belt 2308 needs to be flipped based on the image data captured by the scanner 2306. In some embodiments, the flipping conveyor belt 2310 moves to the first orientation (e.g., upright as shown in FIG. 24A) or position (lower as shown in FIG. 24F) after the first package passes through.

In some embodiments, the scanner 2306 continues scanning the package while the package is being flipped. The scanner 2306 captures one or more images and determines, based on the one or more images, whether a bar code has been successfully detected and read. In accordance with a determination that a bar code has been successfully read, the system lets the package to move along, for example, by moving the flipping conveyor belt (e.g., rotate or moving upwards). In accordance with a determination that a bar code has not been successfully read, the system continues flipping the package. Accordingly, a downstream scanner is not needed.

Figure 25A:
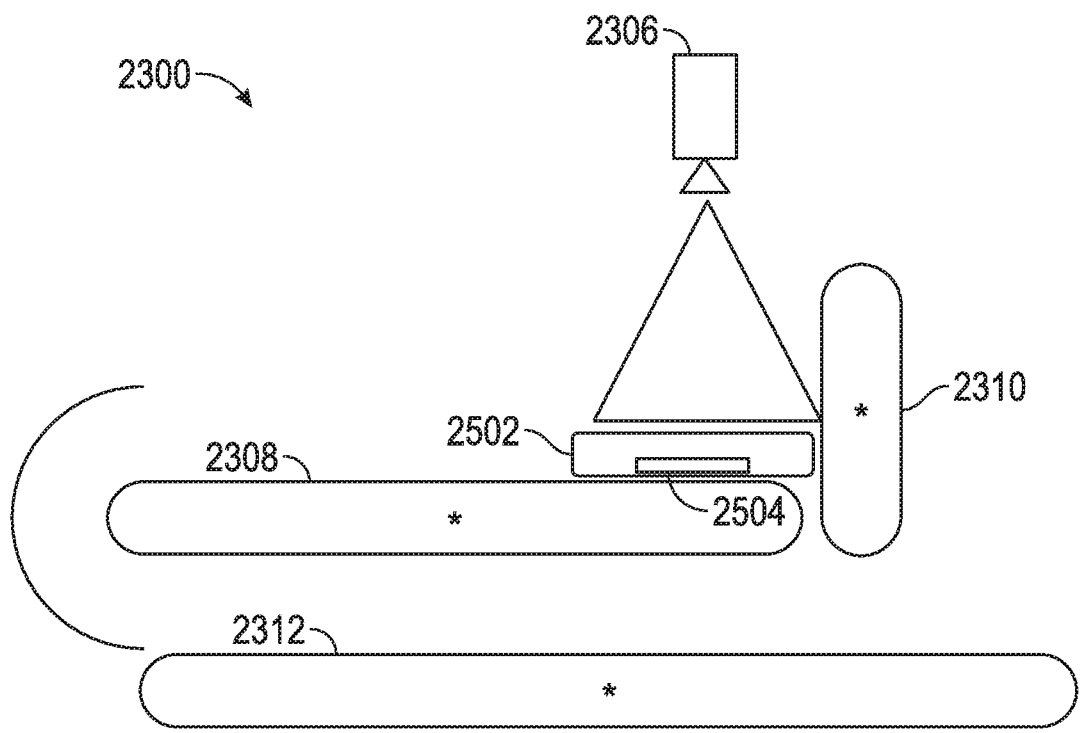
FIG. 25A depicts an exemplary package orientation system in accordance with some embodiments.
Figure 25B:
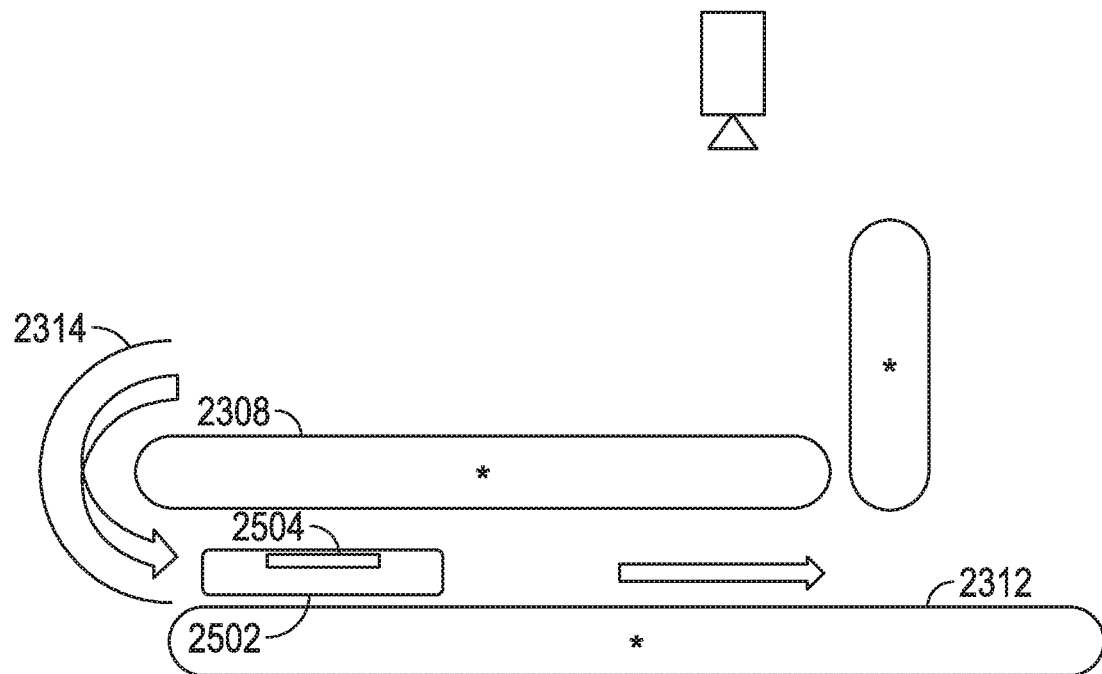
FIG. 25B depicts an exemplary package orientation system in accordance with some embodiments.

FIGS. 25A-B depict package orientation system 2300 handling flat package 2502. In a preferred embodiment, package orientation system 2300 comprises C-chute 2314. C-chute 2314 is preferably located at a distal end of upper conveyor belt 2308 and configured to receive packages traveling along upper conveyor belt 2308. C-chute 2314 preferably wraps around the distal end of upper conveyor belt 2308 such that flat package 2502 leaving the distal end of belt 2308 will be flipped over. Flat package 2502 can have substantially larger measurements along two dimensions and relatively small measurements along a third dimension. Flat package 2502 can be, for example, an envelope or a polybag. Flat package 2502 can also be characterized as not having enough room along the shorter third dimension to affix label 2504 to. As such, label 2504 will preferably be on one of only two sides of flat package 2502.

In operation, flat package 2502 is placed on upper conveyor belt 2308 by any method of transporting packages. For example, flat package 2502 can be placed onto belt 2308 by a robot, a human, or a different conveyor belt. Flat package 2502 will preferably initially proceed on upper conveyor belt 2308 towards the proximal end and flipping conveyor belt 2310. If scanner 2306 fails to detect label 2504 when flat package 2502 arrives at the proximal end of belt 2308, package orientation system 2300 will determine a height of flat package 2502. Alternatively, the height of flat package 2502 may be determined at another stage of the picking or singulation process. In one embodiment, the height is determined using an RGB-D camera, although other methods for determining height may be used. In another embodiment, the height is determined using optical sensors, such as photoeyes. If the package is determined to be a normal package, the package will be handled in accordance with some embodiments shown in FIGS. 24A-D. If the package is determined to be a flat package 2502, upper conveyor belt 2308 will reverse direction and send flat package 2308 to the distal end of belt 2308 and towards C-chute 2314. Preferably, flat package 2308 will proceed past the distal end of belt 2308 and fall into C-chute 2314, which flips flat package 2502 as flat package 2502 slides off C-chute 2314 onto lower conveyor belt 2312. Label 2504 on flat package 2502 is now preferably visible and upwards facing.

Figure 25C:
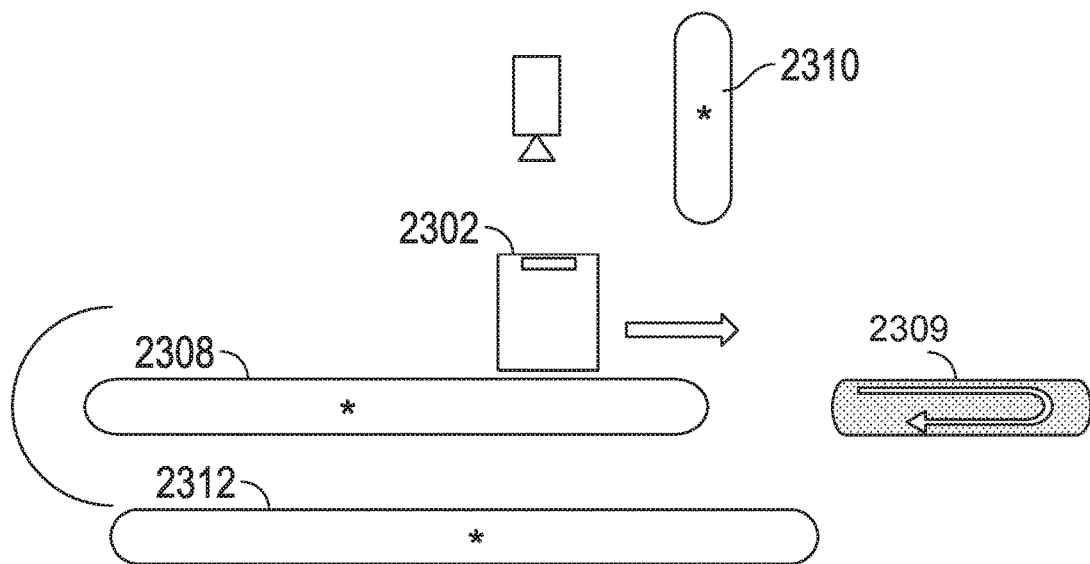
FIG. 25C depicts an exemplary package orientation system in accordance with some embodiments.
Figure 25D:
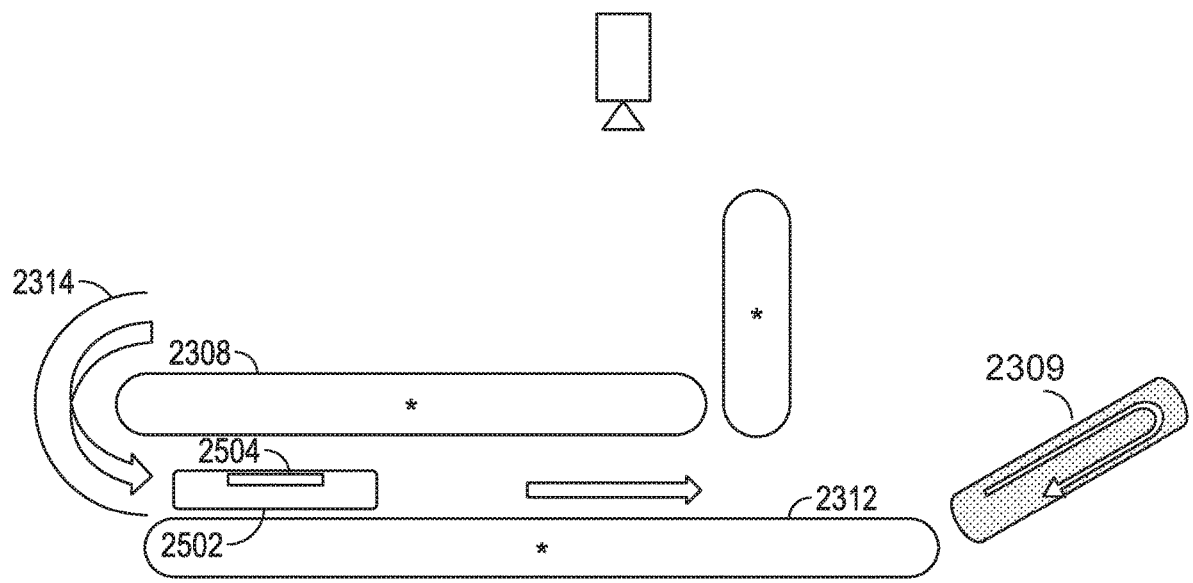
FIG. 25D depicts an exemplary package orientation system in accordance with some embodiments.

In some embodiments, when the package passes through the flipper conveyor belt 2310, a conveyor belt 2309 receives the package. With reference to FIG. 25C and FIG. 25D, the system determines whether the package is coming from the conveyor belt 2308 or the conveyor belt 2312. Based on the determination, the system changes the position and/or orientation of the conveyor belt 2309 such that the package can be received. In some embodiments, the determination can be made when the system determines whether the package is a flat package and needs to be flipped using the C-chute 2314 (FIG. 25A).

One advantage of package orientation system 2300 is that the system is low-cost because the system operates with a minimum amount of sensing and actuation. A further advantage of the system is that it is quick due to automation. A further advantage of the system is that it is compact. Warehouse space can be valuable; it is therefore desirable that the space required to process inventory is minimized. A further advantage of the system is that it is compatible with existing warehouse infrastructure that requires labels to be upward-facing and has a limited amount of available floor space.

It is understood that the specific order or hierarchy of blocks in the processes/flowcharts disclosed is an illustration of exemplary approaches. Based upon design preferences, it is understood that the specific order or hierarchy of blocks in the processes/flowcharts can be rearranged. Further, some blocks can be combined or omitted. The accompanying method claims present elements of the various blocks in a sample order, and are not meant to be limited to the specific order or hierarchy presented.

The previous description is provided to enable any person skilled in the art to practice the various examples described herein. Various modifications to these examples will be readily apparent to those skilled in the art, and the generic principles defined herein can be applied to other examples. Thus, the claims are not intended to be limited to the examples shown herein, but are to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any example described herein as "exemplary" is not necessarily to be construed as preferred or advantageous over other examples. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and can include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" can be A only, B only, C only, A and B, A and C, B and C, or A and B and C, where any such combinations can contain one or more member or members of A, B, or C. All structural and functional equivalents to the elements of the various examples described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like cannot be a substitute for the word "means." As such, no claim element is to be construed under 35 U.S.C § 112(f) unless the element is expressly recited using the phrase "means for."

What is claimed is:

1. An apparatus for vacuum-gripping a deformable bag, comprising:
   a primary chamber,
      wherein a proximal end of the primary chamber is connected to an air flow source, and
      wherein the primary chamber is configured to, upon an activation of the air flow source, receive a portion of the deformable bag via a distal end of the primary chamber;
   a secondary chamber surrounding the primary chamber,
      wherein the secondary chamber is connected to the primary chamber via a plurality of connections to allow for air passage, and
      wherein the activation of the air flow source causes the plurality of connections in a lateral wall of the primary chamber to laterally grip the portion of the deformable bag via pressure differential between an inside of the deformable bag and the secondary chamber.

2. The apparatus of claim 1, wherein the primary and secondary chambers are nested.

3. The apparatus of claim 1, wherein a subset of the plurality of connections are arranged radially on the lateral wall of the primary chamber.

4. The apparatus of claim 1, wherein the air flow source creates a vacuum flow.

5. The apparatus of claim 1, wherein the proximal end of the apparatus comprises a first magnetic ring configured to automatically couple with a second magnetic ring of a motion device in an aligned manner.

6. The apparatus of claim 1, wherein the distal end of the apparatus comprises a suction cup configured to grip rigid surfaces.

7. The apparatus of claim 1, further comprising a first hollow cylinder, wherein the first hollow cylinder forms the primary chamber.

8. The apparatus of claim 7, further comprising a second hollow cylinder, wherein the first hollow cylinder is placed inside the second hollow cylinder, and wherein a space between the first hollow cylinder and the second hollow cylinder forms the secondary chamber.

9. The apparatus of claim 8, wherein the plurality of connections are formed via a plurality of holes on a lateral wall of the first follow cylinder.

10. The apparatus of claim 8, wherein the first hollow cylinder is made of plastic, metal, or a combination thereof.

11. The apparatus of claim 8, wherein the second hollow cylinder is made of plastic, metal, or a combination thereof.

12. The apparatus of claim 1, wherein the activation of the air flow source comprises activation of a vacuum pass-through.

* * * * *